US011880806B2

(12) United States Patent
Preuss et al.

(10) Patent No.: US 11,880,806 B2
(45) Date of Patent: Jan. 23, 2024

(54) SYSTEMS AND METHODS FOR AUTOMATIC CANDIDATE ASSESSMENTS

(71) Applicant: Cut-E Assessment Global Holdings Limited, Loughrea (IE)

(72) Inventors: Achim Preuss, Hamburg (DE); Richard Justenhoven, Hamburg (DE); Niels Kruse, Hamburg (DE); Nicholas Martin, Austin, TX (US)

(73) Assignee: Cut-E Assessment Global Holdings Limited, Loughrea (IE)

( * ) Notice: Subject to any disclaimer, the term of this patent is extended or adjusted under 35 U.S.C. 154(b) by 0 days.

(21) Appl. No.: 17/369,121

(22) Filed: Jul. 7, 2021

(65) Prior Publication Data

US 2022/0172172 A1 Jun. 2, 2022

Related U.S. Application Data

(63) Continuation of application No. 17/160,131, filed on Jan. 27, 2021, now Pat. No. 11,093,901.

(Continued)

(51) Int. Cl.
*G06Q 10/10* (2023.01)
*G06Q 10/1053* (2023.01)

(Continued)

(52) U.S. Cl.
CPC ....... *G06Q 10/1053* (2013.01); *G06F 40/242* (2020.01); *G10L 15/08* (2013.01);

(Continued)

(58) Field of Classification Search
CPC ................................ G06Q 10/00; G10L 15/22
See application file for complete search history.

(56) References Cited

U.S. PATENT DOCUMENTS 8,751,231 B1 6/2014 Larsen et al.
8,856,000 B1 10/2014 Larsen et al.

(Continued)

FOREIGN PATENT DOCUMENTS

CN 106663383 A 5/2017
CN 107871226 A 4/2018

(Continued)

OTHER PUBLICATIONS

Rasipuram, Sowmya, and Dinesh Babu Jayagopi. "Asynchronous video interviews vs. face-to-face interviews for communication skill measurement: a systematic study." Proceedings of the 18th ACM international conference on multimodal interaction. 2016. ( Year: 2016).*

(Continued)

*Primary Examiner* — Jialong He
(74) *Attorney, Agent, or Firm* — Gardella Grace P.A.

(57) ABSTRACT

In an illustrative embodiment, systems and methods for automating recorded candidate assessments include receiving a submission for an available position including a question response recording for each of one or more interview questions. For each question response recording, a transcript can be generated by applying a speech-to-text algorithm to an audio portion of the recording. The systems and methods can detect, within the transcript, identifiers each associated with the personality aspects by applying a natural language classifier trained to detect words and phrases associated with the personality aspects of the personality model. Scores may be calculated for each of the personality aspects based on a relevance of the respective personality aspect to the respective interview question and detected identifiers. The scores can be presented within a user interface screen responsive to receiving a request to view interview results.

16 Claims, 27 Drawing Sheets

Related U.S. Application Data

(60) Provisional application No. 62/967,443, filed on Jan. 29, 2020.

(51) Int. Cl.

| | |
|---|---|
| ***G06F 40/242*** | (2020.01) |
| ***G10L 15/08*** | (2006.01) |
| ***G10L 15/26*** | (2006.01) |

(52) U.S. Cl.
CPC ............ *G10L 15/083* (2013.01); *G10L 15/26* (2013.01); *G10L 2015/088* (2013.01)

(56) References Cited

U.S. PATENT DOCUMENTS

| | | | |
|---|---|---|---|
| 9,009,045 B1 | 4/2015 | Larsen et al. | |
| 9,846,844 B2 | 12/2017 | Hecht et al. | |
| 10,104,233 B2 | 10/2018 | Conway et al. | |
| 10,176,365 B1 | 1/2019 | Ramanarayanan et al. | |
| 10,242,345 B2 | 3/2019 | Taylor et al. | |
| 10,318,926 B2 | 6/2019 | Champaneria | |
| 10,318,927 B2 | 6/2019 | Champaneria | |
| 10,366,160 B2 | 7/2019 | Castelli et al. | |
| 10,528,916 B1 | 1/2020 | Taylor et al. | |
| 11,093,901 B1 | 8/2021 | Preuss et al. | |
| 11,216,784 B2 | 1/2022 | Preuss et al. | |
| 2004/0093263 A1 | 5/2004 | Doraisamy et al. | |
| 2005/0060175 A1 | 3/2005 | Farber et al. | |
| 2005/0283378 A1 | 12/2005 | Iserson | |
| 2007/0088601 A1 | 4/2007 | Money et al. | |
| 2008/0172284 A1 | 7/2008 | Hartmann | |
| 2008/0270467 A1 | 10/2008 | Clarke | |
| 2011/0088081 A1 | 4/2011 | Folkesson et al. | |
| 2012/0221477 A1 | 8/2012 | Pande | |
| 2012/0262296 A1 | 10/2012 | Bezar | |
| 2012/0271774 A1 | 10/2012 | Clegg | |
| 2013/0226578 A1 | 8/2013 | Bolton et al. | |
| 2013/0266925 A1 | 10/2013 | Nunamaker, Jr. et al. | |
| 2013/0290210 A1 | 10/2013 | Cline et al. | |
| 2014/0032215 A1* | 1/2014 | Bolton | G06Q 10/1053 704/235 |
| 2014/0191939 A1 | 7/2014 | Penn et al. | |
| 2014/0356822 A1 | 12/2014 | Hoque et al. | |
| 2015/0046357 A1 | 2/2015 | Danson et al. | |
| 2015/0154564 A1 | 6/2015 | Moon et al. | |
| 2015/0206103 A1 | 7/2015 | Larsen et al. | |
| 2015/0269529 A1 | 9/2015 | Kyllonen et al. | |
| 2016/0034851 A1 | 2/2016 | Xiao et al. | |
| 2016/0283905 A1 | 9/2016 | Lahti et al. | |
| 2017/0213190 A1 | 7/2017 | Hazan | |
| 2017/0262949 A1 | 9/2017 | Jay | |
| 2018/0025303 A1 | 1/2018 | Janz | |
| 2019/0096425 A1 | 3/2019 | Akkiraju et al. | |
| 2020/0168231 A1 | 5/2020 | Alagianambi | |
| 2020/0311682 A1 | 10/2020 | Olshansky | |
| 2020/0387850 A1 | 12/2020 | Kramer et al. | |
| 2021/0233030 A1 | 7/2021 | Preuss et al. | |
| 2021/0233031 A1 | 7/2021 | Preuss et al. | |
| 2022/0366373 A1 | 11/2022 | Preuss et al. | |

FOREIGN PATENT DOCUMENTS

| | | |
|---|---|---|
| CN | 109146296 | 1/2019 |
| CN | 115413348 | 11/2022 |
| EP | 4097664 | 12/2022 |
| EP | 4097720 | 12/2022 |
| WO | 2015198317 | 12/2015 |
| WO | 2021151990 | 8/2021 |
| WO | 2021151993 | 8/2021 |

OTHER PUBLICATIONS

Hemamou, Léo, et al. "Hirenet: a hierarchical attention model for the automatic analysis of asynchronous video job interviews." Proceedings of the AAAI conference on artificial intelligence. vol. 33. No. 01. 2019. (Year: 2019).*

Bias, Al Ethics, and the HireVue Approach, HireVue, Retrieved on Oct. 16, 2019 at: https://www.hirevue.com/why-hirevue/ethical-ai, 3 pages (previously submitted in related U.S. Appl. No. 17/160,131).

"Reliability coefficient," American Psychological Association, APA Dictionary of Psychology. Retrieved Jan. 27, 2021, from https://dictionary.apa.org/reliability-coefficient (previously submitted in related U.S. Appl. No. 17/160,131).

Argamon et al., "Lexical predictors of personality type," Proceedings of Joint Annual Meeting of the Interface and the Classification Society of North America, 2005, 16 pages (previously submitted in related U.S. Appl. No. 17/160,131).

Blackman, "Personality Judgment and the Utility of the Unstructured Employment Interview," Basic and Applied Social Psychology, 2002, 24(3), pp. 241-250 (previously submitted in related U.S. Appl. No. 17/160,131).

Blacksmith et al., "Technology in the employment interview: a meta-analysis and future research agenda," Personnel Assessment and Decisions, 2016, 2(1), pp. 12-20 (previously submitted in related U.S. Appl. No. 17/160,131).

Brenner et al., "Asynchronous video interviewing as a new technology in personnel selection: the applicant's point of view," Frontiers in Psychology, 2016, vol. 7, Article 863, 11 pages (previously submitted in related U.S. Appl. No. 17/160,131).

Chen et al., "Automated scoring of interview videos using Doc2Vec multimodal feature extraction paradigm" Proceedings of the 18th ACM International Conference on Multimodal Interaction, 2016, pp. 161-168 (previously submitted in related U.S. Appl. No. 17/160,131).

Clark et al., "Electra: Pre-training text encoders as discriminators rather than generators," 2020, arXiv preprint arXiv:2003.10555, 18 pages (previously submitted in related U.S. Appl. No. 17/160,131).

Cohen, "The effect size index: d," Statistical power analysis for the behavioral sciences, Second Edition, pp. 20-27 (previously submitted in related U.S. Appl. No. 17/160,131).

Cohen, "A Power Primer," Psychological Bulletin, 1992, 112(1), pp. 155-159 (previously submitted in related U.S. Appl. No. 17/160,131).

Conway et al., "A meta-analysis of interrater and internal consistency reliability of selection interviews," Journal of applied psychology, 1995, 80(5), pp. 565-579 (previously submitted in related U.S. Appl. No. 17/160,131).

Cronbach et al., "Construct validity in psychological tests," Psychological Bulletin, 1955, 52, 281-302 (previously submitted in related U.S. Appl. No. 17/160,131).

D'Urso et al., "Examining the scope of channel expansion: a test of channel expansion theory with new and traditional communication media," Management Communication Quarterly, 2008, 21(4), pp. 486-507 (previously submitted in related U.S. Appl. No. 17/160,131).

Davenport et al., "Artificial Intelligence or the Real World," Harvard Business Review, 2018, from: https://hbr.org/2018/01/artificial-intelligence-for-the-real-world (previously submitted in related U.S. Appl. No. 17/160,131).

Degroot et al., "Evidence of predictive and incremental validity of personality factors, vocal attractiveness and the situational interview" International Journal of Selection and Assessment, 2007, 15(1), pp. 30-39 (previously submitted in related U.S. Appl. No. 17/160,131).

Devlin et al., "Bert: Pre-training of deep bidirectional transformers for language understanding," 2019, arXiv preprint arXiv:1810.04805 (previously submitted in related U.S. Appl. No. 17/160,131).

Eisinga et al., "The reliability of a two-item scale: Pearson, Cronbach or Spearman-Brown?" International Journal of Public Health, 2013, 58, pp. 637-642. doi: 10.1007 / s00038-012-0416-3 (previously submitted in related U.S. Appl. No. 17/160,131).

Fast et al., "Personality as manifest in word use: correlations with self-report, acquaintance report, and behavior," Journal of Personality and Social Psychology, 2008, 94(2), pp. 334-346 (previously submitted in related U.S. Appl. No. 17/160,131).

Gliozzo et al., "Building Cognitive Applications with IBM Watson Services: vol. 1—Getting started," IBM Redbooks, 2017, 131 pages (previously submitted in related U.S. Appl. No. 17/160,131).

(56) References Cited

OTHER PUBLICATIONS

Goodfellow et al., "Generative adversarial nets," Advances in Neural Information Processing Systems, 2014, arXiv:1406.2661 (previously submitted in related U.S. Appl. No. 17/160,131).
Gorman et al., "An investigation into the validity of asynchronous web-based video employment-interview ratings," Consulting Psychology Journal: Practice and Research, 2018, 70(2), pp. 129-146 (previously submitted in related U.S. Appl. No. 17/160,131).
Huffcutt et al., "Racial group differences in employment interview evaluations," Journal of Applied Psychology, 1998, 83(2), pp. 179-189 (previously submitted in related U.S. Appl. No. 17/160,131).
Huffcutt et al., "Understanding applicant behavior in employment interviews: a theoretical model of interviewee performance," Human Resource Management Review, 2011, 21, pp. 353-367 (previously submitted in related U.S. Appl. No. 17/160,131).
IBM (2017). Reaching new records in speech recognition. Retrieved from: https://www.ibm.com/blogs/watson/2017/03/reaching-new-records-in-speech-recognition/ (previously submitted in related U.S. Appl. No. 17/160,131).
IBM (2020a). Best practices for classifiers. Retrieved from: https://cloud.ibm.com/docs/services/natural-language-classifier?topic=natural-language-classifier-best-practices-overview (previously submitted in related U.S. Appl. No. 17/160,131).
IBM (2020b). Speech-to-Text Release Notes. Retrieved from: https://cloud.ibm.com/docs/text-to-speech?topic=text-to-speech-release-notes (previously submitted in related U.S. Appl. No. 17/160,131).
IBM (2020c). Speech-to-Text Documentation. Retrieved from: https://cloud.ibm.com/docs/speech-to-text (previously submitted in related U.S. Appl. No. 17/160,131).
Jongman et al., "Vocabulary size influences spontaneous speech in native language users: Validating the use of automatic speech recognition in individual differences research," Language and Speech, 2020 pp. 1-17 (previously submitted in related U.S. Appl. No. 17/160,131).
Kubis et al., "Open Challenge for Correcting Errors of Speech Recognition Systems," 2020, arXiv preprint arXiv:2001.03041 (previously submitted in related U.S. Appl. No. 17/160,131).
Landy, "Stamp collecting versus science: Validation as hypothesis testing," American Psychologist, 1986, 41(11), pp. 1183-1192 (previously submitted in related U.S. Appl. No. 17/160,131).
Latif et al., "Deep Representation Learning in Speech Processing: Challenges, Recent Advances, and Future Trends," arXiv preprint arXiv:2001.00378 (previously submitted in related U.S. Appl. No. 17/160,131).
Lochner et al., "Digitales Recruiting," Group, Interaction, Organization, Journal of Applied Organizational Psychology (GIO), 2018, 49(3), pp. 193-202 (previously submitted in related U.S. Appl. No. 17/160,131).
Macan, "The employment interview: a review of current studies and directions for future research," Human Resource Management Review, 2009, 19(3), pp. 203-218 (previously submitted in related U.S. Appl. No. 17/160,131).
Mejia et al., "Implementation and normalization process of asynchronous video interviewing practices in the hospitality industry," International Journal of Contemporary Hospitality Management, 2018, 30(2), pp. 685-701 (previously submitted in related U.S. Appl. No. 17/160,131).
International Search Report and Written Opinion issued in International Application No. PCT/EP2021/051951 dated Apr. 1, 2021 (previously submitted in related U.S. Appl. No. 17/160,131).
International Search Report and Written Opinion issued in International Application No. PCT/EP2021/051946 dated May 3, 2021.
Notice of Allowance dated Apr. 2, 2021 mailed in related U.S. Appl. No. 17/160,131.
Hemamou et al., "Slices of Attention in Asynchronous Video Job Interviews," 2019 8th International Conference on Affective Computing and Intelligent Interaction (ACII). IEEE, 2019, pp. 325-331.
Suen et al., "TensorFlow-Based Automatic Personality Recognition Used in Asynchronous Video Interviews," IEEE Access 7 (2019): pp. 61018-61023. (Year: 2019).
Corrected Notice of Allowability dated Apr. 15, 2021 mailed in related U.S. Appl. No. 17/160,131.
Corrected Notice of Allowability dated Jun. 28, 2021 mailed in related U.S. Appl. No. 17/160,131.
Examination Report mailed in related EP Application No. 21702459.5 dated Jul. 11, 2023, 13 pages.
Chinese Office Action mailed in related CN Application No. 202180025203.4 dated Mar. 27, 2023 (with translation), 15 pages.
Non-Final Office Action mailed in related U.S. Appl. No. 17/558,892 dated Jun. 23, 2023, 20 pages.

* cited by examiner

300

| Competency | | Question/Stimulus | |
|---|---|---|---|
| Motivation | 302a | Describe the work environment in which you are most productive and gives you the most satisfaction. | 302b |
| Ambition | 304a | Why have you chosen flying as a career and what career goals have you set for yourself? | 304b |
| Self-awareness | 306a | What areas of your own development do you think you will have to work on to succeed on this program? | 306b |
| Resilience | 308a | Give us an example of a setback you encountered and how you bounced back? | 308b |

FIG. 3

| Relevance: Enabler per Question | | | Enablers | | | | | | | | |
|---|---|---|---|---|---|---|---|---|---|---|---|
| | Question | Collaborate | Acts with | Attends to | nE | nE | nE | nE | nE | nE | nE |
| Tell me about a time when you supported a colleague in solving a complex problem. | 1 | 4 | | | | | | | | | |
| Tell me about a time you shared credit for your success with others. | 2 | | 5 | | | | | | | | |
| Describe a time when you had to follow detailed instructions to complete a task. ▶ | 3 | | | 5 | | | | | | | |
| Describe a time when you had to follow detailed instructions to complete a task. | 4 | | | | | | | | | | |
| Describe a challenging task or project you completed that required a high degree of accuracy or prec | 5 | | | | | | | | | | |
| Tell me about a time you missed a significant detail while working on an important project or assignm | 6 | | | | | | | | | | |
| Describe a time when you created a plan for a multi-phase or multi-part project that required significa | 7 | | | | | | | | | | |
| Describe a time when you had to perform a task that required careful attention to detail and quality. | 8 | | | | | | | | | | |
| Describe a work assignment that required close attention to a variety of details and the steps you too | 9 | | | | | | | | | | |
| Provide an example of a complex task you completed that required significant attention to detail. | 10 | | | | | | | | | | |
| Tell me about a situation that required careful planning and organization to ensure a challenging dea | | | | | | | | | | | |
| nQ | | | | | | | | | | | |

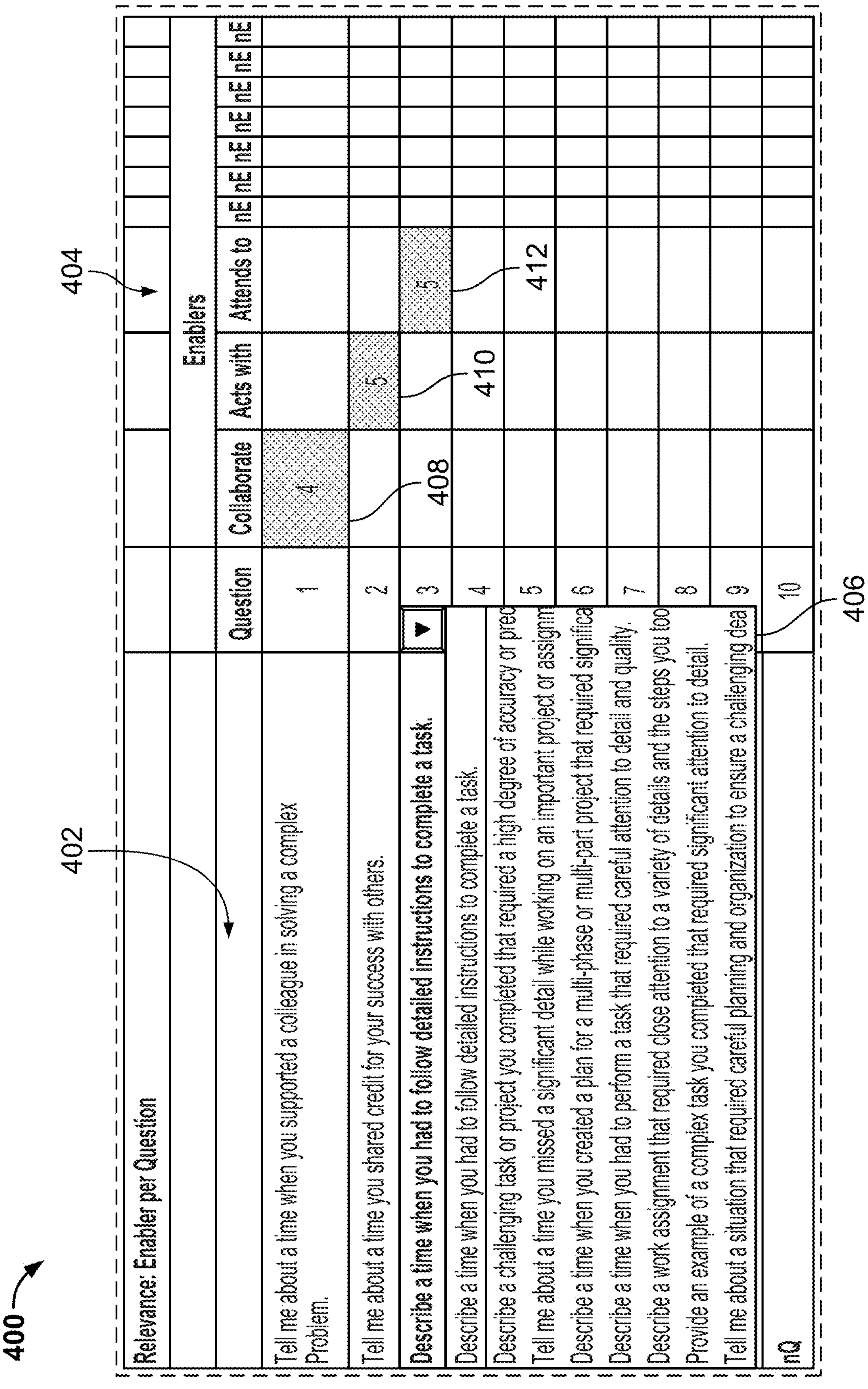

| Weighting: Aspect per Enabler | | | | | | | | | | | |
| --- | --- | --- | --- | --- | --- | --- | --- | --- | --- | --- | --- |
| | | Enabler | | | | | | | | | |
| | Aspect | Collaborate | Acts with | Attends to | nE | nE | nE | nE | nE | nE | nE |
| Drive | 1 | | | | | | | | | | |
| Structure | 2 | | | 5 | | | | | | | |
| Conceptual | 3 | | | 602 | | | | | | | |
| Flexibility | 4 | | | | | | | | | | |
| Mastery | 5 | | | | | | | | | | |
| Ambition | 6 | | | | | | | | | | |
| Power | 7 | | | | | | | | | | |
| Assertiveness | 8 | | | | | | | | | | |
| Liveliness | 9 | | | | | | | | | | |
| Composure | 10 | | | | | | | | | | |
| Positivity | 11 | 604 | | | | | | | | | |
| Awareness | 12 | | | | | | | | | | |
| Cooperativeness | 13 | 5 | 606 | | | | | | | | |
| Sensitivity | 14 | | | | | | | | | | |
| Humility | 15 | | 5 | | | | | | | | |

| Competency | Conceptual | Flexibility | Mastery | Drive | Structure | Assertiveness | Liveliness | Composure | Positivity | Awareness | Cooperativeness | Sensitivity | Humility | Ambition | Power |
|---|---|---|---|---|---|---|---|---|---|---|---|---|---|---|---|
| motivation | | | | 3 | | | 1 | | | | | | | | |
| ambition | 1 | | 2 | | | | | | | | | | | 3 | |
| self-awareness | | 1 | | | 1 | | | | | 3 | | | | | |
| resilience | | | | | | 1 | | 3 | 1 | | | | | | |

Aspect

Mapping Aspects on Competencies

| Questions | Conceptual | Flexibility | Mastery | Drive | Structure | Assertiveness | Livelineness | Composure | Positivity | Awareness | Cooperativeness | Sensitivity | Humility | Ambition | Power | Aspect |
|---|---|---|---|---|---|---|---|---|---|---|---|---|---|---|---|---|
| Give us an example of a setback you encountered and how you bounced back? | 0.00 | 0.11 | 0.00 | 0.00 | 0.11 | 0.33 | 0.00 | 1.00 | 0.33 | 0.33 | 0.33 | 0.00 | 0.00 | 0.00 | 0.00 | |
| What areas of your own development do you think you will have to work on to succeed on this program? | 0.00 | 0.33 | 0.00 | 0.33 | 0.33 | 0.00 | 0.11 | 0.00 | 0.00 | 0.00 | 1.00 | 0.00 | 0.00 | 0.00 | 0.00 | |
| Why have you chosen flying as a career and what career goals have you set for yourself? | 0.33 | 0.11 | 0.57 | 0.00 | 0.11 | 0.00 | 0.00 | 0.00 | 0.00 | 0.00 | 0.33 | 0.00 | 0.00 | 1.00 | 0.00 | |
| Describe the work environment in which you are most productive and gives you the most satisfaction. | 0.00 | 0.00 | 0.00 | 1.00 | 0.00 | 0.11 | 0.33 | 0.33 | 0.11 | 0.11 | 0.00 | 0.00 | 0.00 | 0.00 | 0.00 | |

Position A

Describe the work environment in which you are most productive and gives you the most satisfaction. *902*

Complete *910*

Tell us about the last time you had to take responsibility for your actions. *904*

Not Started *912*

What areas of your own development do you think you will have to work on to succeed in this program? *906*

ERROR: File Size *914*

Give us an example of a setback you encountered and how you bounced back. *908*

Complete *916*

Submit *918*

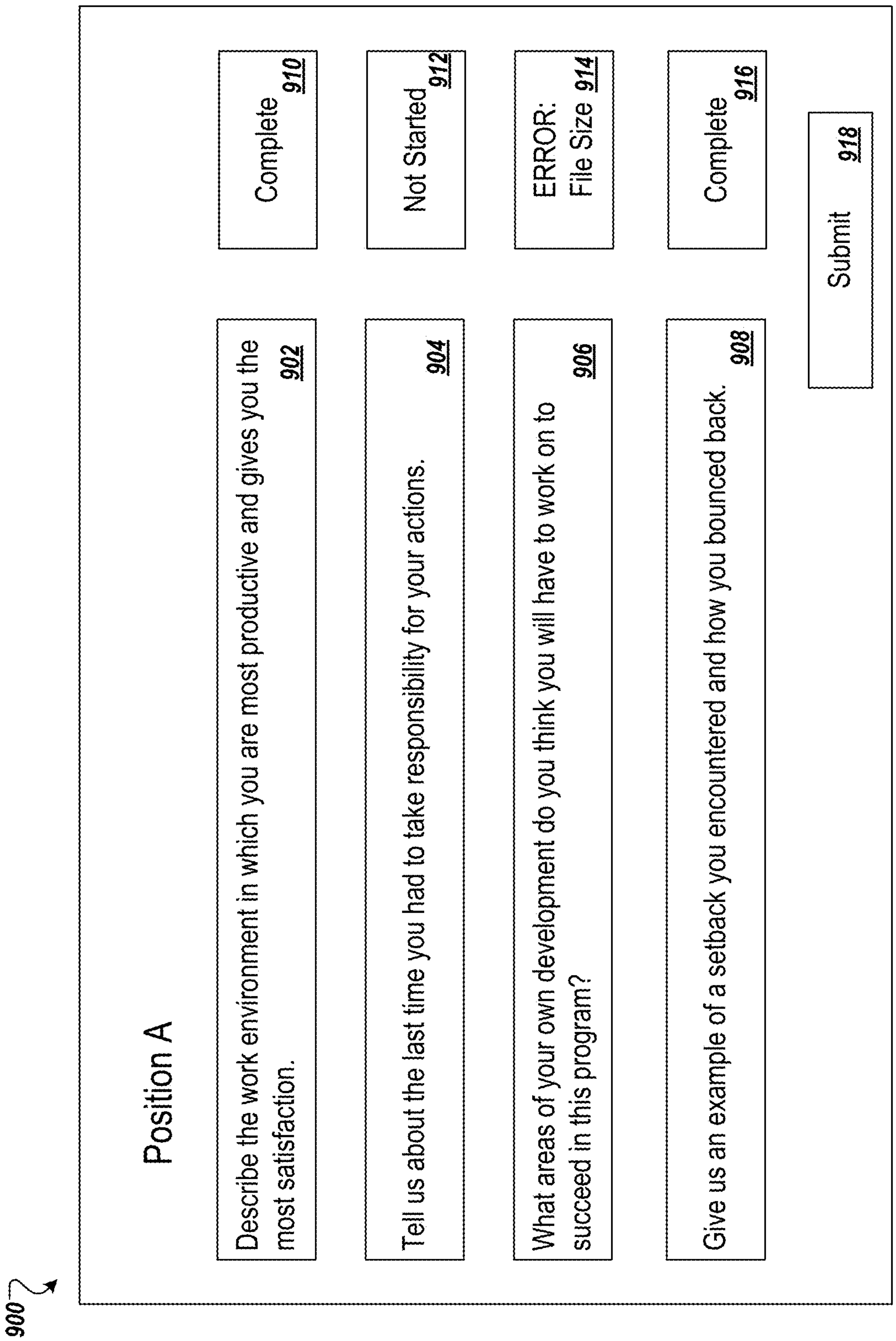

| NLC | | |
|---|---|---|
| Classifier | Conscientiousness- Positive | Conscientiousness- Negative |
| Identifiers | Organized | Disorderly |
| | Precise | Careless |
| | Responsible | Inefficient |
| | Thorough | Impractical |
| | Efficient | Unreliable |
| | Orderly | Inconsistent |
| | Self-disciplined | Undependable |
| | Practical | Aimless |
| | Systematic | Illogical |
| | Dependable | Sloppy |

| | Positive Indication | Negative Indication | Relevance of Stimulus | | Score | Evidence |
|---|---|---|---|---|---|---|
| 1402 | 0 | 0 | 0 | | 0 | 0 |
| 1404 | 0 | 0 | 1 | | -1 | 1 |
| 1406 | 0 | 1 | 0 | | -1 | 1 |
| 1408 | 0 | 1 | 1 | | -1 | 1 |

FIG. 14

Interview questions | Interview text

Select the questions for this interview

To select a question tick the check box at the end of the line. To deselect a question, tick the box again.
To change the order of questions, take a question on the arrow icon and move it to the new location.
The little 'filter' allows you filter this view (show only selected or unselected questions).

[← Return]                                                                 [▽▼] ⌐2310

Example question

5208 | Standard question: Welcome!                                      2302
     | Question: [⏱ 1min 0sec] [☐ 10sec - 3min 0sec]

Standard question

5209 ✥ | Virtual Case Study: Case Study                                 2304
      | Content: [↻ 1] [⏱ 10min 0sec]

5211 ✥ | Video question:-                                               2306
      | Content: [↻ 1] [⏱ 10min 0sec]
      | Question: [↻ 1] [⏱ 1min 0sec] [☐ 10sec - 3min 0sec]

5212 ✥ | Standard Question:-                                            2308
      | Question: [↻ 1] [⏱ 1min 0sec] [☐ 10sec - 3min 0sec] [⊕ Criteria]

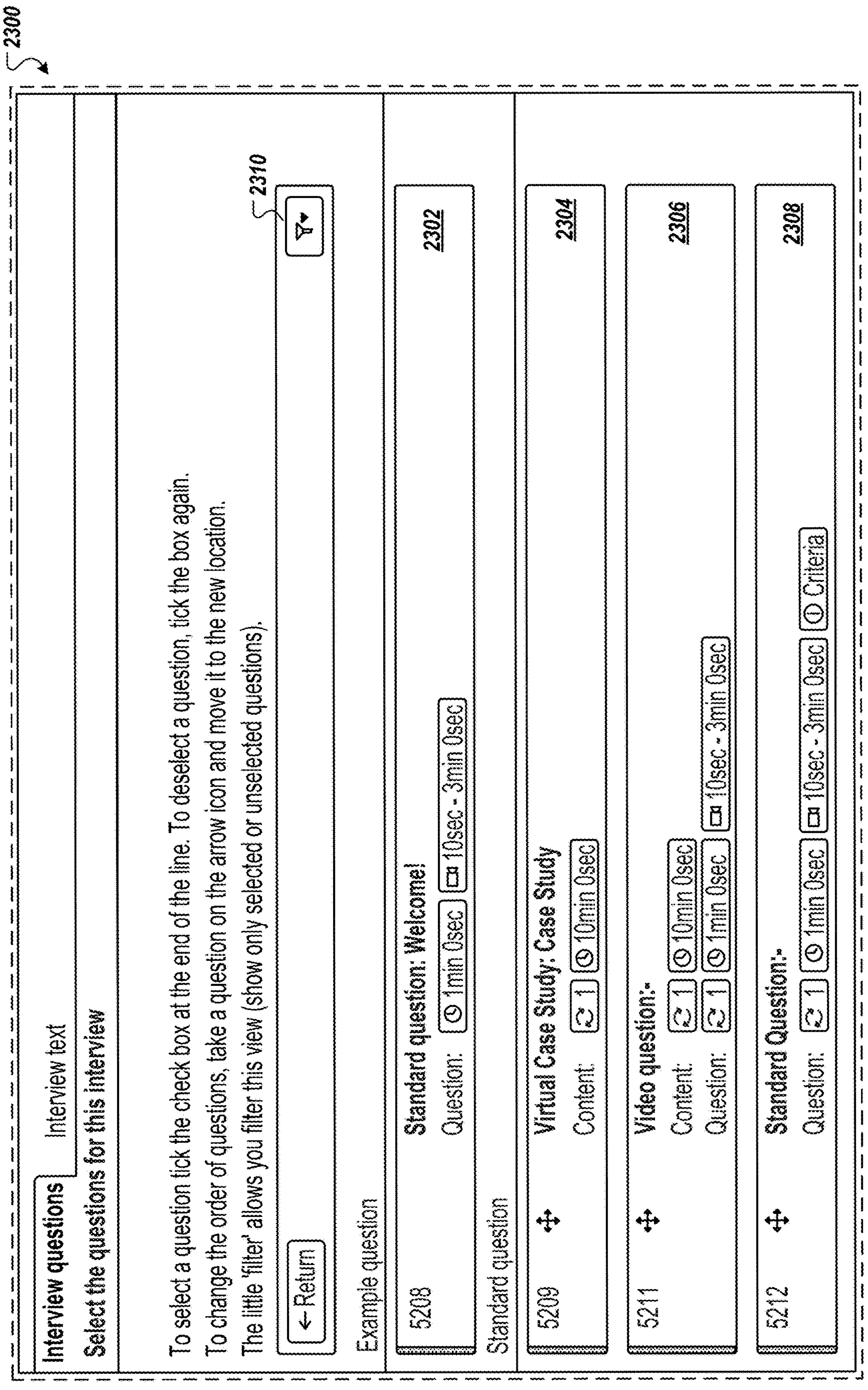

FIG. 23

SYSTEMS AND METHODS FOR AUTOMATIC CANDIDATE ASSESSMENTS

RELATED APPLICATIONS

This application is a continuation of and claims priority to U.S. patent application Ser. No. 17/160,131 entitled "Systems and Methods for Automatic Candidate Assessments in an Asynchronous Video Setting" and filed on Jan. 27, 2021, which claims priority to U.S. Provisional Application Ser. No. 62/967,443 entitled "Systems and Methods for Automatic Candidate Assessments in an Asynchronous Video Setting" and filed on Jan. 29, 2020. This application is related to U.S. Provisional Application Ser. No. 62/967,451 entitled "Systems and Methods for Automating Validation and Quantification of Interview Question Responses" and filed on Jan. 29, 2020 and U.S. patent application Ser. No. 17/160,165 entitled "Systems and Methods for Automating Validation and Quantification of Interview Question Responses" and filed on Jan. 27, 2021. All above identified applications are hereby incorporated by reference in their entireties.

BACKGROUND

Job interviews are one of the oldest and most used employee selection methods Classically, an interview consists of a face to face conversation between the candidate and one or more interviewers. During the conversation the interviewer tries to obtain genuine information about the candidate's skills and suitability for the job in order to make the right employment decision. The candidate, on the other side, is trying to show they are well suited to fill the vacant position. Due to its conversational and structurally conflictual nature, the job interview has to be described as an interactional event.

Technology deeply impacts the way we interact with others. Throughout history new communication channels have shaped personal interactions and—with the advent of internet and mobile technology—this development has become even faster and more pervasive. Job interviews have not been the exception and have been adapted to new technologies to benefit from reduced costs and increased efficiency. Telephone interviews and video conferences are both well-known examples of the use of technology in job interview settings.

Video interviews can be one-way or two-way interactions. In a one-way video asynchronous video interview (AVI), the applicant does not interact with a live interviewer. Interview questions are presented virtually on a computer, tablet, or smartphone with webcam and audio capabilities. The applicant goes through a series of questions, presented one by one, to which they must immediately respond verbally within a given time limit. However, with all human evaluation mechanisms, it is impossible to remove bias from the reviewers' evaluations of candidates. Additionally, because there is no immediate feedback mechanism for candidates in one-way video interviews, it can be difficult to prevent candidates from submitting responses of poor data quality or that fail to answer the questions being asked. The present inventors have identified these difficulties with one-way video interview and assessment systems, and the present disclosure is directed to systems and methods of video assessment that do not suffer from these deficiencies.

SUMMARY OF ILLUSTRATIVE EMBODIMENTS

In some embodiments, systems and methods for performing automated candidate video assessments include receiving, from a remote computing device of a first party via a network, a candidate video submission for an available position. The candidate video submission can include one or more question response videos, where each video responds to a respective interview question associated with the available position.

In some implementations, for each of the one or more question response videos, the system can generate a transcript of the respective question response video by applying a speech-to-text algorithm to an audio portion of the respective question response video. In some examples, the speech-to-text algorithm is trained with a customized dictionary of terms associated with a plurality of personality aspects of a personality model that indicate an aptitude of the candidate for the available position. In some embodiments, the system can detect, within the transcript for the respective question response video, a plurality of identifiers each associated with one or more of the personality aspects of the personality model. In some examples, detecting the plurality of identifiers can include applying a natural language classifier to the transcript. The natural language classifier can be trained to detect words and phrases associated with the plurality of personality aspects of the personality model, and detecting the plurality of identifiers can include grouping each of the plurality of identifiers according to which of the plurality of personality aspects the respective identifier is associated with.

The system can calculate, based on the groupings of each of the detected identifiers for each of the plurality of personality aspects, scores for each of the plurality of personality aspects, based on a relevance of the respective personality aspect to the respective interview question and a number of detected identifiers within the grouping for the respective personality aspect. In some embodiments, the system can generate, from the scores for each of the plurality of personality aspects for each of the one or more question response videos, combined personality aspect scores for an entire interview including the one or more interview questions. At least one of the combined personality aspect scores or a portion of the scores for each of the plurality personality aspects in each of the one or more question response videos can be presented within a user interface screen of a second remote computing device of a second party responsive to receiving a request to view candidate interview results.

The foregoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 3 is a table illustrating interview questions associated with position competencies;

FIG. 4 is a table for selecting and mapping interview questions to enabler attributes;

FIG. 6 is a table showing a mapping of personality aspects to enabler attributes for a position;

FIG. 7 is a table showing a mapping of personality aspects to competencies for a position;

FIG. 8 is a table showing a mapping of interview questions to personality aspects for a position;

FIG. 9 illustrates a question summary user interface screen;

FIG. 11 is a table of positive and negative identifiers for a personality aspect;

FIG. 14 is a table of candidate scoring data;

FIG. 23 illustrates a question selection user interface screen.

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Aspects of the present disclosure are directed to a video assessment system for automating candidate interviews for employers. In some embodiments, the system is configured to automatically generate transcripts from submitted video interviews and detect predetermined personality aspects from a personality model within the transcripts using a trained natural language classifier. In some examples, the system can apply a candidate scoring methodology customized to the personality model that takes into account the amount of evidence in the transcript, the number of detected personality aspect identifiers, and a score confidence. These assessment methods use a unique model and process for automatically identifying the best candidates for a job without introducing human biases and errors. In some implementations, the video assessment system generates customized mappings of interview questions targeting the specific personality that can accurately predict whether a particular candidate is well-suited to a particular job. The customized data structure of the interview question mappings improves processing efficiency of the system candidate score calculations. For all of these reasons, the implementations of the present disclosure provided herein are a significant improvement over manual, conventional methods of performing candidate video assessments and are necessarily rooted in computer technology.

Figure 1:
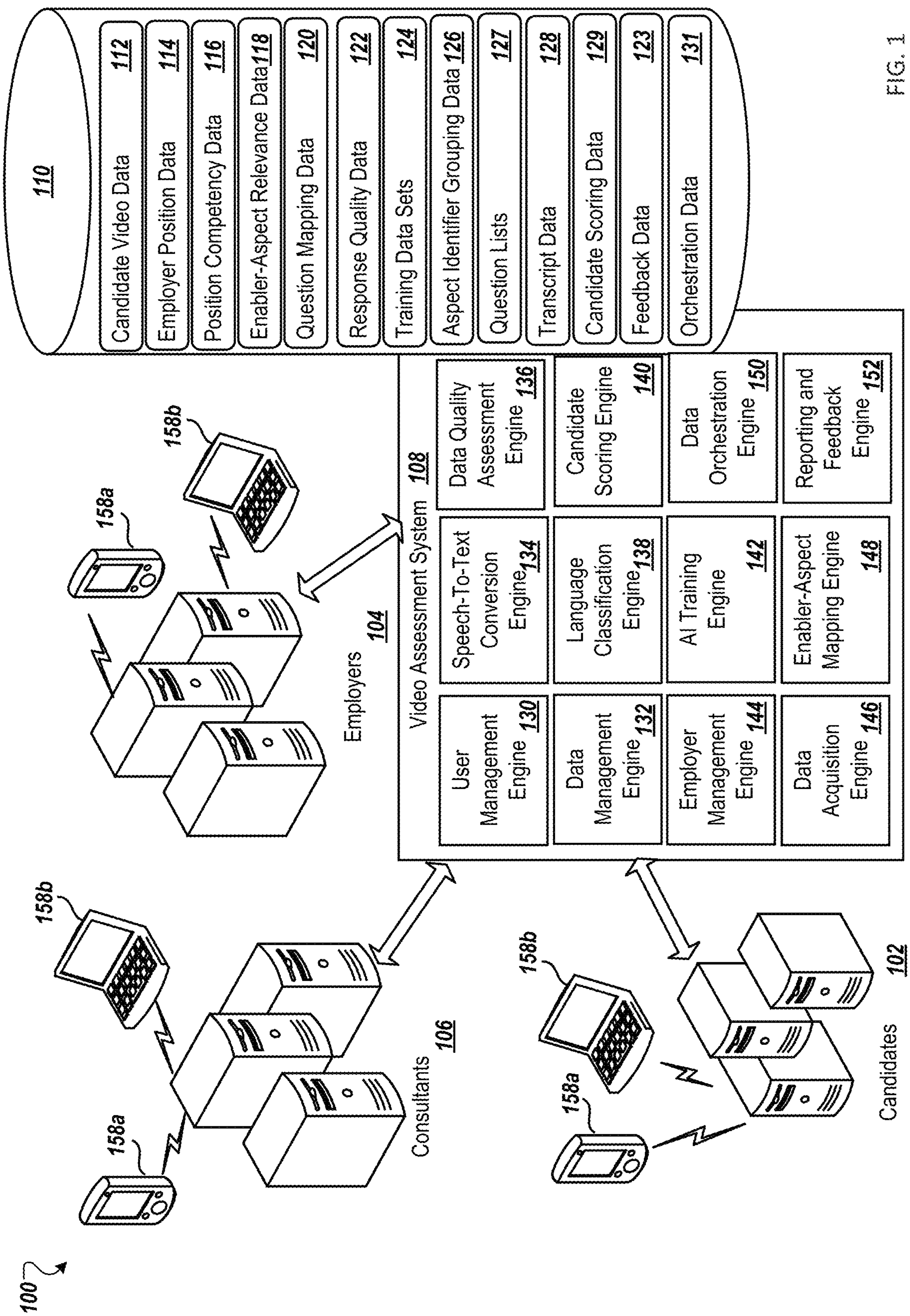
FIG. 1 is a block diagram of an example environment for a video assessment system.

FIG. 1 is a diagram of an example environment 100 for a video assessment system 108. The diagram illustrates relationships, interactions, computing devices, processing modules, and storage entities used to gather, generate, organize, store, and distribute the information necessary to automatically, accurately, and efficiently process interview question responses received from candidates for one or more available jobs without any bias that comes from human input. In some implementations, the video assessment system 108 can provide employers 104 with the ability to define customized competency descriptions for one or more available jobs and identify interview questions associated with the defined job competencies. The system 108, in some embodiments, automatically converts the identified job competencies and interview questions into customized interview mappings that map the questions and competencies onto a set of personality aspects associated with a personality model.

When a candidate 102 submits video responses to the identified interview questions, the video assessment system 108, in some implementations, generates question response transcripts by performing speech-to-text conversion on an audio portion of each of the video files to create interview question transcripts. In some examples, a natural language classifier can be specifically trained to detect positive and negative polarizations of the personality aspects from the personality model within an interview question transcript. In some embodiments, the video assessment system 108 uses detected occurrences of each of the personality aspects in each of the interview question transcripts to compute scores for each of the personality aspects. Based on the computed scores, in some examples, the system 108 can determine how well suited a candidate is, or how much aptitude the candidate has, for a particular job.

In certain embodiments, candidates 102 may connect to the video assessment system 108 via a number of computing devices distributed across a large network that may be national or international in scope. The network of candidates 102 can be separate and independent from networks associated with other entities in the video assessment environment 100, such as the providers 104 and consultants 106. In addition, the data handled and stored by the candidates 102 may be in a different format than the data handled and stored by the other entities of the video assessment environment 100. The candidates 102 may include, in some examples, prospective and actual job applicants for any available jobs created in the system 108 by providers 104.

Employers 104, in some implementations, include a number of computing devices distributed across a large network that may be national or international in scope. The network of employers 104 can be separate and independent from networks associated with other entities in the video assessment environment 100, such as the candidates 102 and consultants 106. In addition, the data handled and stored by the employers 104 may be in a different format than the data handled and stored by the other participants of in the video assessment environment 100. In some implementations, the employers 104 can include large-scale of small-scale companies who wish to use the video assessment system 108 to automatically screen and score candidate video interview submissions. In some examples, the employers 104 interact with one or more system-generated user interface screens to identify interview questions and define ideal competencies, attributes, and personality traits of an ideal employee that can be used by the system to automatically assess how well suited a particular candidate is for a job.

Consultants 106, in some implementations, include a number of computing devices distributed across a large network that may be national or international in scope. The network of consultants can be separate and independent from networks associated with other entities in the video assessment environment 100, such as the candidates 102 and employers 104. In addition, the data handled and stored by the consultants 106 may be in a different format than the data handled and stored by the other participants of in the video assessment environment 100. In some examples, consultants 106 can be back-end system administrators who are knowledgeable about how to select competency, enabler attributes, and interview questions to best identify the candidates who are well-suited to a particular job submitted by an employer 104. In some examples, the consultants 106 can interact with employers 104 via one or more system-provided user interface screens to help the employers 104 select competencies, enabler attributes, and interview questions for a respective position.

In some embodiments, the video assessment system 108 may include one or more engines or processing modules 130, 132, 134, 136, 138, 140, 142, 146 that perform processes associated with generating personality aspect mappings to questions for available positions and performing video assessments of submitted candidate interview videos based on the generated personality aspect mappings. In some examples, the processes performed by the engines of the video assessment system 108 can be executed in real-time to provide an immediate response to a system input such as a request by an employer 104, consultant 106, and/or candidate 102 to obtain processed information from the system 108. For example, the system 108 can convert video submissions to text transcripts, detect personality aspects from a personality model using a trained natural language classifier, and score candidate interview responses in real-time in response to receiving a candidate video interview submission.

In some implementations, the video assessment system 108 may include a user management engine 130 that may include one or more processes associated with providing an interface to interact with one or more users (e.g., individuals employed by or otherwise associated with employers 104 and consultants 106 as well as candidates 102) within the video assessment environment 100. For example, the user management engine 130 can control connection and access to the video assessment system 108 by the candidates 102, employers 104, and consultants 106 via authentication interfaces at one or more external devices 158. In some examples, the external devices 158 may include, but are not limited to, personal computers, laptop/notebook computers, tablet computers, and smartphones. In some implementations, the user management engine 130 controls which system data is displayed to which system user. For example, the user management engine 130 associates candidate interview responses with an available position for a particular employer 104 such that only information associated with jobs submitted by the respective employer 104 are displayed for viewing and feedback by a particular employer 104 based on received authentication credentials.

The video assessment system 108, in some examples, may also include a data management engine 132 that organizes, stores, and controls access to data in data repository 110. For example, in response to receiving position competency data inputs from an employer 104, the data management engine 132 can link the competency data 116 to respective employer position data 114. Similarly, the data management engine 132 can also link enabler-aspect relevance data 118 and question mapping data 120 to the respective employer position data 114 within data repository 110. In some implementations, the data management engine 132 can also link all information related to a particular candidate interview and a particular question response within data repository 110. For example, the data repository 110 can link candidate scoring data 129 to respective transcript data 128 for a candidate video interview submission. Additionally, the data management engine 132 can also be configured to compile updated training data (for example, from newly calculated candidate scores and submitted feedback from employers) into the training data sets 124.

In some implementations, the video assessment system 108 can also include an employer management engine 144 that controls interactions between the system 108, employers 104, and consultants 106. In some embodiments, the employer management engine 144 receives inputs from employers regarding one or more available employment positions via one or more user interface (UI) screens. In some examples, the UI screens may provide a series of drop-down or selection windows that allow the employers 104 to select the available positions from a list of commonly selected or previously provided positions. For example, a financial firm may have repeatedly occurring openings for financial analysts or a retail company may often solicit applications for in-store cashiers or customer service representatives. In some embodiments, the UI screens can also include free text input fields that allow employers 104 to provide information regarding a new open position. In some examples, the employer 104 can also provide administrative details regarding the identified available positions such as years of experience, education qualifications, and projected start date. Upon submission via the UI screens, the available position information is saved as employer position data 114 in data repository 110. In some implementations, the employer position data 112 for a given employer 104 can include tables or lists of all positions currently and previously provided by the employer 104.

The employer management engine 144, in some implementations, can also provide UI screens to computing devices 158 of employers 104 to identify competencies associated with each identified available position. A set of identified competencies for a particular position can be referred to as a competency model for the position, which is stored as position competency data 116 in data repository 110. The position competency data 116 can be linked to respective employer position data 114 based on the employer 104 defining the competency model for a position. In some examples, the competencies can be any skill or attribute that an employee for the available should possess. For example, competencies for a position identified by an employer 104 can include, but are not limited to, motivation, ambition, self-awareness, and resilience. In some examples, if the employer 104 has used the video assessment system 108 for the same type of position in the past, the employer management engine 144 can auto-populate a competency identification UI screen with the previously identified competencies for the position. The employer 104 can in turn modify the list of competencies in the competency model by adding or removing competencies from the competency model or can accept the previously used list of competencies.

In some aspects, a competency may be relevant to all positions for the employer 104 (e.g., integrity), but another competency may only be relevant to one or a few positions (e.g., detail-oriented for data analyst positions or leadership for managerial positions). In some implementations, the stored position competency data 116 can include information regarding which competencies are applicable to all, some, or one position of a given employer. Additionally, the employer management engine 144, can auto-populate the competency model for a newly created position with the competencies commonly linked to all and/or certain types of positions associated with the employer 104 based on the position competency data 116. In some examples, the employer management engine 144 may also use competency model information for positions of other employers 104 to identify competency suggestions for an available position. For example, the employer management engine 144 can identify competency trends across different types of positions for all of the employers 104 that use the video assessment system 108 to process and assess job applicant interviews and provide any identified trends to the employer 104. For example, the employer management engine 144 may determine that employers 104 identify assertiveness as a competency for manager positions and in turn suggest assertiveness as a competency if an employer 104 submits available position information for a manager.

In some embodiments, in response to receiving a set of competencies for an available position from an employer 104, the employer management engine 144 can generate one or more UI screens for mapping each identified competency to one or more enabler attributes. In some examples, enabler attributes are sets of standardized attributes that provide a translation or conversion mechanism for translating employer-identified competencies into personality aspects that can be automatically identified from an interview transcript by a language classification engine 138 implementing a specially trained natural language classifier (NLC). In some examples, employers 104 and consultants 106 can interact with each other via one or more system-provided UI screens, which allows the consultants 106 to educate and assist the employers 104 in identifying the appropriate enabler attributes for each of the competencies in the competency model for the position. If a particular competency has been previously identified by the employer 104 for another position or a previous iteration of the same position, then the employer management engine 144 may provide the previous enabler attribute mappings as suggested enabler attributes for one or more of the identified competencies.

Figure 2:
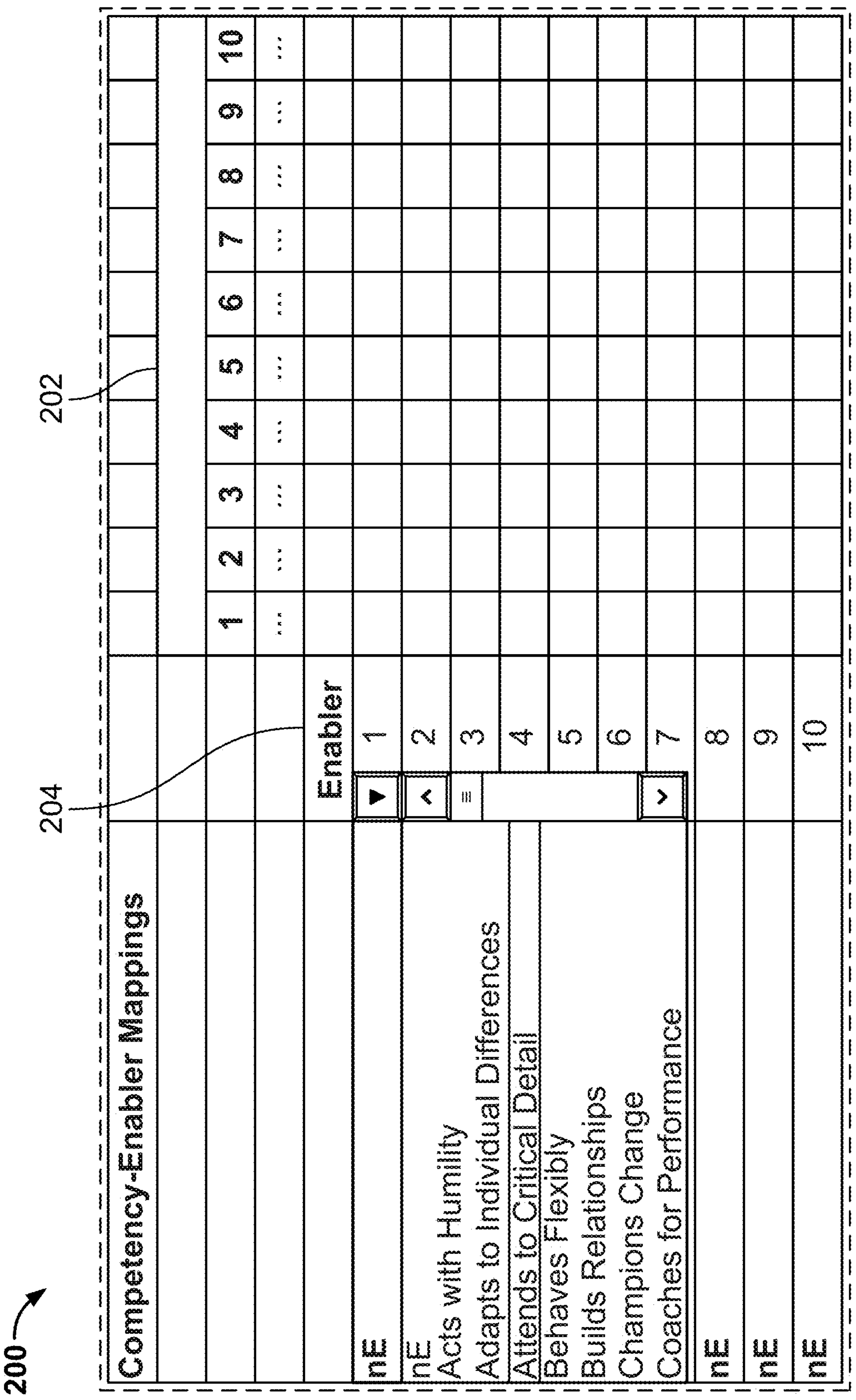
FIG. 2 is a table for mapping position competencies to enabler attributes.

FIG. 2 shows a competency-enabler mapping table 200 for an available position provided to the employer at a UI screen. For each competency 202 identified for an available position, the employer 104 can select one or more enabler attributes 204 from a dropdown menu provided in the UI screen. Examples of enabler attributes 204 include "acts with humility," "adapts to individual differences," "attends to critical detail," "behaves flexibly," "builds relationships," "champions change," and "coaches for performance." In one example, an identified competency of "self-awareness" may be mapped to the enabler attribute of "acts with humility."

Returning to FIG. 1, in some implementations, in response to receiving competency-enabler attribute selections, the employer management engine 144 produces an interview question selection UI screen that allows employers 104, with or without the assistance of consultants 106, to select interview questions for the position that align with each of the employer-identified competencies. For example, FIG. 3 provides a set of interview questions or prompt 300 where each question/prompt is associated with a particular competency from the competency model for a position. For example, a prompt 302*b* of "Describe the work environment in which you are most productive and gives you the most satisfaction" is identified for the competency of motivation 302*a*. A question 304*b* of "Why have you chosen flying as a career and what career goals have you set for yourself?" corresponds to the competency of ambition 304*a*. A question 306*b* of "What areas of your own development do you think you will have to work on to succeed on this program?" corresponds to a competency of self-awareness 306*a*. A prompt 308*b* of "Give us an example of a setback you encountered and how you bounced back" corresponds to a competency of resilience 308*a*. In some implementations, each question can be mapped to multiple competencies and/or enabler attributes, which allows the system 108 to automatically detect multiple personality aspect identifiers within a single question response. Additionally, as discussed further below, the system 108 can weight each competency associated with a question differently based on the relevance of the competency to the question, which further allows for a customized, automated solution for accurately identifying the best candidates 102 for available positions in an unbiased manner.

In some implementations, the interview question selection UI screen provides sets of questions for selection based on the identified enabler attributes. For example, FIG. 4 shows a question-enabler mapping table 400 that allows employers 104 to select interview questions 402 associated with each of the identified enabler attributes 404. For each enabler attribute 404 identified for an available position, the employer 104 can select one or more interview questions 402 from a dropdown menu provided in the UI screen. For example, for the employer attribute of "attends to," dropdown menu 406 provides a set of possible interview questions including "Describe a time when you had to follow detailed instructions to complete a task" and "Describe a time when you had to perform a task that required careful attention to detail and quality." By selecting interview questions targeted to the identified enabler attributes from the competency-enabler mapping, the questions are also tailored to the identified competencies. Additionally, the employer 104 can select more than one enabler attribute to map to a single interview question.

In some implementations, questions lists 127 are stored in data repository 110 that are used to populate the dropdown menu 406 for each question selector in the question-enabler mapping table 400. These question lists 127, in some examples, are linked to specific enabler attributes 408, 410, 412 so that when an enabler attribute is linked to a competency for a position, the employer management engine 144 automatically populates the list of possible questions in the dropdown menu for the respective enabler attribute. In some implementations, each question in the question lists 127 is stored with information regarding the respective question's relevance to each possible enabler attribute. For example, a question of "Tell me about a time when you supported a colleague in solving a complex problem" can be linked to an enabler attribute of "collaborate" 408. A question asking, "Tell me about a time you shared credit for your success with others" can be linked to an enabler attribute of "acts with humility" 410. A question asking, "Describe a time when you had to follow detailed instructions to complete a task" can be linked to an enabler attribute of "attends to critical detail" 412. In some implementations, each question selected from the dropdown menu 406 can be mapped to multiple enabler attributes, which allows the system 108 to automatically detect multiple personality aspect identifiers within a single question response. Additionally, as discussed further below (for example, see FIG. 8), the system 108 can weight each enabler attribute associated with a question differently based on the relevance of the enabler attribute and/or competency to the question, which further allows for a customized, automated solution for accurately identifying the best candidates 102 for available positions in an unbiased manner. For example, the question asking, "Tell me about a time you shared credit for your success with others can be linked to the enabler attribute of "builds relationships" in addition to "acts with humility" 412. In one example, the relevance is scored on a scale from three to five with five being a highly relevant question. As can be understood, any type of scale or range of scores can be applied to the amount of relevance of interview questions to enabler attributes (e.g., percentage, high/medium/low, one to ten, one to five). When a question 402 is selected at the question-enabler mapping table 400, the employer management engine 144 automatically populates the relevance to any applicable enabler 404. For example, in the table 400, the question "Tell me about a time when you supported a colleague in solving a complex problem" has a relevance value of 4 for the enabler attribute of "collaborate" 408. Additionally, the question "Tell me about a time when you shared credit for your success with others" has a relevance value of 5 for the enabler attribute of "acts with humility" 410. In an example where more than one enabler attribute is linked to a particular question, the employer management engine 144 determines respective relevance values for each enabler attribute.

Additionally, the employer management engine 144 may arrange the set of questions in the dropdown menu 406 according to how frequently each question is selected for use as an interview question and/or the relevance of the question to one or more of the enabler attributes. In some embodiments, employers 104 and/or consultants 106 can also provide their own interview questions that are not provided in one of the dropdown menus. When the employer 104 provides one of these manually input interview questions, the employer 104 also provides enabler attribute mapping information for the question.

In addition, FIG. 23 illustrates a question selection user interface screen 2300 that allows employers 104 to customize interview questions to the personality traits they are looking for in candidates for available employment positions. For example, the user interface 2300 can display one or more selectable questions 2302, 2304, 2306, 2308 that the employer 104 can select/de-select by clicking on the respective question 2302, 2304, 2306, 2308. The user interface screen 2300 can include at least one filter input 2310 that allows users to filter displayed questions based on type, competency, and/or aspect. In addition, once a set of questions 2302, 2304, 2306, 2308 is selected, users can select and reposition questions to be in a desired order. In addition to different questions targeting different competencies and/or personality aspects, employers 104 can select different question formats at the user interface screen 2300. For example, question 2302 may be an interview welcome question that asks some basic background informational questions of the candidate. Question 2304 is a virtual case study question that presents candidates with a case study scenario to respond to. Question 2306 is a video question that provides a video for a candidate to watch and respond to. For example, the video can provide history, context, or a scenario that is associated with the question the candidate is answering. Question 2308, in some implementations, is a standard question that displays and/or reads (e.g., audio output) the question to the candidate, who in turn provides a response.

In some examples, a question can include a broad question that also contains multiple additional probing questions that help guide the candidate to providing the desired information. One example for a question is: "Describe a time you resolved a major problem by using your communication skills". To help candidates craft a thorough response containing relevant information, this question comes with the following four additional probes: "What was the situation?", "How was the information communicated?", "What did you do to resolve the issue?", and "What was the outcome?".

Returning to FIG. 1, in some implementations, the video assessment system 108 also has an enabler-aspect mapping engine 148 that automatically maps each of the identified enabler attribute to personality aspects that can be detected from an interview transcript using a specially trained natural language classifier. As discussed further below, AI training engine 142 trains a natural language classifier implemented by language classification engine 138 to automatically detect sets of positive and negative personality aspects that can be indicative of how well a candidate is suited to a particular position.

Figure 5:
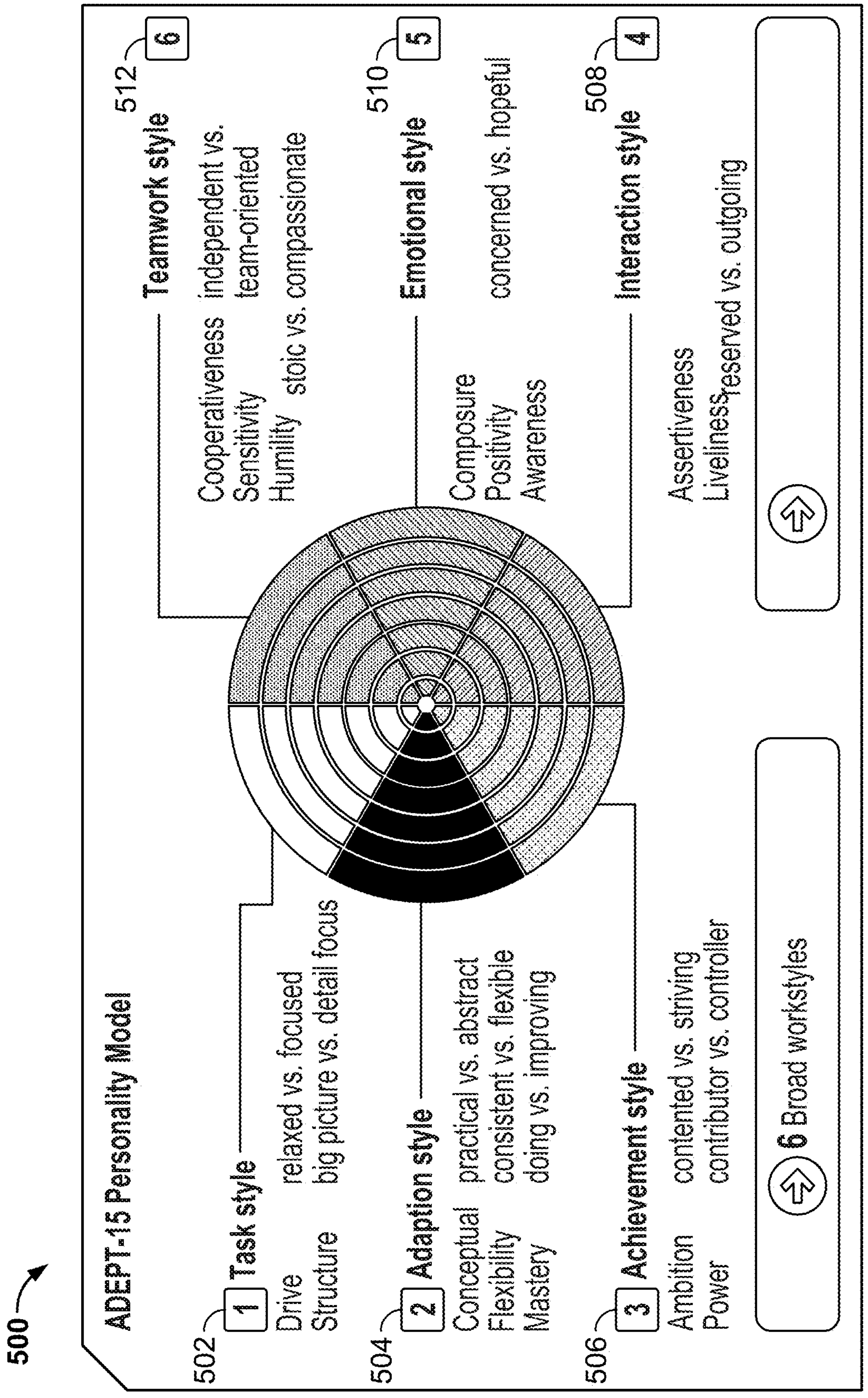
FIG. 5 is a diagram illustrating personality aspects for workstyles in a personality model.

FIG. 5 illustrates a set of personality aspects in a candidate personality model 500 that the video assessment system 108 is trained to detect. In some examples, each of the personality aspects in a respective workstyle category 502-512 includes both positive and negative indications that are detectable by the natural language classifier. In some implementations, the aspects in the personality model 500 can be organized into one or more workstyle categories 502-512. For example, a workstyle category 502 of task style can include the personality aspects of "drive" and "structure." An adaptation style category 504 can include personality aspects of "conceptual," "flexibility," and "mastery." Achievement style category 506 can include personality aspects of "ambition" and "power." Interaction style category 508 can include personality aspects of "assertiveness" and "liveliness." Emotional style category 510 can include personality aspects of "composure," "positivity," and "awareness." Teamwork style category 512 can include personality aspects of "cooperativeness," "sensitivity," and "humility."

FIG. 6 shows an enabler-aspect mapping table 600 that illustrates how the enabler-aspect mapping engine 148 maps each of the enablers associated with the identified position competencies to one or more of the aspects in the personality model 500. As part of an enabler-aspect mapping process, the enabler-aspect mapping engine 148 also applies a relevance value to each enabler-aspect pair based on how closely correlated an aspect is to a respective enabler. In one example, relevance for each enabler attribute-aspect pair is scored on a scale from one to five with five indicating a highest amount of relevance between the enabler-aspect pair. As can be understood, any type of scale or range of scores can be applied to the amount of relevance of interview questions to enabler attributes (e.g., percentage, high/ medium/low, one to ten). In some implementations, the enabler-aspect mapping engine 148 accesses the relevance score for a respective enabler-aspect pair from enabler-aspect relevance data 118 stored in data repository 110. In some implementations, the enabler-aspect relevance data 118 is based on personality-based research and is manually loaded into the data repository 110. In some implementations, the enabler-relevance aspect data 118 can also be updated over time based on feedback received from employers 104 and/or consultants 106 as well as updated training set data for the natural language classifier. As shown in FIG. 6, the enabler-aspect pair 602 for aspect "structure" has a relevance value of 5 associated with the enabler of "attends to critical detail." Additionally, enabler-aspect pair 604 for aspect "cooperativeness" has a relevance value of 5 associated with the enabler of "collaborate," and enabler-aspect pair 606 for aspect "humility" has a relevance value of 5 associate with the enabler of "acts with humility."

In some embodiments, the enabler-aspect mapping engine 148 can also map each of the identified competencies for an available position to one or more aspects of the personality model 500. The enabler-aspect mapping engine 148, in some examples, can derive competency-aspect mappings from enabler-aspect mappings like the mapping table 600 and the competency-enabler mapping 200 (FIG. 2). For example, FIG. 7 shows a competency-aspect mapping table 700 that illustrates how the enabler-aspect mapping engine 148 maps each of the competencies associated with the identified position competencies to one or more of the aspects in the personality model 500. Like the enabler-aspect mapping table 600, the competency-aspect mapping table 700 also applies a relevance value to each competency-aspect pair based on how closely correlated an aspect is to a respective competency for a position. For example, the competency-aspect mapping table 700 provides a technical base for the competency-enabler mapping table 200 shown in FIG. 2. In one example, relevance for each competency-aspect pair is also scored on a scale from one to three with three indicating a highest amount of relevance between the competency-aspect pair. However, as can be understood, other score ranges can also be applied (e.g., high/medium/low, one to five, one to ten). For example, in the table 700, for a given position, a motivation competency 702 can be defined based on a "drive" aspect with a relevance value of 3 and a "liveliness" aspect with a relevance value of 1. Additionally, an ambition competency 704 can be defined based on a "conceptual" aspect with a relevance value of 1, a "mastery" aspect with a relevance of 2, and an "ambition" aspect with a relevance value of 3.

In some implementations, using the question-enabler mapping table 400 (FIG. 4), enabler-aspect mapping table 600, and/or the competency-aspect mapping table 700, the enabler-aspect mapping engine 148 generates question-aspect mappings for each available position submitted by an employer 104. These question-aspect mappings are customized data structures that uniquely contribute to improved ability of the system 108 to perform candidate assessments in real-time or near real-time. For example, FIG. 8 shows an interview question-aspect mapping table 800 for an available position submitted by the employer 104 to the video assessment system 108. In this example, the table includes four interview questions 802 for the position mapped against each of the fifteen aspects 804 of the personality model (e.g., personality model 500 in FIG. 5). In some implementations, the values for each question-aspect pair in the table 800 can be derived from an inverted matrix of competency-enabler mapping table 200 and question-enabler mapping table 400 (FIG. 4) and reflects the relevance of each personality aspect to a respective question. In some aspects, the cumulative relevance score in the table 800 is an absolute score that is independent of all other scores in the table 800. In other examples like the example shown in FIG. 8, the enabler-aspect mapping engine 148 normalizes all of the relevance scores so that all of the values in the table are between 0 and 1, with 1 representing a highly relevant aspect for the respective question and 0 representing an aspect that has very little or no relevance to the respective question. For example, for the question of "Describe the work environment in which you are most productive and gives you the most satisfaction" 806, a "drive" aspect 808 has a highest relevance score of 1.00, a "liveliness" aspect 812 and a "competence" aspect 814 have relevance scores of 0.33, an "assertiveness" aspect 810 and "awareness" aspect 818 have relevance scores of 0.11, and all of the remaining aspects have relevance scores of 0.

In some embodiments, the enabler-aspect mapping engine 148 stores the question-aspect mapping table 800 and competency-aspect mapping table 700 for each position processed by the system 108 in data repository 110 as question mapping data 120. The data structure of the question mapping table 800 (in addition to the enabler-aspect mapping table 600, competency-aspect mapping table 700, and question-enabler mapping table 400) improves the processing efficiency of the video assessment system 800 by providing a structure that streamlines interview score computations and candidate assessments as discussed further below. In particular, having a single data structure that includes relevance scores for each aspect per interview question enables the candidate scoring engine 140 to more swiftly calculate per-aspect, per-question, and per-candidate scores.

Returning to FIG. 1, the video assessment system 108 can also include a data acquisition engine 146 that controls, processes, and manages the interview submissions received from candidates 102 applying for available positions of one or more employers 104. In some implementations, the data acquisition engine 146 provides one or more UI screens to computing devices 158 of candidates 102 to allow them to interact with the system 108 to provide interview submission videos for one or more available positions. In some examples, upon logging into the system 108 and selecting an available position for applying to, the data acquisition engine 146 provides a question summary UI screen with a list of interview questions for the position (accessed from question mapping data 120 for the position) and selector tools for accessing one or more question recording UI screens. In some examples, only audio data from candidates 102 is captured, via a UI-based approach at a computer and/or through a set of audio-based prompts delivered via phone.

For example, FIG. 9 illustrates a question summary UI screen 900 for "Position A," which has four corresponding interview questions 902-908 which the candidate can review prior to selecting one of the questions in order to record a response. In some implementations, each question 902-908 listed on the question summary UI screen 900 may can also include a question status indicator 910-916 that provides a completion status for video recording files associated with each of the questions 902-908. For example, questions 902, 908 have respective completion statuses 910, 916 of "complete," meaning that the candidate has successfully recorded and linked a video file of a response to the respective interview question 902, 908. Question 904 has a corresponding status indicator 912 of "Not Started," meaning that the candidate 102 has not yet recorded and attached a video file for the respective question. Upon selecting question 904, the data acquisition engine 146 provides a video capture UI screen, which provides an input interface for the candidate 102 to record and link a video file containing a question response.

Figure 10:
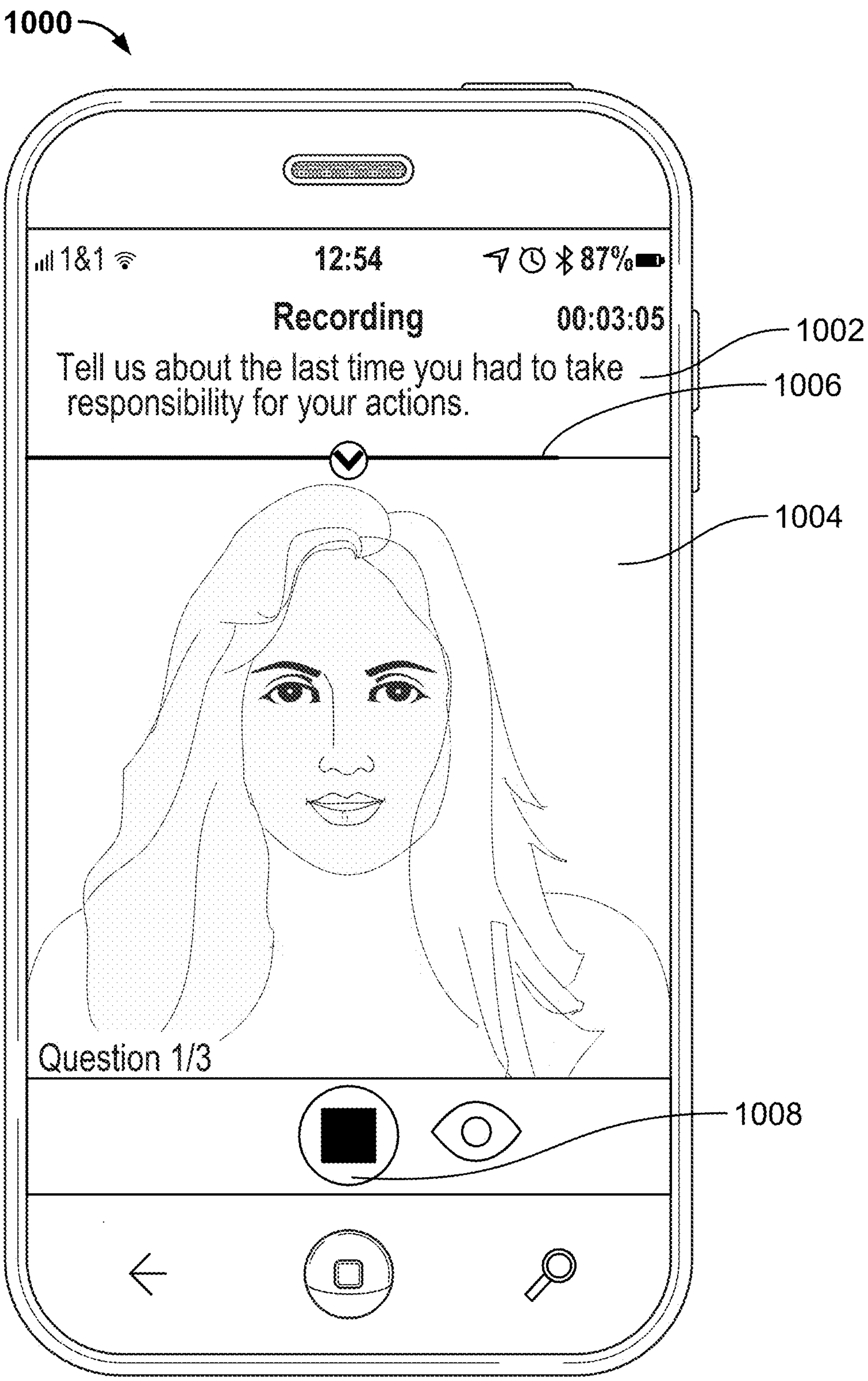
FIG. 10 illustrates a question input user interface screen.

FIG. 10 illustrates an example of a question input UI screen 1000 where a candidate 102 can record an interview questions response at an external computing device 158 such as a mobile device, tablet, wearable device, or laptop. In some implementations, the data acquisition engine 146 presents the selected question 1002 in the UI screen 1000 in addition to a recording display window 1004 where the candidate 102 can see herself as she records the video response. In some examples, the UI screen 1000 may also include a visual recording indicator 1006 that allows the candidate to view how much of a maximum amount of recording time they have used to answer the question. The UI screen 1000 can also include other controls such as a start/stop recording selector 1008 as well as a selector to finish and link the video file to the selected question.

Returning to FIG. 9, the question summary UI screen 900 can also present a question status indicator 914 indicating that the linked video file has one or more types of errors that make the file incompatible for processing by the video assessment system 108. In some examples, a file size error indicates that the linked video file is less than a minimum file size or greater than a maximum file size. A file format error, in some embodiments, indicates that the file type of the linked video file is not a video file or is a type of file that is incompatible with the system 108. In some implementations, the video assessment system 108 can also pre-process a linked video file prior to submission to detect quality errors.

In some examples, data quality assessment engine 136 and/or speech to text conversion engine 134 can perform one or more data quality tests for each of the uploaded video files to determine if one or more data quality standards are met. In one example, the data quality assessment engine 136 performs audio data usability tests that include determining a signal to noise ratio for a respective video file, and speech to text conversion engine determines a confidence score for a speech-to-text transcript result. Additionally, the data quality assessment engine 136 can perform a word count on the transcript to determine whether there is enough data in the transcript to produce a reliable result. In some examples, the data quality assessment engine 136 can also perform an average (e.g., mean or median) word length test to determine whether the candidate 102 is trying to cheat the system 108. If any quality errors are detected, errors can be displayed in the status indicator for the respective question in the question summary UI screen 900. Details regarding the quality tests performed by the data quality assessment engine 136 are discussed in further details below. In some examples, in response to generating a data quality error when low quality audio or video is detected, the data acquisition engine 136 can also provide recording reminders or suggestions to candidates 102 in the question summary UI screen 900 and/or question input UI screen 1000 to improve the quality of the recording. For example, the reminders can tell the candidate 102 to record their responses in a quiet environment with low background noise and to use a well-functioning microphone.

Upon linking video files to each of the respective questions 902-908, the candidate 902 can select submission selector 918 to transmit the interview question video files to the video assessment system 108. In some examples, the submission selector 918 on the question summary UI screen 900 is not available for selection until video files have been linked to each of the questions without any detected errors. Upon receipt of the video files, the data acquisition engine 146 scans, processes, and stores the video files as candidate video data 112 in data repository 110. In some examples, the candidate video data 112 an be a data structure of video files for the questions that are linked to the respective candidate 102, employer 104, and associated position for which the candidate 102 is applying. In some implementations, the data acquisition engine 146 can also perform other types of pre-processing to improve the efficiency of speech-to-text transcript generation by the video assessment system 108. For example, the data acquisition engine 146 can automatically extract audio data from each received video file and save the extracted audio data in a separate file with its corresponding video as part of the candidate video data 112.

Returning to FIG. 1, the video assessment system 108 can also include a speech-to-text (STT) conversion engine 134 that converts the audio data of each captured video interview question into written text in real-time. In some implementations, the STT conversion engine 134 uses a Speech-To-Text Service to perform the STT conversion. In other embodiments, other STT services that can also transform audio data into a written transcript can also be used by language classification engine 138 to detect personality aspects used to assess suitability of a candidate 102 for a particular position. In some implementations, the STT conversion engine 134 uses machine learning algorithms to combine knowledge of grammar, language structure, and the composition of audio and voice signals to accurately transcribe the human voice in received interview question files. In some embodiments, the STT conversion engine 134 can process a range of audio file formats of varying quality and sampling rates by applying a broadband or narrowband model. In some implementations, the transcripts of interview questions generated by the STT conversion engine 134 may be stored as transcript data 128 in data repository 110. In some aspects, the transcript data 128 for a particular interview question response can be linked to its corresponding candidate video data 112 within the data repository 110.

In some implementations, the machine learning algorithm used by the STT conversion engine 134 can be trained by artificial intelligence (AI) training engine 142 to detect keywords, phrases, and synonyms associated with aspects in the personality model 500 (FIG. 5) with greater accuracy than other words, which in turn improves the performance of the natural language classifier that is trained to detect the personality aspects. In some examples, the AI training engine 142 trains the STT algorithm with portions of training data 124 used to train the natural language classifier used by the language classification engine 138 to detect personality aspects. For example, the training data 124 of customized words, phrases, and synonyms make up a customized dictionary for the STT algorithm. In some examples, the entries in the customized dictionary are assigned a higher identification priority (weight) than other words, making the entries more resistant to missed detection. In one example, the customized dictionary used to train the STT algorithm includes over 16,000 words and phrases plus synonyms associated with each of the entries. In some examples, the STT algorithm can be further customized by training with one or more language model data sets and/or acoustic model data sets. In some implementations, language models can be trained to detect alternative words and phrases for keywords associated with each of the personality aspects. Acoustic models, in some embodiments, can be trained with acoustic data to be able to differentiate between different types of pronunciations and accents of words.

In some implementations, the STT algorithm used by the STT conversion engine 134 can be configured to determine STT transcript quality based on a computed confidence score for the transcript. In some examples, the STT conversion engine 134 calculates a confidence score for each word and each final transcript. The confidence score, in some embodiments, indicates the STT algorithm's estimate that a given transcript is accurate to the audio information it is based on. In one example, confidence scores range from 0.0 to 1.0 (or 0 to 100%), with 1.0 (100%) indicating that the current transcript reflects the most likely result. In some implementations, addition manual quality assessments can be performed to ensure that the STT algorithm is meeting equivalent human error standards. Additionally, the calculated word error rate has approximately a 0.73 correlation with the STT algorithm-calculated confidence score, showing that the calculated confidence score can be used as a metric for word error rate and transcript accuracy. In some implementations, the STT conversion engine 134 generates a quality error for an interview question transcript when the confidence score is less than 0.65.

The video assessment system 108, in some embodiments, can also include an AI training engine 142 that applies training data to machine learning algorithms used by the STT conversion engine 134 and language classification engine 138. For example, the AI training engine 142 uses customized training data sets 124 to train a natural language classifier used by the language classification engine 138 to detect positive and negative aspects of a personality model (e.g., personality model 500 in FIG. 5). In some examples, detected instances of both positive and negative aspect indicators can be used by the system 108 to assess a candidate's aptitude to excel at one or more competencies of an available position. In some implementations, the training data sets 124 can include key words, phrases, and other synonyms that can be indicative of positive and negative personality aspects associated with a personality model 500. These training data sets 124 can be applied to the machine learning algorithms for both the STT conversion engine 134 as discussed above as well as the language classification engine 138. In some examples, the AI training engine 142 can train multiple natural language classifiers with a respective language's training data set. Therefore, the video assessment system 108 can accommodate candidate interview responses that are submitted in any detectable language.

The training data sets 124, in some embodiments, can also include interview transcripts and associated personality aspect ratings applied by human raters. In some aspects, human rating data is combined with rating data from the natural language classifier. In some examples, a comparison of human rating data and classifier rating data are fed back into the natural language classifier of the language classification engine 138 as training data 124. In some cases, comparison data for very high scores (e.g., greater than 4.5 on a scale of 1 to 5) and very low scores (e.g., less than 1.5 on a scale of 1 to 5) also includes reasons for why the human rater scored the candidate with such a high or low score. These scoring rationale narratives can be combined with the comparison data between the human and natural language classifier scores as part of the training data sets 124 that are used to train the natural language classifier.

In some implementations, the training data sets 124 can also include entire phrases or sentences associated with specific personality aspects rather instead of or in addition to short phrases that capture only a core feature of the respective personality aspect. For example, including an entire sentence from an interview transcript such as "When a goal is very important to me, I am focused on achieving it," in the training data sets 124 can allow the natural language classifier to more accurately detect identifiers for a "drive" personality aspect than just a short phrase of "focused on achieving." The training data sets 124, in some embodiments, can also include narratives describing and explaining each of the personality aspects in the model. In some examples, the training data sets 124 can also include statements made by candidate interviewees that are strongly predictive for a particular personality aspect. Each of the items of data in the training data sets 124, in some implementations, can be tagged to a respective personality aspect. In some examples, a portion of the items in the training data sets 124 may be linked to two or more personality aspects, which further improves the accuracy of the natural language classifier.

Additionally, feedback received from employers 104 and/or consultants 102 regarding competency and personality aspect scores computed by the system 108 can continuously fed back as updated training data sets 124 that can be used to improve the performance of the customized natural language classifier. In some examples, the AI training engine 142 is continuously updating the training data sets 124 and retraining the natural language classifier. In this way, the natural language classifier used by the language classification engine 138 is highly customized at detecting positively and negatively polarized identifiers of each of the personality aspects of the personality model that used by the system 108 to evaluate candidate interview question transcripts. This continuous updating of the training data improves accuracy of the natural language classifier.

FIG. 11 shows a table 1100 of positive 1102 and negative 1104 identifier words associated with a personality aspect of "conscientiousness." In some implementations, identifiers 1102, 1104 are words or phrases that have an association with a respective personality aspect (in this case "conscientiousness"). In some examples, positive identifiers 1102 can correspond to synonyms of the respective personality aspect, and negative identifiers can correspond to antonyms of the respective personality aspect. The identifiers 1102, 1104, in some implementations, can be included as a portion of the training data sets 124 for training the natural language classifier to detect conscientiousness indicators within interview question transcripts. For example, positively polarized identifiers of conscientiousness 1102 can include terms such as "organized," "precise," "responsible," "thorough," "efficient," "orderly," "self-disciplined," "practical," "systematic," and "dependable." Negatively polarized identifiers of conscientiousness 1104, in one example, can include terms such as "disorderly," "careless," "inefficient," "impractical," "unreliable," "inconsistent," "undependable," "aimless," "illogical," and "sloppy." Other aspects of the personality model can also include sets of respective positive and negative indicators that can be used by the AI training engine 142 to train the natural language classifier used by the language classification engine 138.

Returning to FIG. 1, in some embodiments, the video assessment system 108 can also include a language classification engine 138 that is trained by AI training engine 142 to detect personality aspect identifiers within interview question transcripts submitted by candidates 102. In some examples, the language classification engine 138 uses a commercial natural language classifier, such as IBM WATSON, Google Cloud Speech, or Amazon Polly, that has been specifically trained to detect personality aspects within interview question transcripts. In other examples, the language classification engine 138 uses a customized, proprietary natural language classifier. In some implementations, the language classification engine 138 accesses transcript data 128 generated by STT conversion engine 134 and provides the transcript data 128 as an input to the trained natural language classifier. In some implementations, the language classification engine 138 can detect a language of an interview transcript and apply the transcript to the respective natural language classifier for that language.

Figure 12:
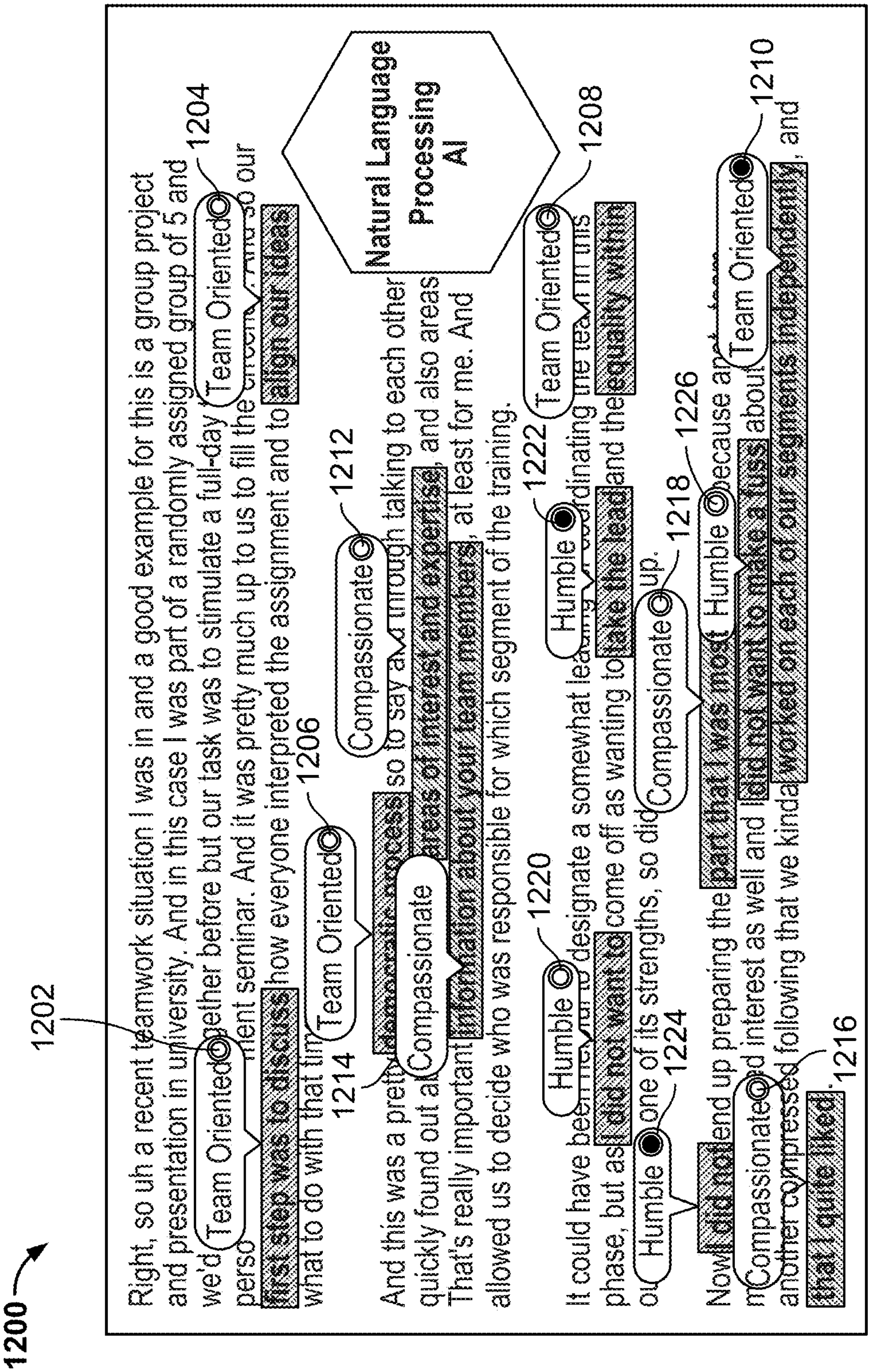
FIG. 12 illustrates an interview question transcript with personality aspects detected by a natural language classifier.

For example, FIG. 12 illustrates an interview question transcript 1200 that is provided as input to the natural language classifier. In the example, the transcript includes a response to a question asking a candidate to discuss a time when he or she worked in a team environment. FIG. 12 also shows highlighted positive and negative personality aspect identifiers 1202-1226 that are detected and output by the natural language classifier. In some embodiments, the natural language classifier outputs identifiers for personality aspects that are mapped to the respective interview question (e.g., question-aspect mapping 800 in FIG. 8). In other examples, the natural language classifier outputs all of the detected personality aspects whether they are associated with the respective question or not. As shown in FIG. 12, the natural language classifier outputs identifiers 1202-1210 associated with a "team oriented" aspect, identifiers 1212-1218 associated with a "compassionate" aspect, and identifiers 1220-1226 associated with a "humble" aspect.

The natural language classifier of the language classification engine 138, in some embodiments, assigns a positive or negative polarity to each detected identifier based on whether the respective identifier is associated with a positive or negative feature of the personality aspect. In FIG. 12, for example, identifiers 1202 ("first step was to discuss"), 1204 ("align our ideas"), 1206 ("democratic process"), and 1208 ("equality within") are positive identifiers for the personality aspect of "team oriented" or "cooperativeness," while identifier 1210 ("worked on each of our segments independently") is a negative identifier for "team oriented." For a "compassionate" or "sensitivity" personality aspect, positive identifiers include identifiers 1212 ("areas of interest and expertise"), 1214 ("information about your team members"), and 1216 ("that I quite liked"), and negatives identifiers include identifier 1218 ("part that I was most interested"). For a "humility" aspect, positive identifiers include identifiers 1220 ("I did not want to") and 1226 ("did not want to make a fuss"), and negative identifiers include identifiers 1222 ("take the lead") and 1224 ("I did not"). In some implementations, these detected positive and negative identifiers 1202-1226 detected by the natural language classifier can be used by candidate scoring engine to calculate candidate scores for each aspect, competency, and interview question.

Figure 13:
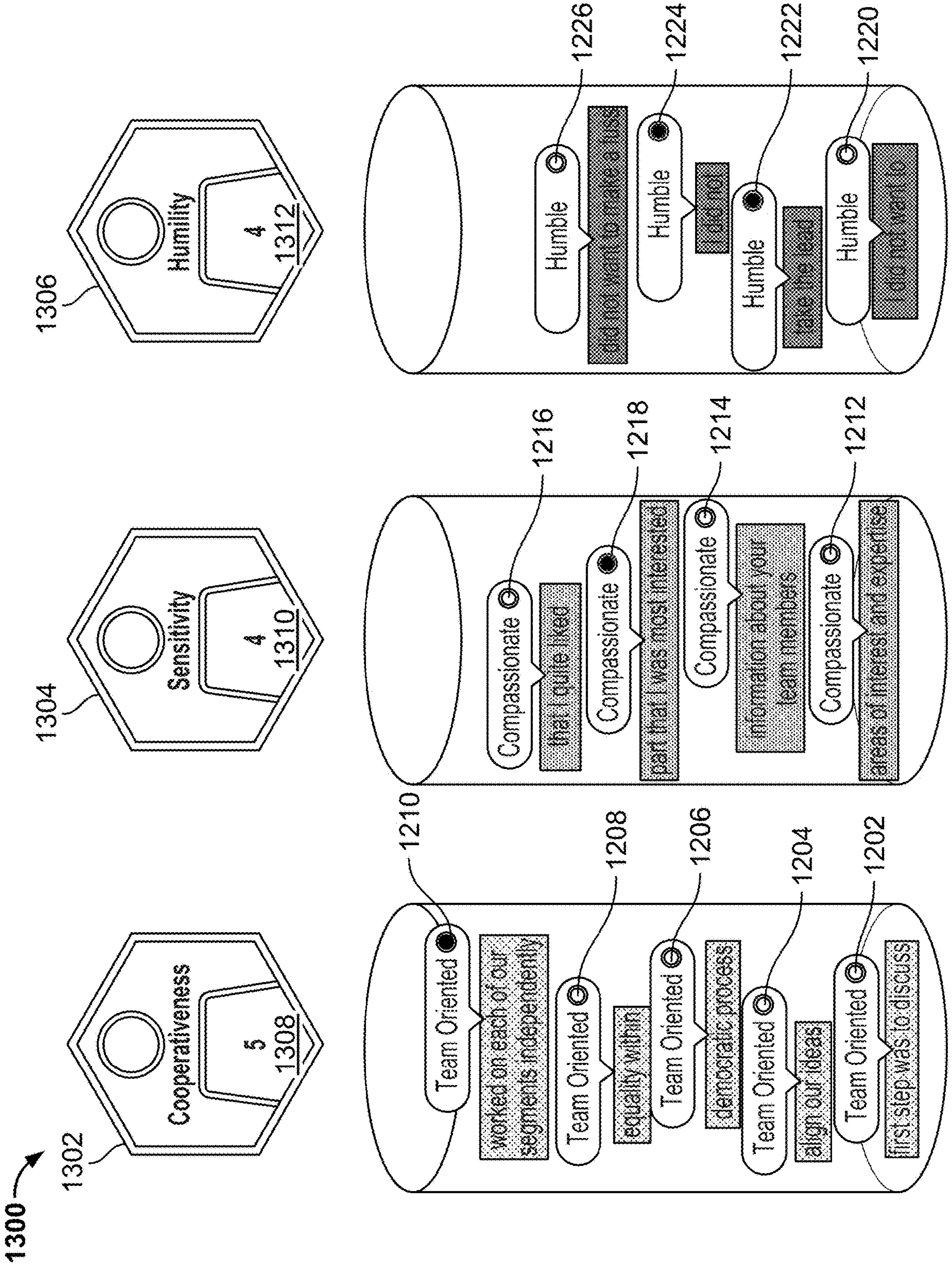
FIG. 13 illustrates aspect groupings of detected positive and negative identifiers in an interview question transcript.

In some embodiments, the language classification engine 138 organizes the detected personality aspects 1202-1226 into groups based on the personality aspect each identifier is associated with. For example, FIG. 13 illustrates a set 1300 of identifier groupings 1302-1306 organized by aspect for the interview question transcript 1200 along with the relevance 1308-1312 of each aspect to the question. For example, identifiers 1202-1210 are grouped together for the "team oriented" or "cooperativeness" aspect 1302, identifiers 1212-1218 are grouped together for the "compassionate" or "sensitivity" aspect 1304, and identifiers 1220-1226 are grouped together for the "humility" aspect 1306. The language classification engine 138, in some implementations, stores the identifier groupings 1302-1306 as aspect identifier grouping data 126 in data repository 110. In some examples, the identifier grouping data 126 for each interview question associated with a particular candidate 102 are linked or associated with each other within the data repository 110.

Returning to FIG. 1, in some implementations, the video assessment system 108 can also include a candidate scoring engine 140 that calculates, for a candidate 102 submitting responses to a set of interview questions to the system 108, scores per aspect for each question and per interview. In some examples, the calculated scores can take into account relative numbers of positive and negative indicators for each aspect, confidence in the accuracy of the STT transcript for each question, amount of raw evidence for each personality aspect in the interview transcript, and relevance of each personality aspect to each interview question. In some examples, for each personality aspect evaluated in identifier grouping data 126 for each interview, the candidate scoring engine 140 calculates an indication per aspect score using the equation, $IND=(PIND-NIND)^{(1/3)}$, where IND represents the indication score for the personality aspect, PIND represents a number of positive identifiers, and NIND represents a number of negative identifiers. For example, for the "sensitivity" identifier grouping 1304 in FIG. 13, PIND is 3 and NIND is 1. In some examples, the indication value IND is used to calculate a score per question (SQ) using the equation, $SQ=IND-((((1-PIND)*Relevance)^2)*(1-(ABS(IND)))$, where Relevance is the relevance of the personality aspect to the question, which can be obtained from the question mapping data 120 for the position. In some implementations, competency scores are calculated for personality aspect based on detected instances of mapped personality aspects within the question responses. Each competency score for a question can be calculated according to the equation, $$\text{Competency Score} = \frac{\sum \text{Aspect Score } X \text{ Evidence per Aspect}}{\sum \text{Evidence per Aspect}},$$

which ensures that aspect scores with more evidence have a higher weight in the competency score calculation. In some examples, competency scores are calculated and displayed at the question level and can also be aggregated to an overall score for the interview via a simple mean calculation. In some examples where multiple questions measure a single competency, the overall competency score for the candidate can be calculated as a mean of all of the question scores associated with the respective competency. In some examples, the scores can also be adjusted to reflect one or more data quality indicator (DQI) scores (e.g., transcript quality/confidence score, amount of information, trustworthiness, or an aggregate of two or more DQIs) such that question responses that have the highest quality and amount of information receive higher scores than other responses that have lower quality scores.

In some examples, the candidate scoring engine 140 can also compute a raw evidence score RE for each aspect and question using the equation, $RE=PIND+((1-PIND)*NIND)$. In some examples, the raw evidence score RE indicates how much information a candidate 102 provided for each of the aspects per interview question. FIG. 14 shows a table 1400 of RE and SQ scores for different PIND, NIND, and Relevance values. The examples shown in FIG. 14 represent boundary situations for extreme examples where either no identifiers are detected by the natural language classifier or only negative identifiers are detected. For question 1402 where PIND is 0, NIND is 0, and Relevance is 0, SQ is 0 and RE is also 0. In some examples, a score of 0 indicates a mean or middle value in a range from −1 to 1. This means that for a personality aspect that has an assigned relevance of 0 for a question and is not triggered, the score SQ remains at 0. For question 1404 where PIND is 0, NIND is 0, and Relevance is 1, SQ is −1 and RE is 1. This means that if an aspect is relevant (e.g., relevance score of 1) but the natural language classifier does not detect any indication, the score SQ is 0. For question 1406 where PIND is 0, NIND is 1, and Relevance is 0, SQ is −1 and RE is 1. This means that if an aspect has an assigned relevance of 0 but there is a negative indication, then there is a score SQ of −1 for the aspect. For question 1408 where PIND is 0, NIND is 1, and Relevance is 1, SQ is −1 and RE is 1. This means that if a personality aspect is relevant and a negative identifier is detected by the natural language classifier, then the score SQ for the aspect is −1.

Returning to FIG. 1, in some implementations, the candidate scoring engine can use the raw evidence score RE, positive identifiers PIND, and relevance of the aspect to the question to calculate a confidence score ES for a score using the equation, ES=RE+((1−RE)*(1−PIND)*Relevance). In some examples, the confidence score ES provides a measure of certainty regarding the accuracy of the score for a respective question. For example, if the relevance of a personality aspect on a question is high but a candidate 102 has provided little or no information related to the aspect, then the confidence score ES reduces the total question score (TSQ) for the aspect. Even if an aspect has little to no relevance to a particular question, the candidate scoring engine 140 can still calculate the raw evidence score RE and confidence score ES for the aspect.

In some implementations, using the confidence scores ES for each question, the candidate scoring engine 140 can calculate a total confidence per aspect (TES) across an entire interview that includes multiple interview questions. In some examples, the candidate scoring engine calculates the TES according to the equation, $TES=(\Sigma^{Q}_{x=1}ES_x)/Q$, where Q denotes the number of questions in an interview. In some embodiments, the TES can be calculated as an absolute confidence per personality aspect independent of the number of questions in the interview. The absolute TES can be calculated according to the equation, $TES=(\Sigma^{Q}_{x=1}ES_x)$.

Additionally, the candidate scoring engine 140 can calculate a total score per aspect (TSQ) from all question-level aspect scores (SQ) and confidence score (ES). In some examples, the TSQ is calculated relative to the confidence score (ES) in order to account for how much information relevant to each personality aspect a candidate 102 has provided. For example, the TSQ can be calculated according to the equation, $TSQ=(E^{Q}_{x=1}S^{Q}_{x})*ES_x/(EQ^{Q}_{x=1}ES_x)$. In some implementations, all of the scoring information (e.g., PIND, NIND, IND, RE, SQ, ES, TES, TSQ) can be stored in data repository 110 as candidate scoring data 129.

In some implementations, the candidate scoring engine 140 can use the calculated scores per aspect per question SQ and total scores per aspect TSQ to calculate scores per employer-identified competency for the available position. In some implementations, the candidate scoring engine 140 can access the question mapping data 120 (e.g., question-aspect mapping table 800 in FIG. 8 and competency-aspect mapping table 700 in FIG. 7) for the position and can convert the calculated scores per aspect to scores per competency. In some examples, the per-competency scores can also be stored in data repository 110 as candidate scoring data 129.

The candidate scoring engine 140, in some embodiments, can also rank each candidate 102 applying for an available position against other candidates according to one or more scoring criteria. In some examples, the candidate scoring engine 140 can generate total interview rankings where candidates 102 are ranked based on the total score per aspect (TSQ), which can also take into account the total confidence per aspect (TES). The candidates 102 can also be ranked based on calculated competency scores. Additionally, the candidate scoring engine 140 can rank the candidates 102 per aspect and per question using the score SQ. Because the video assessment system 108 performs automated candidate assessments independent of other candidates and without inserting any subjective bias into the assessment and ranking process, the candidate scoring engine 140 is able to rank candidates 102 in real-time as interview question response submissions are received. Interview methods that use human assessors and raters are unable to perform this real-time assessment since humans are unable to assess candidates without any subjective bias and without inserting comparative assumptions into the assessment process. The rankings generated by the candidate scoring engine 140 can also be stored as candidate storing data 129 in data repository 110. In some examples, when a predetermined time frame for receiving job application submissions has elapsed, the candidate scoring engine 140, may pass the candidate scoring and ranking data to the reporting and feedback engine 152 for processing and presenting to employers 104.

In some implementations, based on the scores TSQ and SQ for a given candidate 102, the candidate scoring engine 140 can identify one or more other available positions that the candidate 102 may be well suited to for the same employer 104 or another employer 104 who has submitted employer position data 114 to the system 108. For example, if the candidate 102 has submitted interview question responses for a data analyst position but has very high aspect scores for leadership-oriented aspects (e.g., high scores for socially bold and outgoing interaction styles 508 in personality model 500), the candidate scoring engine 140 may identify one or more positions where the socially bold and outgoing interaction styles are highly relevant for the position. In some examples, these additional position suggestions may be provided to candidates 102 and/or employers 104 by reporting and feedback engine 152 via one or more UI screens. In some implementations, even if a position is not currently advertised as available, the candidate scoring engine 140 may suggest a previously-advertised position to the employer 104 for the candidate 102 in the event the employer 104 is looking to open the position for applications in the future.

In some examples, a "positive" personality aspect may not necessarily mean "good" or "best," and a "negative" personality aspect may not necessarily indicate "bad" or "worst." Instead, the positivity or negativity of a personality aspect may instead indicate a relative position on a spectrum for the personality aspect. For example, for a personality aspect of "flexibility," a high score (e.g., 4 or 5 on a scale of 1 to 5) for the aspect may indicate that the candidate 102 is able to easily adapt to changing situations and excels in unstructured environments. On the other hand, a low score (e.g., 1 or 2 on a scale of 1 to 5) for the personality aspect of "flexibility" can indicate that that the candidate 102 excels in structured environments that require strict adherence to procedures and guidelines. For example, for data analysts or nuclear power plant operator positions, candidates with low scores for flexibility may be ideal. Therefore, for these types of positions, candidates with lower aspect scores for flexibility may be ranked higher than candidates with higher scores for flexibility.

In some implementations, the video assessment system 108 can also include a data quality assessment engine 136 that can analyze the interview question transcripts generated by the STT conversion engine 134 to detect transcript quality issues and potentially fraudulent submissions. As discussed above, in some examples, data quality assessment engine 136 and/or speech to text conversion engine 134 can perform one or more data quality tests for each of the uploaded video files to determine if data quality standards are met. In some examples, the one or more data quality tests can be combined into a single score called a data quality indicator (DQI) that can be used to automatically trigger a computer-generated request for another response from a candidate. In one example, the data quality assessment engine 136 performs audio data usability tests to determine transcript quality that include determining a signal to noise ratio for a respective video file, and STT conversion engine 134 determines a confidence score for a speech-to-text transcript result. In other examples, the data quality assessment engine 136 can perform the confidence score determination instead or in addition to the STT conversion engine 134. As discussed above, the confidence score correspondence to an accuracy score for a transcript that reflects an approximate word error rate. In some examples, the confidence score can be referred to as a transcript quality score, which is one of the scores that factors into the DQI. In some examples, multiple thresholds can be applied to indicate whether the transcript quality falls into one or more scoring levels (e.g., "red," "yellow," "green" as discussed further below). For example, confidence scores of greater than 60 (0.6 fractional value) may fall into a "green" scoring zone, confidence scores from 50 to 60 (0.5 to 0.6 fractional value) may fall into a "yellow" scoring zone, and confidence scores of less than 50 (0.5 fractional value) may fall into a "red" zone.

Additionally, the data quality assessment engine 136 can perform additional data quality tests that include analysis of the transcripts generated by the STT conversion engine 134 to detect instances of candidates 102 attempting to "trick" the system 108 by submitting interview responses that obtain artificially high scores. In some instances, this can happen when candidates 102 guess the scoring rules applied by the candidate scoring engine 140. For example, one way that candidates 102 may try to trick the system 108 is by stating certain keywords the candidate 102 deems to be indicative of desired traits and scores. In some examples, this type of cheating attempt can lead to candidates 102 using choppy, unnatural speech patterns. Because interview questions can prompt candidates 102 to provide fulsome responses with full sentences and talk about different topics within a single question response, the data quality assessment engine 136 can be configured to detect evidence of natural speech patterns within the question transcripts.

In one example, the data quality engine 136 measures an interview question transcript for total word count to determine a score measuring the amount of information in the transcript. In some examples, the data quality engine 136 generates an amount of information score for each question that is one of the tests that factors into the DQI determination. In one example, if the word count for a transcript is less than a predetermined threshold, such as 185 words, then the data quality assessment engine 136 may output a warning or notification to the candidate 102 and/or employer 104 that a word count quality error has been detected. In other examples, multiple thresholds can be applied to indicate whether the amount of information falls into one or more scoring levels (e.g., "red," "yellow," "green" as discussed further below). For example, transcripts having more than 130 words may fall into a "green" scoring zone, transcripts having between 80 and 130 words may fall into a "yellow" scoring zone, and transcripts having less than 80 words may fall into a "red" zone. In some examples, candidates 102 may attempt to cheat the system 108 by just stating certain keywords in succession that are associated with the respective interview question. For example, the candidate 102 may recite keywords that he/she feels are indicative of traits of an ideal candidate for the position. This can result in short and choppy responses that are non-conversational, which can be indicated a question word count that is less than the predetermined threshold. In some examples, even if a candidate 102 is not attempting to cheat the system 108 question transcripts with word counts less than a predetermined threshold may be lacking enough information for the video assessment system 108 to detect enough personality aspect features to calculate reliable scores for the question.

In some implementations, the data quality assessment engine 136 can also detect honest and dishonest interview question responses based on an average word length (e.g., mean or median word length) of an interview question transcript. In some examples, candidate response to questions that include several full sentences and natural speech patterns may have an average word length of approximately 4.79 characters per word. In some embodiments, average word lengths that are substantially greater than or less than a typical word length for the type of question may indicate that the candidate 102 has not provided a fulsome response and may be trying to cheat the system. In one example, the quality assessment engine 136 may generate a quality error notification if the average word length for a question transcript is less than 3 characters or over 8 characters. For example, when a candidate 102 is attempting to cheat the system 108 by using certain keywords in succession and not speaking in full sentences, the average character length for the response may be greater than the maximum word length threshold because he is not interspersing shorter articles, conjunctions, and prepositions that are part of full sentences. In other examples, there may be other thresholds can be used that indicate whether an average word length for a transcript falls into one or more scoring levels (e.g., "red," "yellow," "green" as discussed further below). For example, average word lengths of 3 to 5 letters may fall into a "green" scoring zone, average word lengths of 2.5 to 3 letters and 5 to 6 letters may fall into a "yellow" scoring zone, and average word lengths of less than 2.5 or greater than 6 letters may fall into a "red" zone.

In some implementations, the data quality assessment engine 136 can also detect trustworthiness errors in responses based on repeated use of specific key phrases within a question, which may be indicative of a candidate 102 attempting to submit a fraudulent response to an interview question. In one example, the data quality assessment engine 136 can detected repeated use of the phrases "I am," "I'm," and "I was," which may indicate that the candidate 102 is attempting to mask his fraudulent use keywords and adjectives by putting a phase like "I am" before a set of keywords (e.g., "I am responsible," "I am assertive"). In some examples, using variations of "I am" repeatedly (e.g., greater than a predetermined threshold) in a response to an interview question may increase the word count of the transcript and also reduce the average word length below the maximum threshold. In some embodiments, applying the key phrase detection allows the data quality assessment engine 136 to more accurately detect cheating situations when used in conjunction with the word count and word length tests.

In some examples, if any word count and/or average word length quality errors, also referred to as trustworthiness errors, are detected, the data quality assessment engine 136 can output error notifications to the candidates 102, employers 104, and/or consultants 106. In some aspects, if the error notifications are provided to a candidate 102, the candidate 102 can be provided another opportunity to record an interview question response for the question that produced the error. In some implementations, the data quality assessment engine 136 may output quality error notifications to candidates 102, employers 104, and/or consultants 106 if a type of quality error (word count, word length, key phrase) is detected in more than one of the interview question transcripts submitted by the candidate 102. For example, if just one of four questions is associated with a detected quality error, then an error notification may not be produced because the single error may be indicative of just an anomalous condition and not an attempt to cheat the system 108. However, if multiple questions have detected quality errors, then an error notification may be produced. In some implementations, if one or more quality errors are detected, the data quality assessment engine 136 may flag the response for manual review by the employer 104 and/or consultant 106. In some examples, the data quality assessment engine 136 may output an error review UI screen to an external device of a reviewer. In response, the employer 104 and/or consultant 106 can provide inputs to the system 108 via the UI screen to indicate whether or not the candidate 102 was trying to cheat the system 108 in the responses.

In some examples, the data quality assessment engine 136 can use the responses received from reviewers to update the word count, word length, and key phrase thresholds. In some implementations, based on the responses from employers 104 and/or consultants 106 in manual reviews of interview transcripts, the data quality assessment engine 136 can update and customize one or more data quality test thresholds to specific questions and/or candidates 102. For example, if a candidate 102 has recorded response to multiple interview questions that are less than the word count threshold and manual review shows that the candidate 102 is not trying to trick the system 108, then that candidate's word count threshold may be reduced since the candidate 102 may just not be as verbose as most other candidates 102. In other examples, the candidate 102 may also receive a warning notification from the system 108 that consistently submitting short responses to interview questions may result in lower scores. In some examples, if large portions of candidates provide longer than average responses to a particular interview question, then the data quality assessment engine 136 may increase the word count threshold. Similarly, the word count threshold can also be reduced for responses that are lower than an average question word count. In some examples, each interview question can have its own set of quality test metrics (e.g., word count, word length, and key phrase metrics).

In some implementations, the data quality assessment engine 136 can be configured to calculate a DQI for each question response transcript, which is a computer-generated quantification of transcript data quality. Because interview question responses provided by candidates do not have a structured format and the quality of the data is largely dependent on the candidate providing the information, the DQI provides a computer-rooted, technical solution to automatically quantifying candidate responses without human involvement. Further, DQI generation and calculation further automates candidate interview assessment and scoring such that manual quality reviews by humans become unnecessary unless anomalies are detected by the system.

In some implementations, the DQI is based on three measures of data quality: transcript quality (confidence score), amount of information score, and trustworthiness score. Each of these measures have two or more defined thresholds separating two or more (e.g., three) levels of DQI-labels (i.e., red, yellow, or green). In other examples, different scoring schemes may be used for the DQI (e.g., scores from 1 to 5, 1 to 10 or 1 to 100). In some examples, response transcripts assigned a "green" DQI score green can indicate that the transcripts have high quality data and do not require further action from hiring managers (i.e., scores can be viewed as reliable and valid). In some embodiments, a yellow DQI score can indicate possible data quality concerns and, the system 108 may output a notification that human review of the respective question response is recommended. If a response transcript has a "red" DQI score for one or more of the DQI factors (confidence score, amount of information, and/or trustworthiness) is red, serious data quality concerns may be present. When a "red" DQI score occurs, the system 108 may refrain from generating and/or presenting automated scores, and a manual review may be required. As DQI scores are provided per question response, recruiters and/or employers 104 can easily tell whether a red label is an exception, which may suggest technical difficulties or unforeseen interruptions, or whether the overall quality of an interview warrants a more thorough review. In one illustrative example, about 70-80% of DQI scores for questions responses receive "green" scores while only approximately 10% of DQI scores receive "red" scores and require manual review, thus greatly reducing the amount of human interaction with the assessment process. In some examples, one or more aspects of the DQI may be used to adjust scores for each question transcript. For example, transcripts with "green" levels for transcript data quality, amount of information, and/or trustworthiness may be used to adjust the calculated question scores in a positive or negative direction.

In some implementations, the data quality assessment engine 136 generates and presents overall DQI scores for each question that are a combination of the confidence score, amount of information score, and trustworthiness score. In other examples, each of the DQIs remain separate from one another and can individually trigger a warning or request for review or another response submission from the candidate 102. For example, any question transcript having a confidence (transcript quality) score of less than 50 receives a lowest DQI score (e.g., "red") regardless of the scores of the other data quality tests that factor into the DQI determination.

In some examples, the data quality assessment engine 136 may perform the quality tests upon submission of a full set of interview question responses to the system 108 or upon linking of each individual interview question response video file at question summary UI screen 900 (FIG. 9). In some implementations, the data quality assessment engine 136 may perform a portion of the data quality assessment tests upon linking a video file at the question summary UI screen 900 and the remainder of the tests once the video files for all of the interview questions have been received by the video assessment system 108. For example, background noise and signal-to-noise ratio tests may be performed upon linking a video file at the question summary UI screen 900 while the remainder of the tests may be performed upon submission of the entire set of video files to the system 108. That way, the data acquisition engine 146 can notify the candidate 102 immediately that one or more noise criteria are not met and the candidate 102 can rerecord the response in lower noise conditions. In some implementations, any of the detected quality errors for any of the interview question responses can be stored in data repository 110 as response quality data 122.

Figure 15:
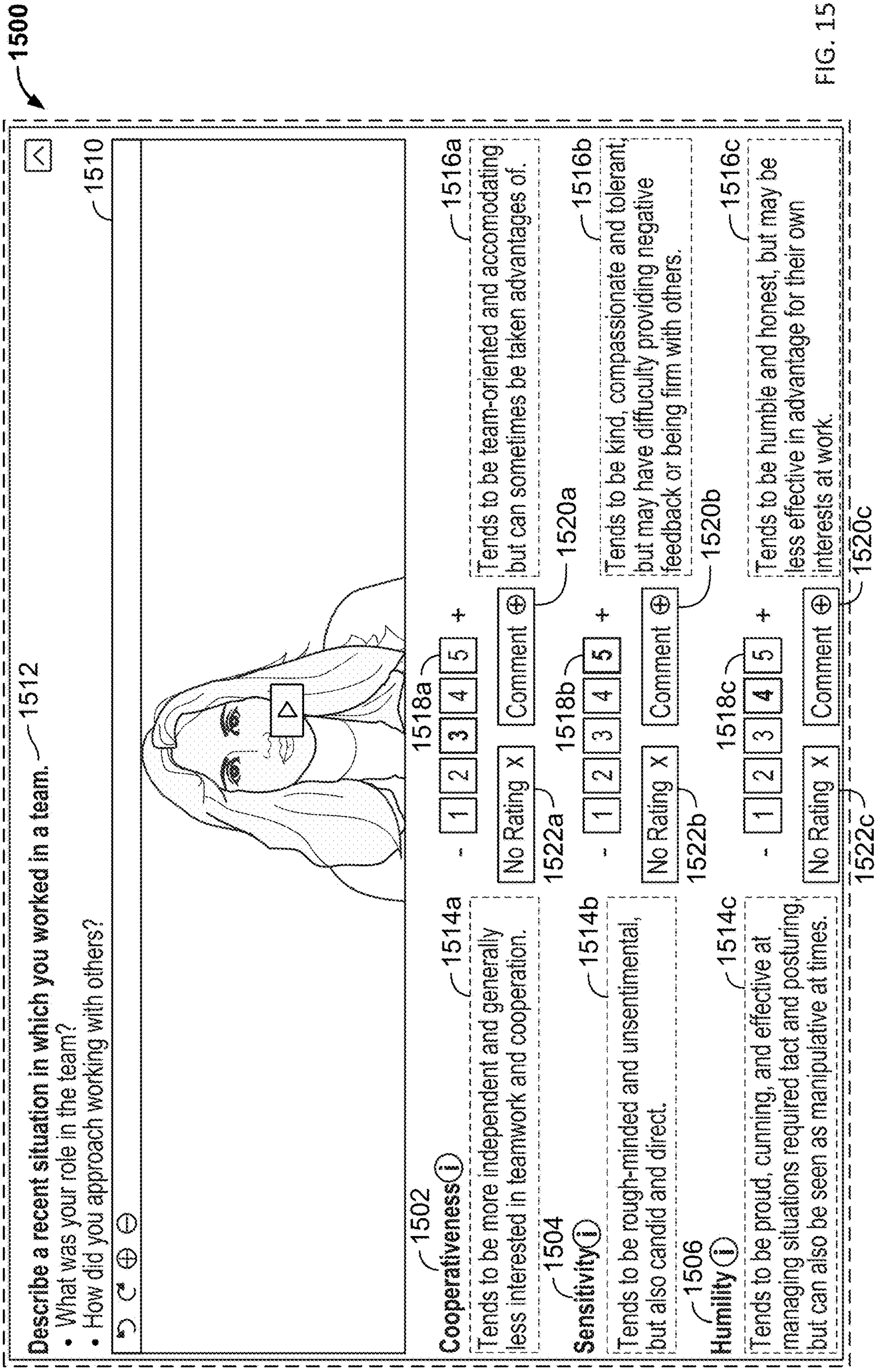
FIG. 15 illustrates a reporting and feedback user interface screen.

The video assessment system 108, in some embodiments, can include a reporting and feedback engine 152 that provides candidate scoring results to employers 104 and/or consultants 106 via one or more UI screens. In some examples, the reporting and feedback engine 152 can present the personality aspect scores for each question in a UI screen and provides input fields for employers 104 to provide feedback on the scores and responses. For example, FIG. 15 shows a reporting and feedback UI screen 1500 that is presented to an external device 158 of an employer 104 in response to analyzing and scoring each of the submitted interview responses provided by a candidate 102. In some implementations, reporting and feedback UI screen 1500 can include a video replay window 1510 that allows an employer 104 to view a candidates' response to an interview question 1512. For example, upon selecting replay window 1510, the reporting and feedback engine 152 causes the candidate video data 112 associated with the question 1512 to play. In some implementations, the UI screen 1500 can also include score summaries for each of the personality aspects 1502-1506 assessed by the interview question 1512. For example, for the question 1512 that asks candidates to describe a recent situation in which they worked in a team, the UI screen 1500 presents score summaries for the personality aspects of cooperativeness 1502, sensitivity 1504, and humility 1506.

In some embodiments, the score summaries for the personality aspects 1502-1506 can each include a score field 1518 in which the reporting and feedback engine 152 presents the aspect score for the question calculated by candidate scoring engine (e.g., score SQ). For example, for the cooperativeness score summary 1502, the score field 1518*a* presents a calculated aspect score of 3 (on a scale of 1 to 5). Additionally, the score field 1518*b* for the sensitivity score summary 1504 shows a calculated aspect score of 5, and score field 1518 *c* for the humility score summary 1506 shows a calculated aspect score of 4. In some implementations, the score fields 1518 for the personality aspects 1502-1506 allow the employers 104 to manually adjust the aspect scores for the question based on manual review of the video for the interview response.

Additionally, the score summaries 1502-1506 can also include comment input fields 1502 that allow the employer 104 to provide comments regarding the calculated score and/or reasons for making manual score adjustments. For example, if the employer 104 manually lowers the score for the sensitivity aspect 1504 at score field 1518*b*, the employer 104 may also provide a comment at comment input field 1520*b* regarding why the employer 104 thinks the candidate 102 should have had a lower score. In some examples, the reporting and feedback UI screen 1500 may require an employer 104 to provide a comment at a comment input field if the employer 104 manually adjusts the aspect score. In other examples, the reporting and feedback UI screen 1500 may allow the employer 104 to provide comments at comment input fields 1520 regardless of whether the score has been manually adjusted at score field 1518. In some embodiments, the UI screen 1500 can also provide a no rating input 1522 for each of the personality aspect score summaries 1502-1506 that allows the employer 104 to manually remove the respective aspect score 1518 from the candidate assessment. For example, the employer 104 may select the no rating input 1522 if the employer 104 believes that the personality aspect is not relevant to the question and/or believes that the candidate 102 did not provide enough information to assess the personality aspect in the response. In some examples, the reporting and feedback engine 1512 may lock the manual adjustment feature for the score fields 1518, comment fields 1520, and no rating inputs 1522 until the employer 104 has viewed the video displayed in window 1510. In some implementations, any feedback provided by employer 104 at UI screen 1500 can be stored in data repository 110 as feedback data 123.

In some examples, each of the aspect score summaries 1502-1506 can also include score prompts 1514, 1516 to guide the employer 104 regarding what a high score (e.g., 5) or a low score (e.g., 1) says about a candidate 102. In some examples, the prompts 1514, 1516 can assist the employer 104 in determining whether to manually adjust a score at score fields 1518 and/or provide comments at comment fields 1520. For example, the cooperativeness personality aspect 1502 can include a low score prompt 1514*a* explaining that a low score for this aspect means that the candidate "tends to be more independent and generally less interested in teamwork and cooperation." On the other end of the scoring spectrum, high score prompt 1516*a* for cooperativeness can mean that the candidate "tends to be team-oriented and accommodating but can sometimes be taken advantage of" In some implementations, "high" scores and "low" scores may not necessarily indicate "good" or "bad" but may instead just reflect at what end of the spectrum the candidate falls for the respective personality aspect.

In some embodiments, the reporting and feedback engine 152 can present additional UI screens to employers 104 with additional score information. For example, the reporting and feedback engine 152 can generate a UI screen that presents total scores (TSQ) for each assessed personality aspect across all of the interview questions. Additionally, the reporting and feedback UI screens can provide scoring and assessment information related to each of the identified competencies for the position. In some examples, the UI screens can also provide ranking information for one or more of the candidates 102 who have applied for a particular position. For example, the reporting and feedback UI screens can include rankings per aspect and overall rankings for the candidate 102 compared to all other candidates who have applied for the position. In some examples, the UI screens can also provide data regarding how the candidate's scores compare to historical scores for the position (e.g., compared to other times the employer 102 has hired for the same position). In some implementations, the additional reporting and feedback UI screens can also provide employers 104 data regarding any data quality errors detected by data quality assessment engine 136. In some examples, the reporting and feedback UI screens can also provide employers 104 and/or candidates with information regarding any other positions identified by candidate scoring engine 140 that the candidate 102 may be well suited for.

Additionally, the UI screens generated by the reporting and feedback engine 152 can provide a candidate 102 with post-interview and selection feedback regarding why the candidate was or was not selected for the position. For example, the reporting and feedback engine 152 can use the candidate scoring data 129 including ranking information generated by the candidate scoring engine 140 as well as feedback data 123 provided by the employer 104 at UI screen 1500 to generate a sanitized candidate report summary. In some implementations, generating the sanitized candidate report summary can include converting any overly negative comments provided by the employer 104 into slightly more positive language that still conveys to the candidate 102 where he has room for improvement. For example, if the employer has provided a comment in comment input field 1520*b* for the sensitivity aspect 1504 indicating that the candidate 102 appears "rude and inconsiderate," the reporting and feedback engine 152 may provide tips and advice in the candidate report summary regarding how to improve the candidate's sensitivity aspect.

In some implementations, the transcripts for each interview question, question mapping data, calculated scores, and received feedback on the scores (e.g., adjusted scores at score fields 1518, comments at comment input fields 1520, and no rating inputs 1522) can be added to the training data sets 124 used by the AI training engine 142 in training the natural language classifier for the language classification engine 138 and/or STT algorithm for the STT conversion engine 134.

Returning to FIG. 1, in some implementations, the video assessment engine 108 can also include a data orchestration engine 150 that controls the provisioning, allocation, and assignment of processing resources for performing system operations. In some embodiments, the processes performed by each of the processing engines 130-152 may be performed from a variety of cloud-based and non-cloud-based processing resources and/or data storage resources. The orchestration engine 150, in some examples, coordinates the division of data processing requests associated with receiving, processing, and analyzing candidate question response videos; identifies available processing resources associated for assigning to each processing request; manages the reception and organization of results obtained from processing resources; and coordinates presenting candidate assessment information to employers 104. In some implementations, the functions performed by data orchestration engine 150 and structure of the data architecture that the data orchestration engine 150 controls improve the overall processing efficiency of video assessment system 108. In some examples, data associated with orchestration of jobs and processing tasks by data orchestration engine 150 can be stored as orchestration data 131 in data repository 110.

Figure 17A:
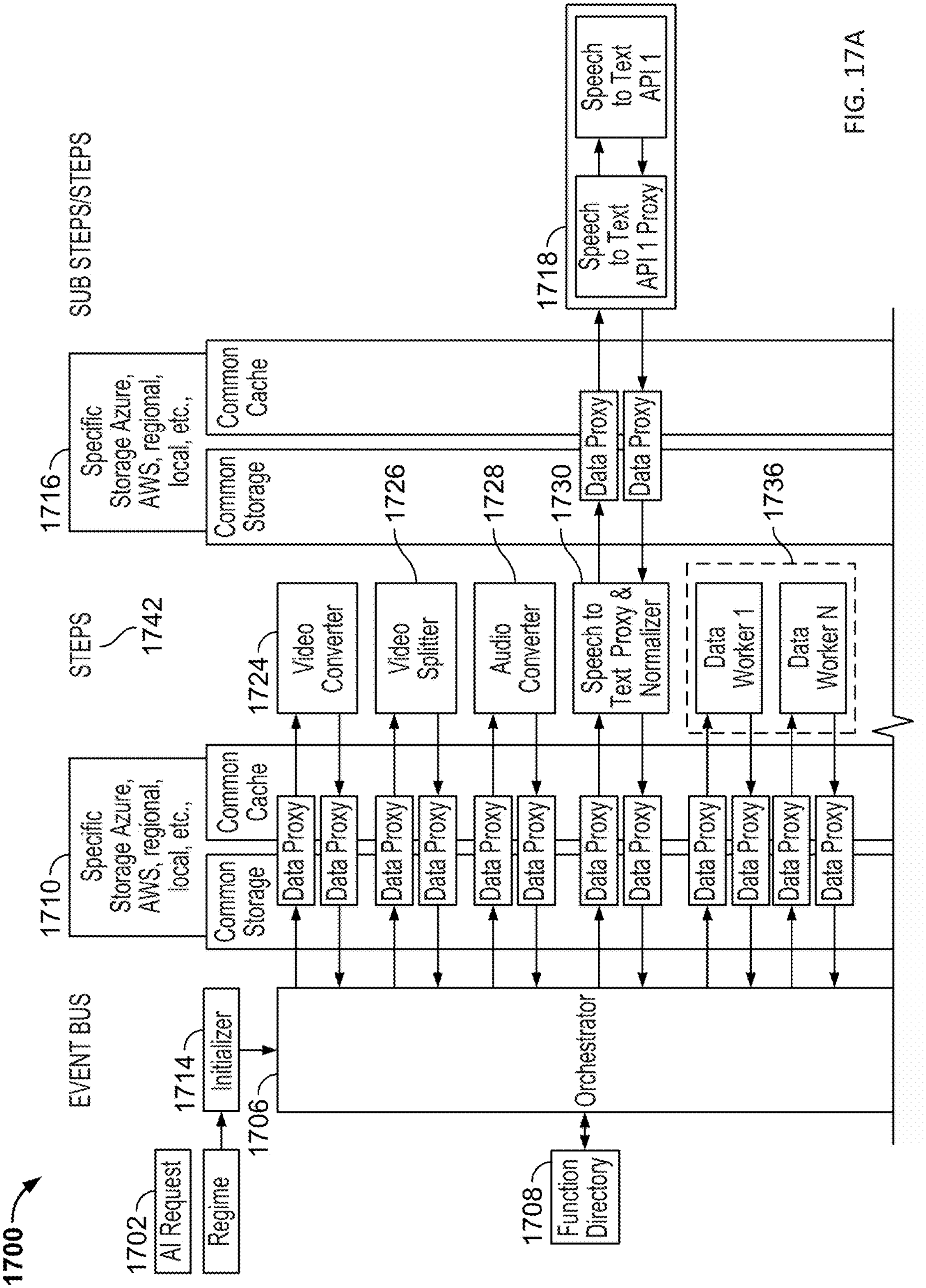
FIG. 17A illustrates a data architecture and orchestration structure for a video assessment system.
Figure 17A:
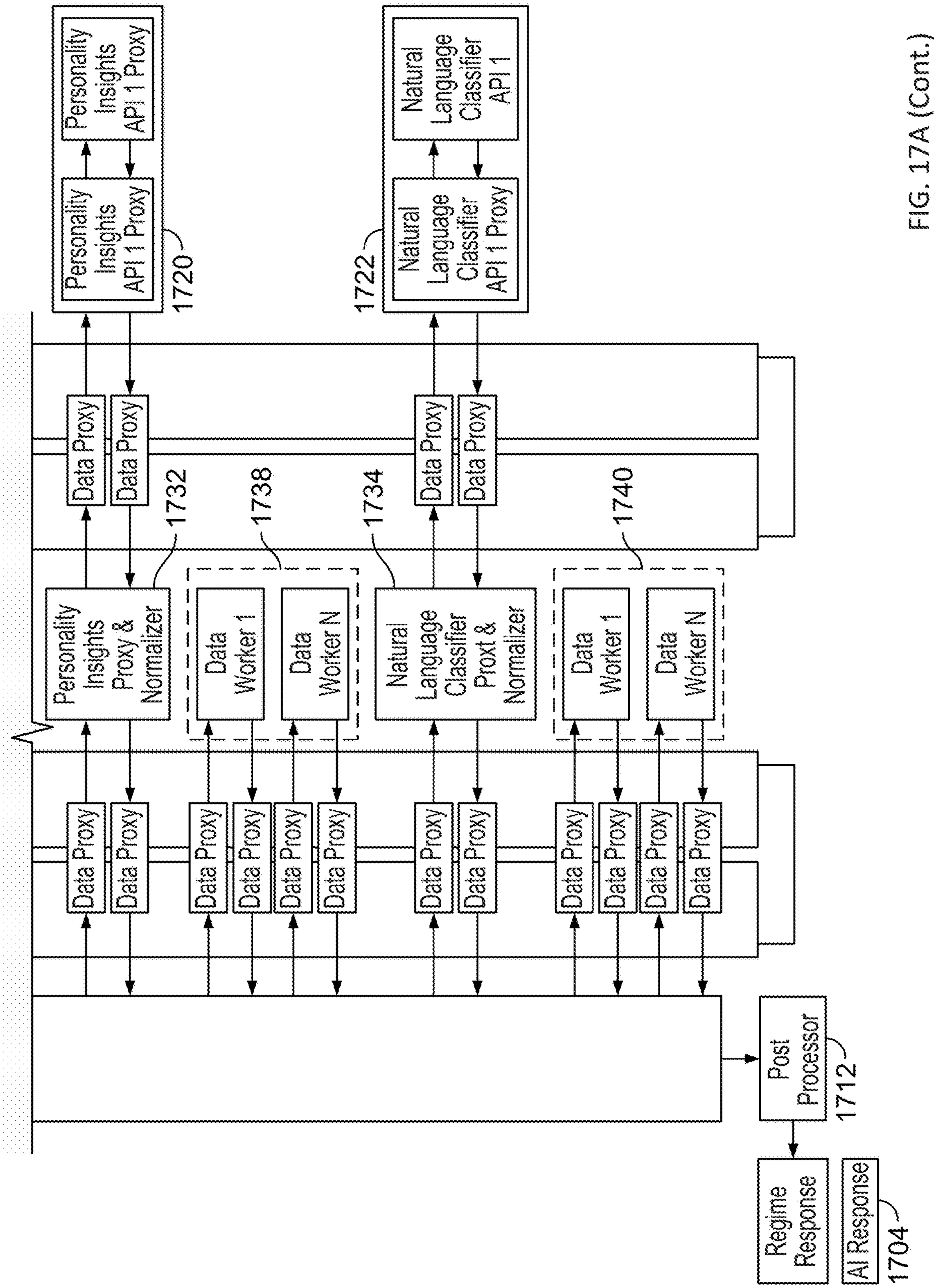

FIG. 17A illustrates a data architecture and orchestration structure 1700 for video assessment system 108. In some implementations, the data orchestration structure 1700 includes an orchestrator 1706 that organizes all processing jobs for the system 108 and determines how to allocate processing resources and activate processing steps for efficiently generating candidate video assessments. In some embodiments, when one or more video files containing interview question responses for a candidate 102 are received by the system 108, a job request for processing video interview files is sent to orchestrator 1706 as an AI request 1702 via initializer 1714. In some examples, the initializer 1714 initiates a set of jobs for processing the video file at the orchestrator 1706.

In some embodiments, the data orchestration structure 1700 can include a function directory 1708 where processing resources or services can advertise their presence, health, location, and configuration options. In some examples, the processing resources and services can include off the shelf processing resources such as MICROSOFT AZURE and/or AMAZON AWS processing resources as well as other local and regional processing resources. In some implementations, the orchestrator 1706 looks to the function directory 1708 to retrieve service endpoint, location, and other identification information for an available service when the orchestrator 1706 is looking to allocate resources to a particular processing task. Upon completion of a video interview processing task, the orchestrator 1706 can compile and organize all of the processed data so it can be presented to system users (e.g., candidates 102, employers 104, and/or consultants 106) in real-time upon submission of a set of video interview files. In some examples, a set of compiled results generated by a post-processor 1712 of the video assessment system 108 correspond to AI response 1704 in data orchestration structure 1700. In some examples, the orchestrator 1706, function directory 1708, and processing services can be containerized using a container management system such as KUBERNETES.

In some embodiments, upon assignment of a service by the orchestrator 1706 to process one or more steps of a candidate video assessment process, the service communicates with a data proxy associated with data storage 1710 to obtain any data needed to perform one or more of the assigned steps and provides any results and output data to its respective data proxy upon completion of a processing task. In some examples, data storage 1710 corresponds to data repository 110 in FIG. 1. Each data proxy associated with data storage 1710, in some aspects, knows the storage locations of data needed by the services for performing assigned tasks such that the processing services do not have to perform any data fetching and/or storage operations.

In some implementations, processing jobs performed by assigned services can be grouped into different types of steps 1742 associated with the video assessment system 108. For example, the steps 1742 can include a video converter 1724 that converts received video files into a predetermined format for processing, a video splitter 1726 for extracting audio data from the video files, and an audio converter 1728 for converting the extracted audio file into a predetermined format for processing. The steps 1742 can also include a STT proxy and normalizer 1730 that manages the STT conversion processes for generating interview question transcripts by a trained STT conversion algorithm. In some examples, the STT proxy and normalizer 1730 controls the performance of processes associated with STT conversion engine 134 (FIG. 1) in the video assessment system 108. In some implementations, the STT proxy and normalizer 1730 can have access to a set of worker modules or functions 1736 that convert, handle, and/or send data for the assigned processing service. The STT proxy and normalizer 1730, in some implementations, also transmits a set of STT sub-steps through a second data proxy layer 1716 to a STT application programming interface (API) 1718 that interfaces with a STT service trained to convert audio data extracted from the video interview file to an interview question transcript.

The steps 1742 of the data orchestration structure 1700 can also include a natural language classifier proxy and normalizer 1734 that controls the performance of processes associated with language classification engine 138 and AI training engine 142 (FIG. 1) of the system 108. In some examples, the natural language classifier and proxy 1734 is configured to detect personality aspect identifiers in interview question transcripts that can be used to assess how well-suited a candidate 102 is for an available position. In some embodiments, the natural language classifier proxy and normalizer 1734 can have a set of worker modules or functions 1740 that convert, handle, and/or send data for the assigned processing service. The natural language classifier proxy and normalizer 1734, in some implementations, also transmits a set of language classification sub-steps through second data proxy layer 1716 to a language classification API 1722 that interfaces with a natural language classification service trained to detect personality aspects within interview question transcripts.

In some examples, the steps 1742 of the data orchestration structure 1700 can also include a personality insights proxy and normalizer 1732 configured to perform functions associated with data quality assessment engine 136, candidate scoring engine 140, and/or reporting and feedback engine 152. For example, the personality insights proxy and normalizer 1732 can perform one or more data quality tests (e.g., transcript word count, average character length, key phrase use), calculate personality aspect scores for each question and interview, and generate candidate reporting information for review by employers 104. In some embodiments, the personality insights proxy and normalizer 1732 can have a set of worker modules or functions 1738 that convert, handle, and/or send data for the assigned processing service. The personality insights proxy and normalizer 1732, in some implementations, also transmits a set of language classification sub-steps through second data proxy layer 1716 to a personality insights API 1720 that can be configured to perform one or more tasks associated with calculating candidate personality aspect scores and configuring the scores for presentation to employers 104.

In some implementations, processing generated by each of the processing services performing one or more processing steps 1742 (e.g., steps 1724-1740) and/or sub-steps 1718-1722 can be stored by data proxy layer 1710 and transmitted back to orchestrator 1706 for linking, organizing, and preparing for presentation by post-processor 1712. In some examples, outputs prepared for presentation to employers 104, candidates 102, and/or consultants 106 are output by post-processor 1712 as AI response 1704. Additionally, as each processing service completes its assigned task, the respective service information is added to function directory 1708 as a service that is available for task assignment.

Figure 17B:
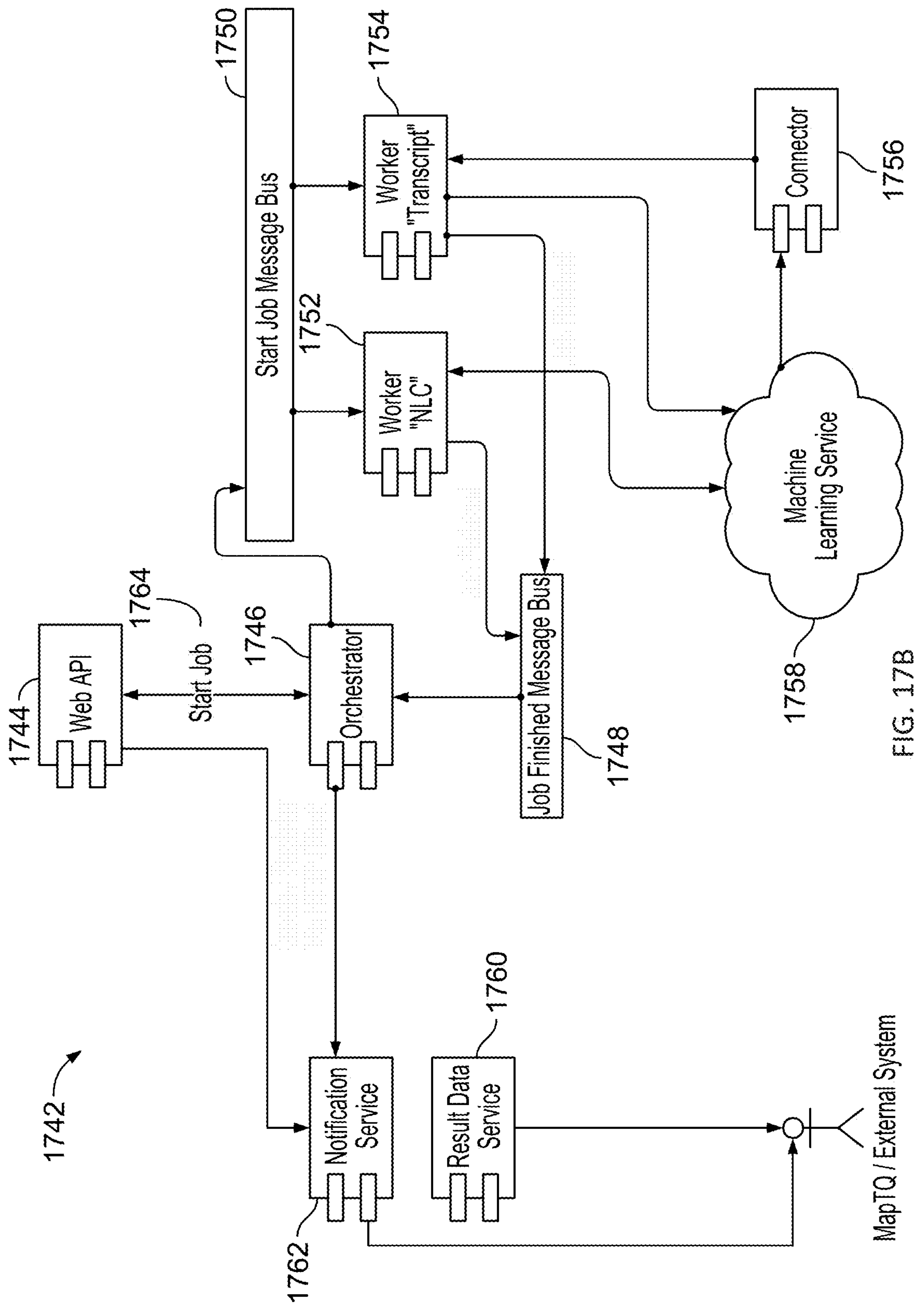
FIGS. 17B-17C illustrate data architectures and work flows for a video assessment system.

Turning to FIG. 17B, an example data architecture and workflow for a video assessment system 108 is shown. In some implementations, system users (e.g., candidates 102, employers 104, and/or consultants 106) interact with the video assessment system 108 through a web API 1744. In some examples, when a candidate 102 submits a set of interview question response videos to the system 108 at the web API 1744, a data pipeline is initialized for a job at orchestrator 1746. In some examples, when a candidate submits a set of interview video files via system UI screens, the corresponding URL is registered at a notification service 1762 that is configured to send system notifications to external system components (e.g., a system front-end) upon triggering by orchestrator 1762. In some embodiments, the data pipeline includes a set of properties monitored by orchestrator 1746 which can include a pipeline identification (ID), a status (e.g., queued, running, finished), a current job number, a result URL (where to push the results to), and configuration information for the pipeline. In some examples, the properties for the data pipeline can be stored by a data proxy and/or within a data storage region (e.g., orchestration data 131 in data repository 110 of FIG. 1) associated with the system 108.

In some examples, upon initialization of a data pipeline, the orchestrator 1746 can also initialize a job 1746 associated with a URL of the web API 1744. In some examples, a job includes a group of processing tasks associated with processing the video file, generating interview question transcripts using a STT conversion algorithm, detecting personality aspects within the interview transcripts with a trained natural language classifier, scoring the interview question transcripts based on the detected personality aspects, and generating candidate assessment reports from the calculated scores. In some examples, properties of the job can include a corresponding pipeline ID, job number, data type (e.g., natural language classifier, audio, transcription, etc.). In some examples, the properties for the job can be stored by a data proxy and/or within a data storage region (e.g., orchestration data 131 in data repository 110 of FIG. 1) associated with the system 108. In some implementations, orchestration data 131 can also include job configuration data, which can include information regarding tasks associated with a particular job. For example, the job configuration data can include a job number, data source (e.g., natural language classifier, audio, etc.), worker/workstep (e.g., translation, transcript, etc.), and configuration data (e.g., processing service configuration data that is particular to the task).

In some examples, when the orchestrator 1746 starts allocating processing resources to a job, messages are initiated and exchanged between the orchestrator 1746, a job start message bus 1750, and a job finished message bus 1748. In some examples, the orchestrator 1746 can send and/or receive messages from one or more worker processing nodes that perform one or more tasks associated with processing received interview video files. In some examples, the worker processing nodes can include natural language classifier nodes 1752 and transcription nodes 1752. The natural language classifier nodes 1752 can be configured to execute one or more processes associated with detecting personality aspects within interview question transcripts. In some embodiments, the natural language classifier nodes 1752 can communicate with a machine learning service 1758 that has been specifically trained to detect personality aspects within interview question transcripts. In some aspects, the machine learning service 1758 can be configured to perform more than one type of machine learning algorithm associated with conducting video assessments of job candidate interviews (e.g., natural language classification, speech-to-text conversion). In some examples, the natural language classifier nodes 1752 can apply classifier training data to the machine learning service 1758, provide interview question transcripts to the machine learning service 1758, and process received personality aspect detection results.

In some implementations, the worker processing nodes can also include transcription nodes 1754 that can be configured to execute one or more processes associated with generating interview question transcripts from received candidate video files. The transcription nodes 1754, in some embodiments, can also communicate with the machine learning service 1758 that has been specifically trained to perform speech-to-text transcription where words and phrases associated with personality aspects can be detected with greater accuracy than other words and phrases. In some examples, the transcription nodes 1754 can apply STT training data to the machine learning service 1758, provide audio data to the machine learning service 1758, and process received interview question transcripts. In some implementations, STT conversion results generated by the machine learning service 1758 can be transmitted to the transcription nodes 1754 via a service connection node 1756.

In some examples, upon completing processing jobs or tasks, the worker nodes 1752, 1754 can transmit processing results to a finished job message bus 1748. In some implementations, the finished job message bus 1748 can operate as a post-processing node that links, organizes, and prepares video interview assessment results for presentation to employers 104, candidates 102, and/or consultants 106 prior to being transmitted to orchestrator 1746. When a processing job is complete (e.g., candidate interview question transcripts have been generated, processed, and scored), the orchestrator 1746, in some examples, notifies notification service node 1762, which in turn notifies an external computing system and/or system user. Additionally, when a pipeline for a processing job is complete, the orchestrator 1746 can also notify a result data service 1760, which generates results for presentation to a system user (e.g., candidates 102, employers 104, and/or consultants 106).

Figure 17C:
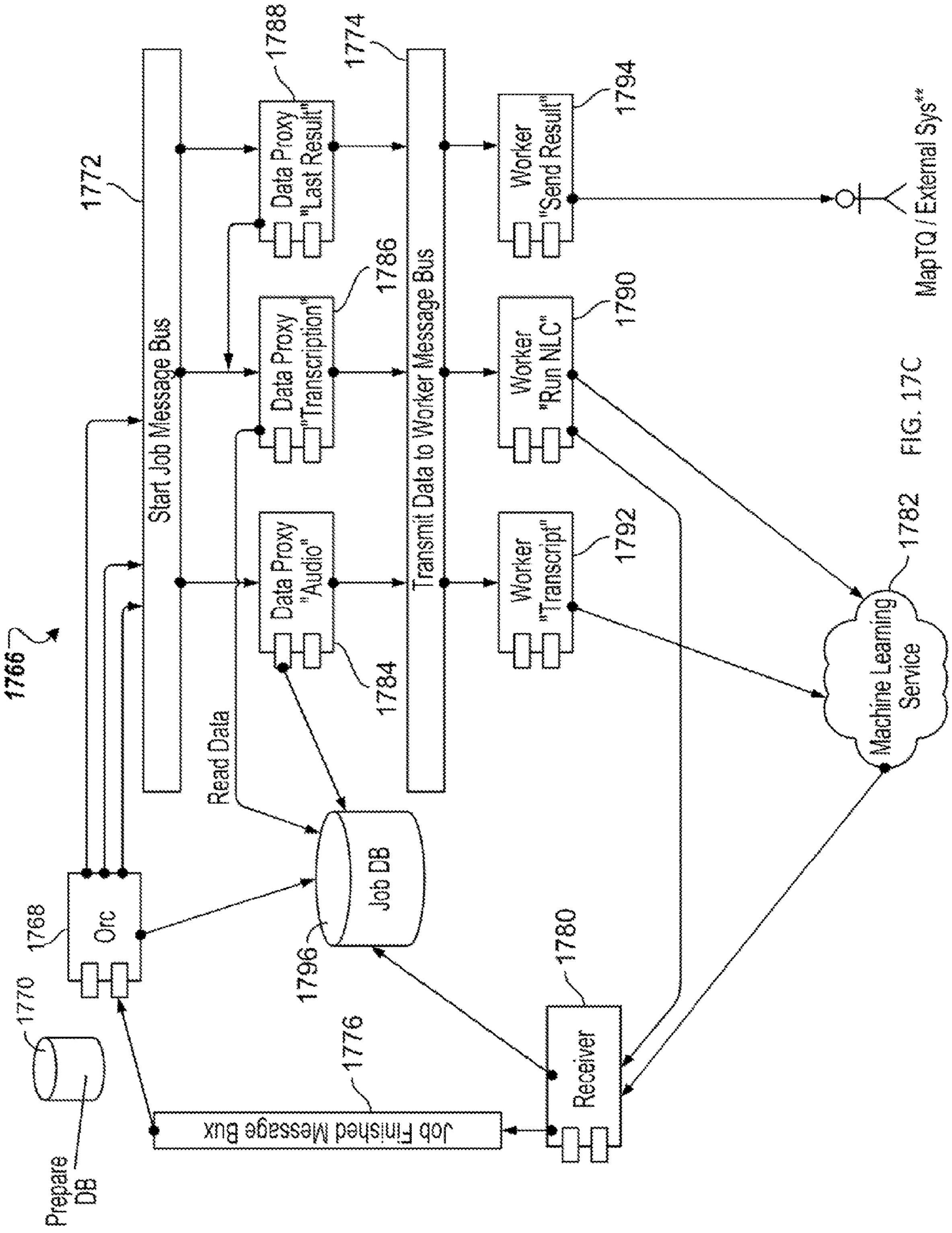

FIG. 17C illustrates another example data architecture for a video assessment system 108. In some examples, when a candidate 102 submits a set of interview question response videos to the system 108, a data pipeline is initialized for a job at orchestrator 1768. In some implementations, orchestrator 1768 stores information associated with each data pipeline (e.g., pipeline identification, status (e.g., queued, running, finished), current job number, result URL, configuration identification information) to pipeline database 1770. Additionally, for each data pipeline initialization, the orchestrator 1768 can also initialize a set of jobs that include one or more processing tasks. In some examples, data associated with each set of jobs can be stored in job database 1796. The data stored for each job in job database 1796 can include pipeline identification, job number, data type (e.g., natural language classifier, audio, transcription), and data/payload information. In some aspects, the job data can also include configuration information such as job number, data source (e.g., natural language classifier, audio, transcription), worker/workstep (e.g., translation, transcript), and job-specific configuration. In some embodiments, the data stored in job database 1796 can be accessible by data proxies 1784, 1786, 1788 for transmission to receiver processing nodes 1790, 1792, 1794.

In some examples, when the orchestrator 1768 starts allocating processing resources to a job, messages are initiated and exchanged between the orchestrator 1768, a job start message bus 1772, a data transmission message bus 1774, and a job finished message bus 1776. In some implementations, when a set of processing jobs is initialized for a data pipeline, the orchestrator 1768 can send messages to start job message bus 1772 to generate data access messages for transmitting to data proxies 1784, 1786, 1788 to start collecting data for use by worker processing nodes 1790, 1792, 1794. In some embodiments, the data proxies can include an audio data proxy 1784 that accesses extracted audio data, a transcription data proxy 1786 that accesses interview question transcripts, and a last result data proxy 1768 that accesses the last generated video assessment results for preparation and presentation to system users. Each of the data proxies 1784, 1786, 1788 transmits any accessed data associated with processing tasks to data transmission message bus 1774, which in turn transmits messages with data for processing to a respective worker processing node 1790, 1792, 1794.

In some examples, the data transmission message bus 1774 sends and/or receives messages from one or more worker processing nodes 1790, 1792, 1794 that perform one or more tasks associated with processing received interview video files. In some examples, the worker processing nodes can include natural language classifier nodes 1790, transcription nodes 1792, and result generation nodes 1794. The natural language classifier nodes 1790 can be configured to execute one or more processes associated with detecting personality aspects within interview question transcripts. In some embodiments, the natural language classifier nodes 1790 can communicate with a machine learning service 1782 that has been specifically trained to detect personality aspects within interview question transcripts. In some aspects, the machine learning service 1782 can be configured to perform more than one type of machine learning algorithm associated with conducting video assessments of job candidate interviews (e.g., natural language classification, speech-to-text conversion). In some examples, the natural language classifier nodes 1790 can apply classifier training data to the machine learning service 1782, provide interview question transcripts to the machine learning service 1782, and process received personality aspect detection results.

In some implementations, the worker processing nodes can also include transcription nodes 1792 that can be configured to execute one or more processes associated with generating interview question transcripts from received candidate video files. The transcription nodes 1792, in some embodiments, can also communicate with the machine learning service 1782 that has been specifically trained to perform speech-to-text transcription where words and phrases associated with personality aspects can be detected with greater accuracy than other words and phrases. In some examples, the transcription nodes 1792 can apply STT training data to the machine learning service 1782, provide audio data to the machine learning service 1782, and process received interview question transcripts.

In some examples, upon completing processing jobs or tasks, the worker nodes 1790, 1792 and/or machine learning service 1782 can transmit processing results to a finished job message bus 1776 via data receiver node 1780. In some implementations, the finished job message bus 1776 and/or receiver node 1780 can operate as one or more post-processing nodes that link, organize, and prepare video interview assessment results for presentation to employers 104, candidates 102, and/or consultants 106. When a processing job is complete (e.g., candidate interview question transcripts have been generated, processed, and scored), the orchestrator 1768, in some examples, generates notifies start job message bus 1772 to notify result generation data proxy 1788 to access assessment result data for presentation to a system user. In some examples, result generation data proxy 1788 transmits accessed result data to data transmission message bus 1774, which notifies result generation worker node 1794 to prepare video interview assessment results for presentation to the user (e.g., candidate 102, employer 104, and/or consultant 106). In some implementations, the result generation worker node 1794 can perform candidate personality aspect score calculation, rankings, and assessments and prepare the calculated results for presentation at one or more user interface screens.

In some embodiments, components of workflows 1742 and 1766 shown in FIGS. 17B and 17C (e.g., orchestrator, data proxies, message buses, worker nodes, etc.) may communicate with one another via messages that can be configured in predetermined formats. In some examples, generated messages may be maintained in message queues at one or more message buses (e.g., start job message bus, job finished message bus, data transmission message bus). Message queues can also be maintained for direct communication between system components (e.g., between worker nodes, receiver nodes, and/or machine learning services). For example, messages transmitted from a client system to an orchestrator to start a pipeline can include user interface identification, a pipeline identification, a client authentication token, status and/or data endpoints, status types, and formal data structure properties (e.g., data location, actual data itself). Similarly, when a client system is requesting data from an orchestrator, in some implementations, the associated messages can include a user interface identification, a pipeline identification, and an authentication token.

In some implementations, messages transmitted from an orchestrator to a data proxy can include a pipeline identification, a job number, a worker, and a job-specific configuration. Messages transmitted from a data proxy to a worker node (via data transmission message bus) can include a pipeline identification, a job number, data/payload, and job-specific configuration information. In some examples, messages from a worker node to a receiver node or machine learning service can include a pipeline identification, job number, data type, and data/payload. Additionally, messages transmitted from receiver to orchestrator can include pipeline identification, job number, and a successful completion indicator.

Figure 17D:
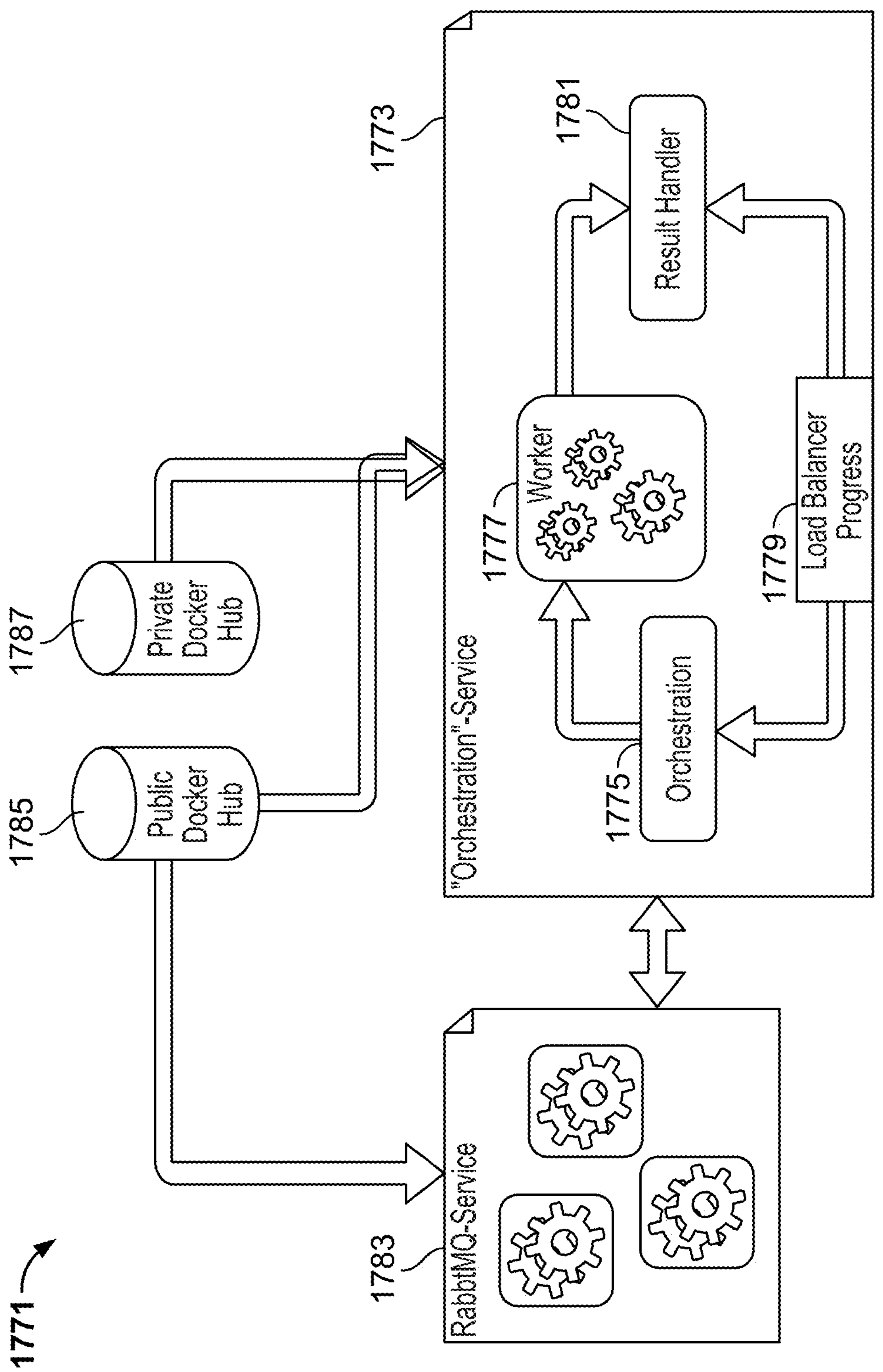
FIG. 17D illustrates a workflow configuration for data processing clusters of a video assessment system.

FIG. 17D illustrates a workflow configuration for a data processing cluster 1771 of a video assessment system 108 (FIG. 1). In some implementations, the data processing cluster 1771 can include an orchestration service 1773, a message queuing service 1783, a private data store 1787, and a public data store 1785. In some implementations, orchestration service 1773 includes an orchestrator node 1775 that manages and controls the allocation of processing resources to perform one or more processing tasks associated with performing candidate video assessments (e.g., extracting audio data from video files, performing STT conversion, detecting personality aspects within question transcripts, scoring candidate responses). In some examples, the orchestration service 1773 can include a load balancer 1779 that assists the orchestrator 1775 with balancing processing tasks across one or more worker processing nodes 1777. The worker processing nodes 1777 can include natural language classifier nodes, transcription nodes, and result generation nodes as described above in FIGS. 17B and 17C. In some implementations, the worker processing nodes 1777 can pass processing outputs to a result handler 1781 for post-processing to prepare the processing outputs for presentation to system users.

In some embodiments, the data processing cluster 1771 can also include a message queuing service 1783 that manages one or more data queues associated with components of the data processing cluster 1771. In one example, the message queuing service 1783 is a RabbitMQ messaging service. In some implementations, the message queueing service 1783 can manage and process message queues from the orchestration service 1773 and/or one or more public data stores 1785 such as a public Docker Hub. In some examples, the orchestration service 1773 can also receive data from private (e.g., internal) data stores 1787 and public (e.g., external) data stores 1785 for processing by worker processing nodes 1777.

Returning to FIG. 1, in some examples, the video assessment system 108 can include other processing engines that enhance the number of assessed features of candidate interview question videos by extracting and processing additional features from the candidate video data 112. In one example, the system 108 can include a video processing engine that detects features related to facial expressions and body language of the candidate 102 while responding to an interview question. The body language features can be used by the video assessment system 108 to inform the personality aspect detection and scoring of the STT transcript data 128 for the respective question. For example, the video processing engine can be trained to detect body language and facial expression identifiers that are associated with each of the personality aspects of the personality model 500 (FIG. 5). For example, size of a candidate's pupils during parts of the interview, hand gestures, and posture during a response are just some of the detectable features that can be used to inform the personality aspect analysis. Additionally, the system 108 can be configured to match detected non-verbal features from the video with detected personality aspect identifiers within the interview question transcripts based on the timing of when the events occurred. In some examples, when a non-verbal identifier (from video) corresponds with a detected verbal identifier (from transcript), then the candidate scoring engine 140 may increase (or decrease) the score for the respective personality aspect based on the correspondence of the verbal and non-verbal identifiers. In some implementations, the video processing engine can be configured to detect responses to some interview questions. For example, if an interview question has a yes or no aspect to it, then video processing engine can be configured to detect whether the candidate has responded with a "yes" or a "no" answer. In addition to detecting responses to close-ended questions (e.g., "yes/no" questions), the system 108 can be configured to detect non-verbal aspects of the response (e.g., prosodic and facial expression features) that can be indicators of the response.

In some examples, in addition to detecting personality aspects, the video assessment system 108 can also include a response classifier that employs a trained natural language classifier to determine whether the candidate 102 has actually responded to the interview question that was asked. Because candidates 102 submit their responses in an unsupervised environment (for example, there is no interviewer watching their responses in real time to provide immediate feedback if they fail to answer the question), candidates 102 may be able to inadvertently or purposefully trick the system 108 by submitting an interview question response that does not answer the corresponding question. In some implementations, for each interview question, a natural language classifier can be trained to detect keywords and phrases that indicate that the candidate has responded to the question. For example, for an interview question asking the candidate 102 to describe an example of a setback she encountered and how she bounced back, the natural language classifier can be configured to detect words and phrases associated with describing setbacks, hardships, or failures in the work environment. If the classifier determines with a predetermined amount of confidence that the candidate 102 has not sufficiently responded to the interview question, then in some examples, a data quality error can be generated. In some examples, the system 108 can output a notification to the candidate 102 requesting that she resubmit a response that responds to the respective question. In other examples, the response may be flagged for manual review by an employer 104.

Figure 16:
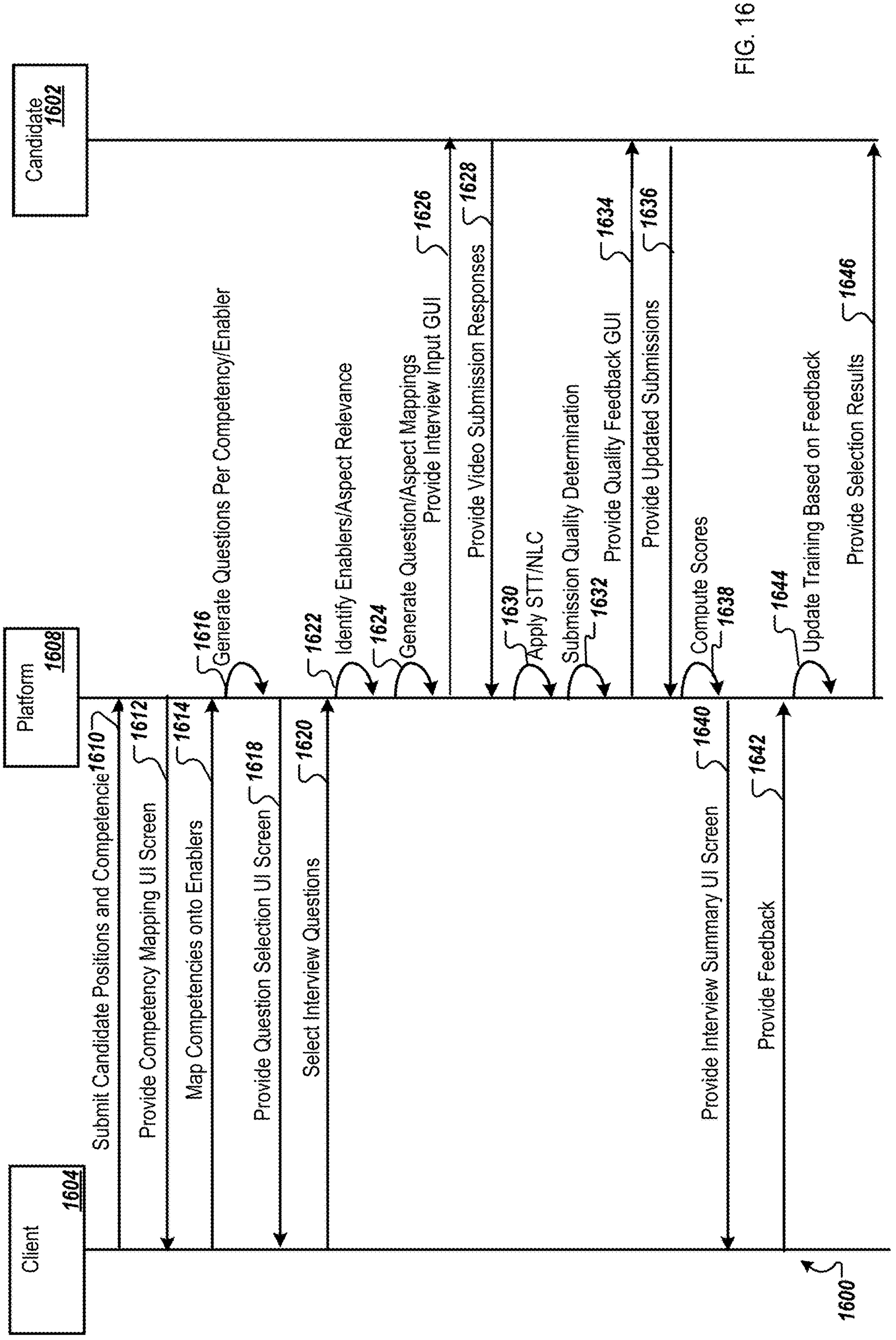
FIG. 16 is a swim lane diagram illustrating example communication flows between components of a video assessment system.

Turning to FIG. 16, a diagram is illustrated showing communication flows during a video assessment process 1600 between processing components and participants including candidates 102, employers 104, consultants 106, processing engines, and data repositories of the video assessment system 108. For example, the diagram 1600 shows communication flows between a system platform 1608, candidates 1602, and clients 1604. The video assessment processing 1600, for example, may be support by the environment 100 of FIG. 1, where the platform 1608 represents the system 108, the candidates 1602 represent candidate computing systems 102, and the clients 1604 represent employer computing system 1604 and/consultant computing systems 106.

In some implementations, the video assessment process 1600 begins with a client 1604, such as an employer looking to post one or more available job positions to the platform 1608, submitting information to the platform regarding one or more candidate positions and competencies associated with each respective position (1610). In some examples, the client 1604 provides the available job position information to the platform 1608 via one or more system-provided UI screens. In some examples, the UI screens may provide a series of drop-down or selection windows that allow the clients 1604 to select the available positions from a list of commonly selected or previously provided positions. For example, a financial firm may have repeatedly occurring openings for financial analysts or a retail company may often solicit applications for in-store cahiers or customer service representatives. In some embodiments, the UI screens can also include free text input fields that allow clients 1604 to provide information regarding a new open position. In some examples, the client 1604 can also provide administrative details regarding the identified available positions such as years of experience, education qualifications, and projected start date. The platform 1608, in some implementations, can also provide UI screens to computing devices of clients 1604 to identify competencies associated with each identified available position. In some examples, the competencies can be any skill or attribute that an employee for the available should possess. For example, competencies for a position identified by a client 1604 can include, but are not limited to, motivation, ambition, self-awareness, and resilience.

In some embodiments, responsive to receiving identified positions and competencies for one or more available job positions from a client 1604, the platform 1608 can provide a competency mapping UI screen (1612) that allows the client 1604 to map the identified competencies to one or more enabler attributes (1614) (see competency-enabler attribute mapping table 200 in FIG. 2). In some examples, enabler attributes are sets of standardized attributes that provide a translation or conversion mechanism for translating employer-identified competencies into personality aspects that can be automatically identified from an interview transcript by the platform 1608 implementing a specially trained natural language classifier (NLC).

In some implementations, responsive to receiving the submitted competency/enabler attribute mappings from the client 1604, the platform 1608 provides the client 1604 one or more question selection UI screens (1618) that allow the client to select interview questions associated with the identified competencies and enabler attributes (1620). In some examples, the mapped enabler attributes allow the platform 1608 to convert client-identified job competencies to personality aspects of a personality model that are detectable by a trained natural language classifier. In some implementations, in response to receiving competency-enabler attribute selections, the platform 1608 produces an interview question selection UI screen that allows clients 1604 to select interview questions for the position that align with each of the employer-identified competencies (see interview questions 300 in FIG. 3). In some implementations, the interview question selection UI screen provides sets of questions for selection based on the identified enabler attributes (see question-enabler mapping table 400 in FIG. 4). By selecting interview questions targeted to the identified enabler attributes from the competency-enabler mapping, the questions are also tailored to the identified competencies.

Based on the selected interview questions, in some implementations, the platform 1608 identifies positive and negative personality aspects from a personality model that are associated with each of the each of the mapped enabler attributes (1622) (see enabler-aspect mapping table 600 in FIG. 6). Additionally, the platform 1608 can determine a relevance of each identified personality aspect to the respective enabler attribute based on how closely correlated an aspect is to a respective enabler. In one example, relevance for each enabler-aspect pair is scored on a scale from one to five with five indicating a highest amount of relevance between the enabler-aspect pair. As can be understood, any type of scale or range of scores can be applied to the amount of relevance of interview questions to enabler attributes (e.g., percentage, high/medium/low, one to ten). In some embodiments, the platform 1608 can also map each of the identified competencies for an available position to one or more aspects of a personality model (e.g., personality model 500 in FIG. 5). The platform 1608, in some examples, can derive competency-aspect mappings from enabler-aspect mappings like the mapping table 600 and the competency-enabler mapping 200 (FIG. 2) to generate a competency-aspect mapping table (e.g., table 700 in FIG. 7).

Using the identified personality aspects for each of the enabler attributes, in some embodiments, the platform 1604 can generate personality aspect mappings for each of the identified interview questions (1624). In some implementations, using the question-enabler mapping table 400 (FIG. 4), enabler-aspect mapping table 600, and/or the competency-aspect mapping table 700, the platform 1608 generates question-aspect mappings for each available position submitted by a client 1604 (see question-aspect mapping table 800 in FIG. 8).

In some examples, when a candidate 1602 accesses the video assessment system 108 to apply for one or more available positions, the platform 1608 provides an interview input UI screen to the candidate 1602. For example, the interview input UI screen 900 shown in FIG. 9 allows the candidate 1602 to view the interview questions for the position, record interview question responses, and link each recorded response to the respective interview question. Upon linking video response files to each respective interview question, the candidate 1602 in some examples submit the video files, which are received by the platform 1608 (1636).

In some implementations, the platform 1608 can extract an audio portion from the received video files and perform a STT conversion process and natural language classification process for each of the interview question responses (1630). In some implementations, the platform 1608 uses machine learning algorithms to combine knowledge of grammar, language structure, and the composition of audio and voice signals to accurately transcribe the human voice in received interview question files. In some implementations, the machine learning algorithm used by the platform 1608 can be trained to detect keywords, phrases, and synonyms associated with aspects in the personality model 500 (FIG. 5) with greater accuracy than other words, which in turn improves the performance of the natural language classifier detects the personality aspects within the converted transcripts.

Additionally, the platform 1608 can use the trained natural language classifier to detect positive and negative personality aspects within each of the interview question transcripts. In some implementations, the platform 1608 uses customized training data sets 124 to train the natural language classifier to detect positive and negative aspects of a personality model (e.g., personality model 500 in FIG. 5). In some examples, detected instances of both positive and negative aspect indicators can be used by the platform 1608 to assess a candidate's aptitude to excel at one or more competencies of an available position. In some implementations, the training data sets 124 can include key words, phrases, and other synonyms that can be indicative of positive and negative personality aspects associated with a personality model 500.

The platform 1608, in some embodiments, can perform one or more submission quality assessments of the received video files and/or converted interview question transcripts (1632). In one example, the platform 1608 performs audio data usability tests that include determining a signal to noise ratio for a respective video file and determines a confidence score for a speech-to-text transcript result. In some examples, the confidence score correspondence to an accuracy score for a transcript that reflects an approximate word error rate. Additionally, the platform 1608 can perform additional data quality tests that include analysis of the transcripts generated by the STT algorithm to detect instances of candidates 102 attempting to trick or cheat the system 108 by submitting interview responses that obtain artificially high scores. In some examples, the platform 1608 can be configured to detect evidence of natural speech patterns within the question transcripts to detect occurrences of candidates using short, choppy speech that includes only key words that the candidates 102 believe will achieve a higher score. In one example, the platform 1608 measures an interview question transcript for total word count. If the word count is less than a predetermined threshold, such as 185 words, then a quality error can be detected. In some implementations, the platform 1608 can also detect honest and dishonest interview question responses based on an average word length of an interview question transcript. In one example, the platform 1608 may detect a quality error if the average word length for a question transcript is less than 3 characters or over 8 characters. In some implementations, the platform 1608 can also detect repeated use of specific key phrases within a question, which may be indicative of a candidate 102 attempting to submit a fraudulent response to an interview question. In one example, the platform 1608 can detected repeated use of the phrases "I am," "I'm," and "I was," which may indicate that the candidate 102 is attempting to mask his fraudulent use keywords and adjectives by putting a phase like "I am" before a set of keywords (e.g., "I am responsible," "I am assertive").

In some implementations, if the platform 1608 detects one or more quality errors with a candidate's interview question responses, the platform 1608 may provide the candidate 1602 with a quality feedback UI screen (1634) to allow the candidate to fix and resubmit one or more interview question response submissions (1636). In some examples, if any word count and/or average word length quality errors are detected, the platform 1608 can output error notifications to the respective candidate 1602. In some aspects, the candidate 1602 can be provided another opportunity to record an interview question response for the question that produced the error. In some implementations, the platform 1608 may only provide the candidate 1602 with the opportunity to resubmit interview question responses for detected quality errors when those errors are not associated with attempts to cheat the system.

The platform 1608, in some implementations, adds each of the detected positive and negative personality aspects into groups for each of the aspects, and using the aspect groupings (e.g., groupings 1302, 1304, 1306 in FIG. 13), computes scores for the candidate 1602 for each of the aspects, total scores per question, and/or total scores per interview (1638). In some examples, the calculated scores can take into account relative numbers of positive and negative indicators for each aspect, confidence in the accuracy of the STT transcript for each question, amount of raw evidence for each personality aspect in the interview transcript, and relevance of each personality aspect to each interview question. The platform 1608 can also generate candidate rankings based on the calculated scores.

In some embodiments, the platform 1608 provides the client 1604 with one or more interview summary screens (1640) that allow the client 1604 to view candidate scores, view candidate interview response videos, and provide feedback on the scores (1642) (for example, reporting and feedback UI screen 1500 in FIG. 15). In some examples, the client 1604 can provide free text written comments and/or adjust the candidate scores based on a manual review of an interview response video. In some examples, the platform 1608 can incorporate any received comments and/or manually adjusted scores into the training data that issued to train the natural language classifier and/or STT conversion algorithm.

In some examples, the platform 1608 can update the training data used to train the natural language classifier with the feedback provided by the client 1604 (1644). In some examples, the platform can also update enabler/personality aspect relevance mapping data based on the received feedback. Updating the training data and mapping data can improve the overall detection accuracy of the natural language classifier and provides a technical solution to the technical problem of accurately automating assessments of job candidate video responses.

The platform 1608, in some aspects, can provide candidates with selection results and interview feedback based on the calculated scores and received client feedback (1646). In some examples, the selection results include feedback regarding why the candidate 1602 was or was not selected for the position. For example, the platform 1608 can use the calculated candidate scores and ranking information as well as feedback data 123 provided by the client 1604 evaluating the interview response to generate a sanitized candidate report summary. In some implementations, generating the sanitized candidate report summary can include converting any overly negative comments provided by the client 1604 into slightly more positive language that still conveys to the candidate 1602 where he has room for improvement.

In some examples, the ordering of communication flows of the video assessment process 1600 may occur in a different order than shown in FIG. 16. For example, the platform 1608 may provide candidates 1602 with submission quality feedback information (1634) prior to the STT and natural language classifier algorithms being applied to the responses (1630) and/or after candidate aspect scores are computed (1638). Additionally, one or more communication flows shown in FIG. 16 may occur simultaneously or in parallel. For example, submission quality determinations (1632) may be made in parallel with candidate score computations (1638).

Figure 18:
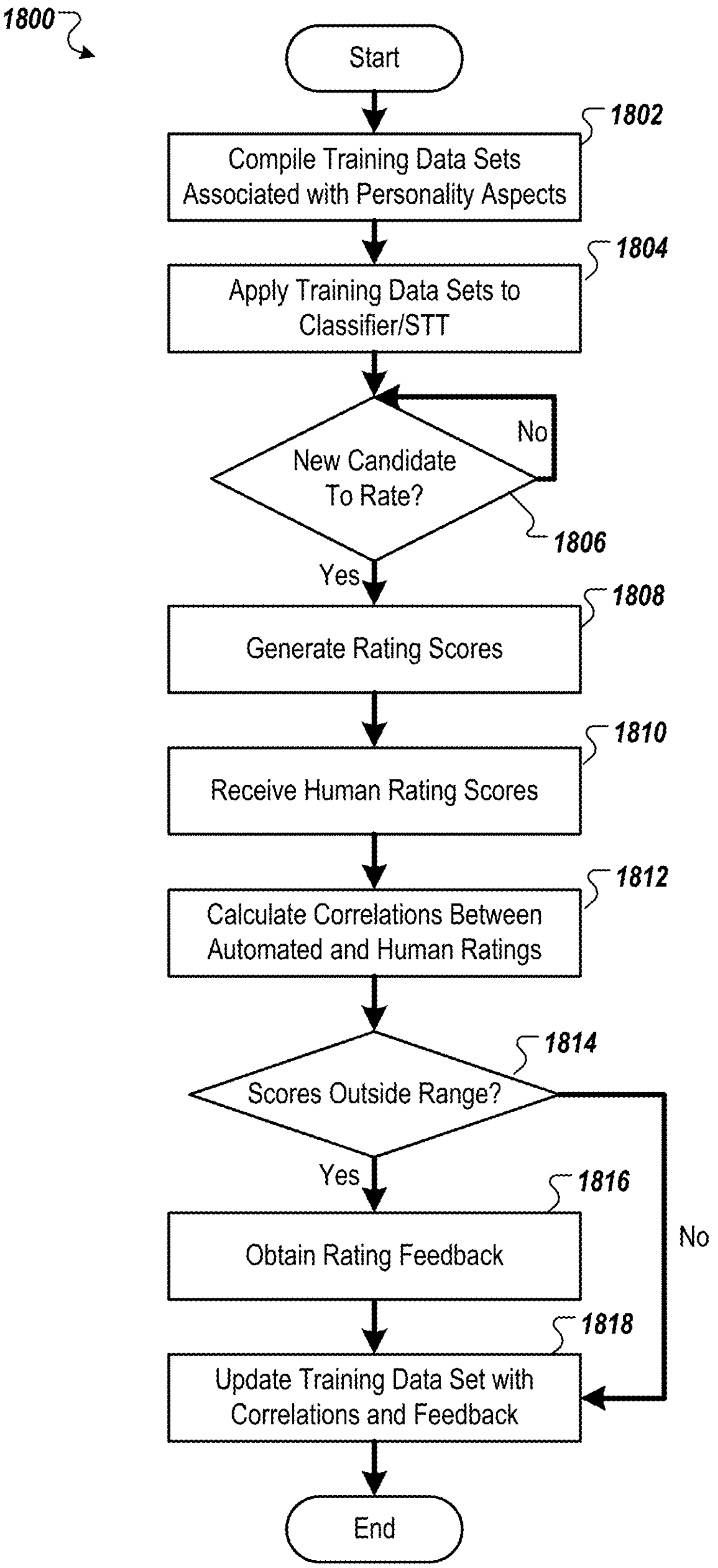
FIG. 18 illustrates a flow chart of an example method for training a natural language classifier.

Turning to FIG. 18, a flow chart of an example method 1800 for training a natural language classifier and/or STT conversion algorithm is illustrated. In some implementations, the method 1800 can be performed by data management engine 132, user management engine 130, candidate scoring engine 140, and/or AI training engine 142 of video assessment system 108 (FIG. 1). In some implementations, the method 1800 begins with compiling training data sets (e.g., training data sets 124 in FIG. 1) associated with positively and negatively polarized personality aspects of a personality model (e.g., personality model 500 in FIG. 5) (1802). In some implementations, the training data sets can include key words, phrases, and other synonyms that can be indicative of positive and negative personality aspects associated with a personality model (e.g., personality model 500 in FIG. 5). In some implementations, the training data sets 124 may include multiple data sets each associated with a different language and/or dialect. In some examples, the AI training engine 142 can train multiple natural language classifiers with a respective language's training data set. Therefore, the video assessment system 108 can accommodate candidate interview responses that are submitted in any detectable language.

In some embodiments, the compiled training data sets are applied to one or more machine learning algorithms associated with the video assessment system 108 (1804). For example, the AI training engine 142 can apply the training data sets to a natural language classifier to train the classifier to detect personality aspects within interview question transcripts. Additionally, a portion of the training data sets can also be applied to a STT conversion algorithm to improve the accuracy of STT conversion of words associated with personality aspects. For example, the training data 124 of customized words, phrases, and synonyms make up a customized dictionary for the STT algorithm. In some examples, the entries in the customized dictionary are assigned a higher identification priority (weight) than other words, making the entries more resistant to missed detection. In one example, the customized dictionary used to train the STT algorithm includes over 16,000 words and phrases plus synonyms associated with each of the entries.

When a candidate submits video responses to a set of interview questions for a position (1806), then in some examples, the information associated with the automated assessment of the candidate's responses, as well as manual feedback from human raters, can be incorporated into the training data sets. For example, for each set of scores generated by the candidate scoring engine 140 for a candidate's responses (1808), in some examples, reporting and feedback engine 152 can obtain manual scoring data from employers 104 and/or consultants 106 (1810). In some implementations, the AI training engine 142 can obtain human ratings for all candidates submitting interview question responses. In other examples, the AI training engine 142 can obtain human ratings for a predetermined number or percentage of candidates.

In some implementations, the system 108 (e.g., AI training engine 142 and/or candidate scoring engine 140) can calculate correlations between the automated and human (manual) ratings of a candidate (1812), which indicate how well the automated and human ratings track one other. In some examples, the comparisons/correlations of human rating data and classifier rating data are fed back into the natural language classifier of the language classification engine 138 and STT conversion engine 134 as training data 124.

If at least one of the automated and/or manual ratings is outside of a predetermined range (1814), then the AI training engine 142 can obtain rating feedback regarding why the rater scored the candidate how they did (1816). In the case of an automated rating, in some embodiments, this feedback information can include detected personality aspect indicators within each of the question transcripts. In the case of manual ratings, in some implementations, the feedback information can include free text comments from reviewers regarding why the respective review scored the candidate the way they did. In some cases, when the manual and/or automated scoring data is very high (e.g., greater than 4.5 on a scale of 1 to 5) or very low (e.g., less than 1.5 on a scale of 1 to 5), the AI training engine 142 can obtain additional information for why the human rater and/or automated rater (for example, the personality aspects detected by the natural language classifier that are used by the candidate scoring engine 140 to calculate candidate scores) scored the candidate with such a high or low score.

In some implementations, the AI training engine 142 updates the training data sets with the automated and manual candidate scores, correlations, and feedback (1818) and applies the updated training data sets to the natural language classifier and/or STT conversion algorithm.

Although illustrated in a particular series of events, in other implementations, the steps of the machine learning classifier training process 1800 may be performed in a different order. For example, generation of candidate rating scores (1808) may be performed before, after, or simultaneously with receiving human rating scores for the candidate (1810). Additionally, in other embodiments, the recommendation process may include more or fewer steps while remaining within the scope and spirit of the machine learning classifier training process 1800.

Figure 19:
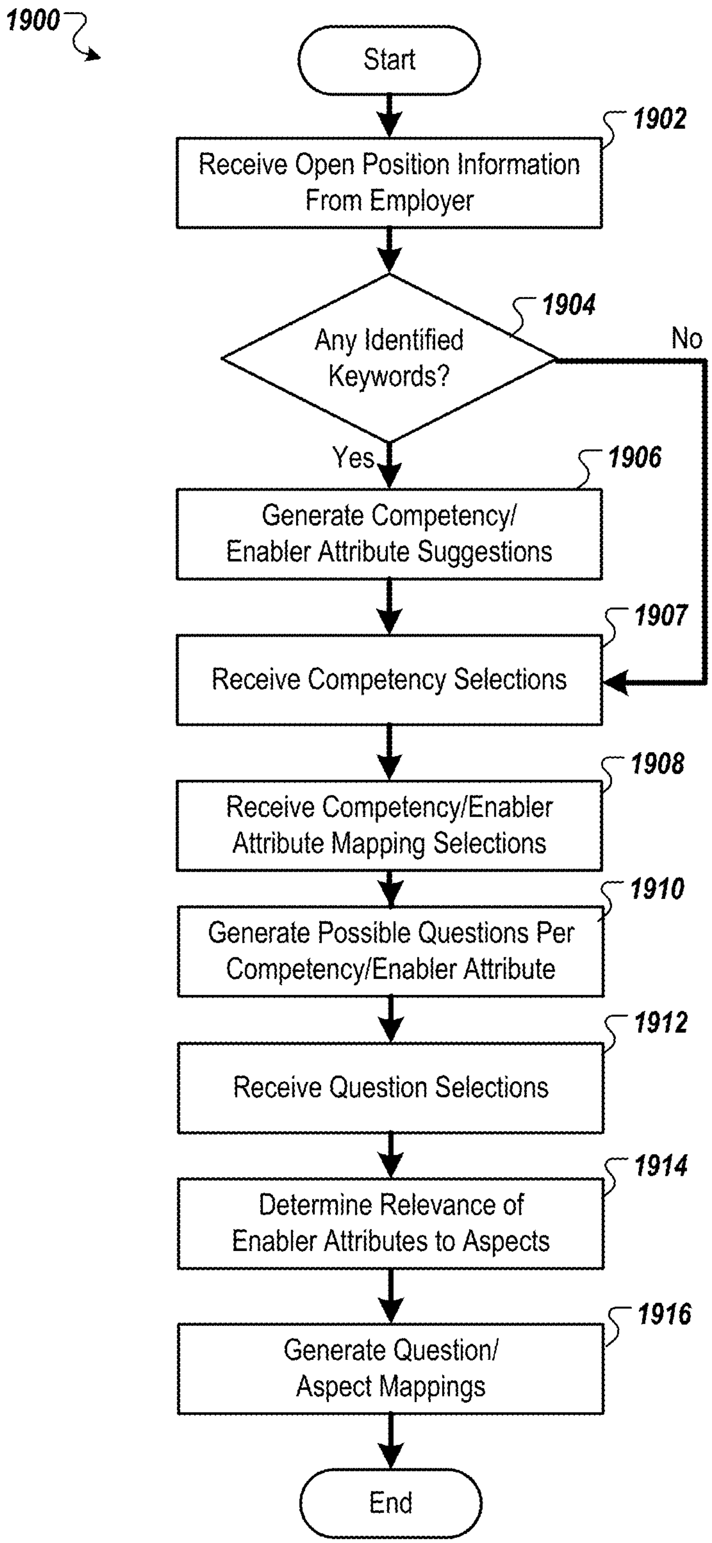
FIG. 19 illustrates a flow chart of an example method for generating question/aspect mappings for an available position.

FIG. 19 illustrates a flow chart of an example method 1900 for generating question-aspect mappings for an available position. In some implementations, the method 1900 can be performed by employer management engine 144 and enabler-aspect mapping engine 148 of video assessment system 108 (FIG. 1).

In some implementations, the method 1900 begins with the video assessment system 108 receiving open position information from an employer 104 via one or more system-provided UI screens (1902). In some examples, the UI screens may provide a series of drop-down or selection windows that allow the employers 104 to select the available positions from a list of commonly selected or previously provided positions. For example, a financial firm may have repeatedly occurring openings for financial analysts or a retail company may often solicit applications for in-store cahiers or customer service representatives. In some embodiments, the UI screens can also include free text input fields that allow employers 104 to provide information regarding a new open position. In some examples, the employer 104 can also provide administrative details regarding the identified available positions such as years of experience, education qualifications, and projected start date.

If any predetermined keywords are detected within the submitted position information (1904), then in some examples, the employer management engine 144 can generate one or more competency/enabler attribute suggestions for the position (1906). In some examples, if the employer 104 has used the video assessment system 108 for the same type of position in the past, the employer management engine 144 can suggest previously identified competencies for the position at a competency selection UI screen. The employer 104 can in turn modify the list of competencies in the competency model by adding or removing competencies from the competency model or can accept the previously used list of competencies. Additionally, the employer management engine 144, can auto-populate the competency model for a newly created position with the competencies commonly linked to all and/or certain types of positions associated with the employer 104 based on the position competency data 116. In some examples, the employer management engine 144 may also use competency model information for positions of other employers 104 to identify competency suggestions for an available position. For example, the employer management engine 144 can identify competency trends across different types of positions for all of the employers 104 that use the video assessment system 108 to process and assess job applicant interviews and provide any identified trends to the employer 104. For example, the employer management engine 144 may determine that employers 104 identify assertiveness as a competency for manager positions and in turn suggest assertiveness as a competency if an employer 104 submits available position information for a manager. Similarly, the employer management engine 144 can generate sets of suggested enabler attributes that have previously been mapped to any of the suggested competencies. In some embodiments, the employer management engine 144 receives competency/enabler attribute selections competency selection UI screen (1907).

In some implementations, employer management engine 144 can receive enabler attribute mapping inputs for each identified competency at one or more UI screens (e.g., competency-enabler mapping table 200 in FIG. 2) (1908). In some embodiments, in response to receiving a set of competencies for an available position from an employer 104, the employer management engine 144 can generate one or more UI screens for mapping each identified competency to one or more enabler attributes. In some examples, enabler attributes are sets of standardized attributes that provide a translation or conversion mechanism for translating employer-identified competencies into personality aspects that can be automatically identified from an interview transcript by a language classification engine 138 implementing a specially trained natural language classifier (NLC). In some examples, employers 104 and consultants 106 can interact with each other via one or more system-provided UI screens, which allows the consultants 106 to educate and assist the employers 104 in identifying the appropriate enabler attributes for each of the competencies in the competency model for the position. If a particular competency has been previously identified by the employer 104 for another position or a previous iteration of the same position, then the employer management engine 144 may provide the previous enabler attribute mappings as suggested enabler attributes for one or more of the identified competencies.

In some implementations, based on the received competency/enabler attribute submissions, enabler-aspect mapping engine 148 can generate sets of possible interview questions that align with the selected competencies/enabler attributes for the position (1910) and presents the question possibilities to employers 104 for selection at one or more UI screens (e.g., question selection UI screen 400 in FIG. 4). For each enabler attribute identified for an available position, the employer 104 can select one or more interview questions from a menu provided in the UI screen. By selecting interview questions targeted to the identified enabler attributes from the competency-enabler mapping, the questions are also tailored to the identified competencies.

In response to receiving interview question selections for the position from employers 104 (1912), in some examples, the enabler-aspect mapping engine 148 can determine the relevance of each competency and enabler attribute to the personality aspects associated with each question (e.g., enabler-aspect mapping table 600 in FIG. 6) (1914). In some implementations, the enabler-aspect mapping engine 148 applies a relevance value to each enabler attribute-aspect pair based on how closely correlated an aspect is to a respective enabler. In one example, relevance for each enabler attribute-aspect pair is scored on a scale from one to five with five indicating a highest amount of relevance between the enabler-aspect pair. In some implementations, stored enabler-aspect relevance data can be based on personality-based research. In some implementations, the enabler-relevance aspect data can also be updated over time based on feedback received from employers 104 and/or consultants 106 as well as updated training set data for the natural language classifier. In some embodiments, the enabler-aspect mapping engine 148 can also map each of the identified competencies for an available position to one or more personality aspects of the personality model 500 (FIG. 5). The enabler-aspect mapping engine 148, in some examples, can derive competency-aspect mappings from enabler-aspect mappings like the mapping table 600 (FIG. 6) and the competency-enabler mapping 200 (FIG. 2) (see competency-aspect mapping table 700 in FIG. 7).

In some implementations, using the competency-aspect and/or enabler-aspect mappings, the enabler-aspect mapping engine 148 can generate question/aspect mappings for the available position in which each selected interview question is mapped against each of the personality aspects in the personality model (see question-aspect mapping table 800 in FIG. 8) (1916). In some implementations, the relevance values for each question-aspect pair in the table 800 can reflect a cumulative relevance score for all of the enabler attributes associated with a particular question. In some examples, the data structure of the question mapping table 800 (in addition to the enabler-aspect mapping table 600, competency-aspect mapping table 700, and question-enabler mapping table 400) improves the processing efficiency of the video assessment system 800 by providing a structure that streamlines interview score computations and candidate assessments as discussed further below. In particular, having a single data structure that includes relevance scores for each aspect per interview question enables the candidate scoring engine 140 to more swiftly calculate per-aspect, per-question, and per-candidate scores.

Although illustrated in a particular series of events, in other implementations, the steps of the question-aspect mapping generation process 1900 may be performed in a different order. For example, receiving competency/enabler attribute mapping selections (1908) may be performed before, after, or simultaneously with generating possible questions per competency/enabler attribute (1910). Additionally, in other embodiments, the recommendation process may include more or fewer steps while remaining within the scope and spirit of the question-aspect mapping generation process 1900.

Figure 20:
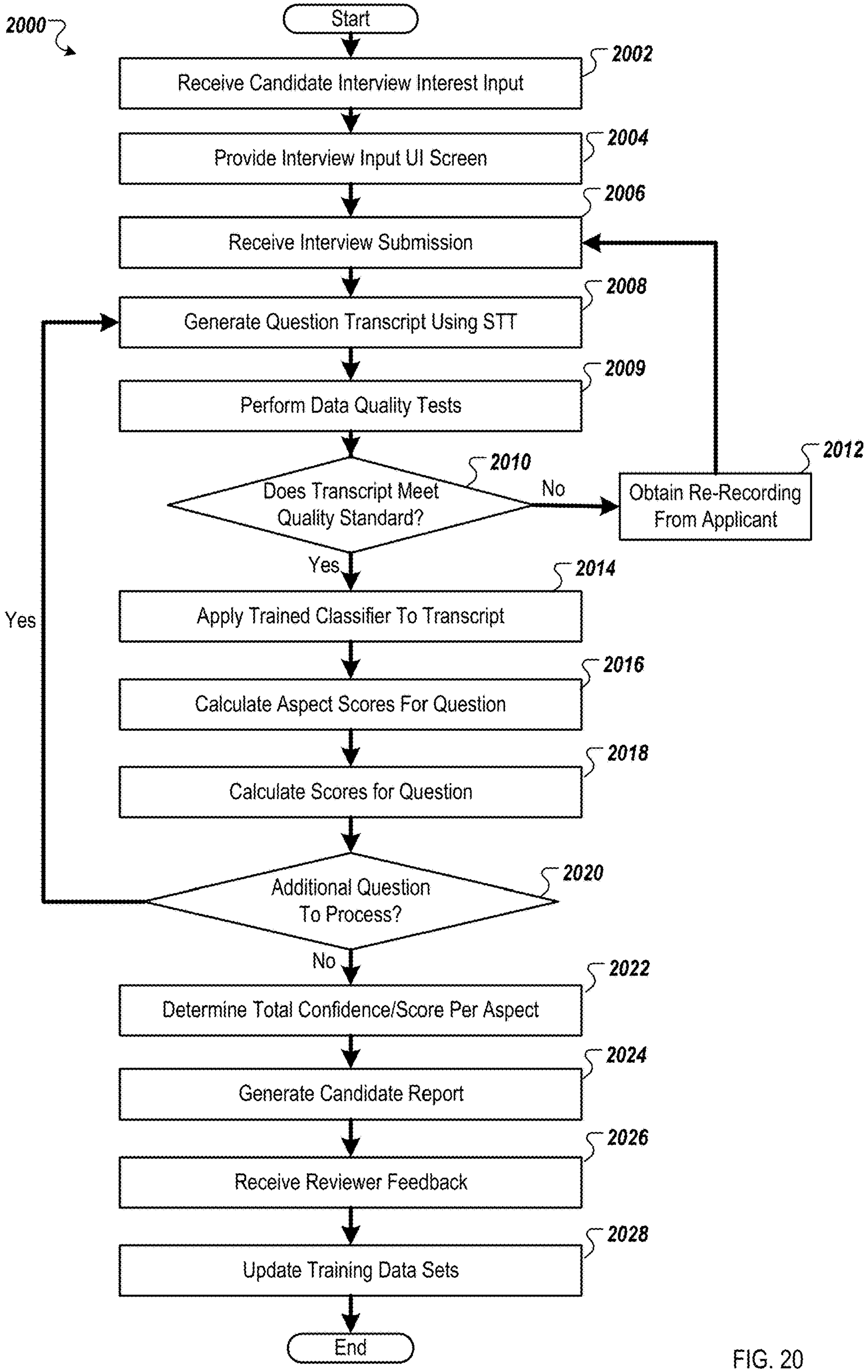
FIG. 20 illustrates a flow chart of an example method for performing a candidate video assessment.

FIG. 20 illustrates a flow chart of an example method 2000 for performing a candidate video assessment. In some implementations, the method 2000 is performed by user management engine 130, data acquisition engine 146, STT conversion engine 134, language classification engine 138, candidate scoring engine 140, and reporting and feedback engine 152 of video assessment system 108 (FIG. 1).

In some implementations, the method 2000 begins with user management engine 130 receiving an interview interest input from a candidate 102 indicating that the candidate 102 wishes to apply for at least one available position advertised by the system 108 (2002). In response to receiving the interview interest input, in some implementations, data acquisition engine 146 provides the candidate with an interview input UI screen (e.g., question summary UI screen 900 in FIG. 9) that allows the candidate to record and link video interview question responses to each question for the position (2004).

In some implementations, upon receiving a candidate interview submission, data acquisition engine 146 scans, processes, organizes, and stores the submitted video files (2006). In some implementations, the data acquisition engine 146 can also perform other types of pre-processing to improve the efficiency of speech-to-text transcript generation by the video assessment system 108. For example, the data acquisition engine 146 can automatically extract audio data from each received video file and save the extracted audio data in a separate file with its corresponding video as part of the candidate video data 112.

In some embodiments, STT conversion engine 134 converts the audio data of each captured video interview question into written text in real-time (2008). In some implementations, the STT conversion engine 134 uses a Speech-To-Text Service to perform the STT conversion. In some implementations, the STT conversion engine 134 uses machine learning algorithms to combine knowledge of grammar, language structure, and the composition of audio and voice signals to accurately transcribe the human voice in received interview question files.

In some implementations, STT conversion engine 134 and/or data quality assessment engine 136 perform one or more data quality tests on the interview question transcripts (2009). In some embodiments, performing the one or more data quality tests can include calculating a DQI for each interview question transcript that is based on a transcript quality score (confidence score), amount of information score, and/or trustworthiness score. In some examples, if a transcript does not meet one or more predetermined quality standards (2010), then in some examples, data acquisition engine 146 obtains a re-recorded submission from the candidate (2012). In one example, the data quality tests performed by the data quality assessment engine 136 include audio data usability tests, STT confidence score (e.g., word error rate) tests, and other tests to determine whether the candidate 102 is trying to trick the system 108 by submitting a fraudulent response. For example, the data quality assessment engine 136 can be configured to detect evidence of natural speech patterns within the question transcripts to detect occurrences of candidates using short, choppy speech. In one example, the data quality assessment engine 136 measures an interview question transcript for total word count, average word length, and/or repeated use of predetermined phrases. If any of these data quality metrics are outside of predetermined ranges, then the data quality assessment engine 136 can generate a data quality error and request a response resubmission.

In some implementations, language classification engine 138 can apply a trained natural language classifier to an interview question transcript to detect positive and negative personality aspect identifiers within the transcript (2014). In some examples, the language classification engine 138 uses a natural language classifier that has been specifically trained to detect personality aspects within interview question transcripts (e.g., identified personality aspect identifiers 1202-1226 in transcript 1200 shown in FIG. 12). The natural language classifier of the language classification engine 138, in some embodiments, assigns a positive or negative polarity to each detected identifier based on whether the respective identifier is associated with a positive or negative feature of the personality aspect. In some embodiments, the language classification engine 138 organizes the detected personality aspects (e.g., personality aspects 1202-1226 in FIG. 12) into groups based on the personality aspect each identifier is associated with (for example, see groupings 1302-1306 in FIG. 13).

In some embodiments, candidate scoring engine 140 calculates aspect scores for each question based on the detected personality aspect identifiers within an interview question transcript (2016) and total scores for each question (2018). In some examples, the calculated scores can take into account relative numbers of positive and negative indicators for each aspect, confidence in the accuracy of the STT transcript for each question, amount of raw evidence for each personality aspect in the interview transcript, and relevance of each personality aspect to each interview question. In some examples, the candidate scoring engine 140 can also compute a raw evidence score for each aspect and question that indicates how much information a candidate 102 provided for each of the aspects per interview question. In some implementations, the candidate scoring engine can use the raw evidence score, positive identifiers, and relevance of the aspect to the question to calculate a confidence score that measures certainty regarding the accuracy of the score for a respective question. For example, if the relevance of a personality aspect on a question is high but a candidate 102 has provided little or no information related to the aspect, then the confidence score reduces the total question score (TSQ) for the aspect. Even if an aspect has little to no relevance to a particular question, the candidate scoring engine 140 can still calculate the raw evidence score and confidence score for the aspect.

In some implementations, when aspect scores for all questions have been generated (2020), the candidate scoring engine 140 can use the calculated scores per aspect per question SQ and total scores per aspect TSQ to calculate scores per employer-identified competency for the available position (2022). In some implementations, using the confidence scores for each question, the candidate scoring engine 140 can calculate a total confidence per aspect across an entire interview that includes multiple interview questions. Additionally, the candidate scoring engine 140 can calculate a total score per aspect from all question-level aspect scores and confidence scores. In some examples, the TSQ is calculated relative to the confidence score in order to account for how much information relevant to each personality aspect a candidate 102 has provided. In some implementations, the candidate scoring engine 140 can access the question mapping data 120 (e.g., question-aspect mapping table 800 in FIG. 8 and competency-aspect mapping table 700 in FIG. 7) for the position and can convert the calculated scores per aspect to scores per competency.

In some implementations, reporting and feedback engine 152 can generate a candidate report that provides candidate scoring results to employers 104 and/or consultants 106 via one or more UI screens (2024). In some examples, the reporting and feedback engine 152 can present the personality aspect scores for each question in a UI screen and provides input fields for employers 104 to provide feedback on the scores and responses (e.g., reporting and feedback UI screen 1500 in FIG. 15). In some examples, the feedback provided at the UI screen can include free text comments on the provided candidate scoring results as well as any manual scoring adjustments that employers 104 may make in response to viewing the video interview question responses (2026). In some examples, AI training engine 142 updates the training data sets with the system-generated scoring data as well as any manual adjustments and/or feedback comments provided by employers 104 and/or consultants 106 (2028).

Although illustrated in a particular series of events, in other implementations, the steps of the candidate video assessment process 2000 may be performed in a different order. For example, performing data quality tests on interview question transcripts (2009) may be performed before, after, or simultaneously with applying the trained natural language classifier to the response transcript (2014). Additionally, in other embodiments, the recommendation process may include more or fewer steps while remaining within the scope and spirit of the candidate video assessment process 2000.

Figure 21:
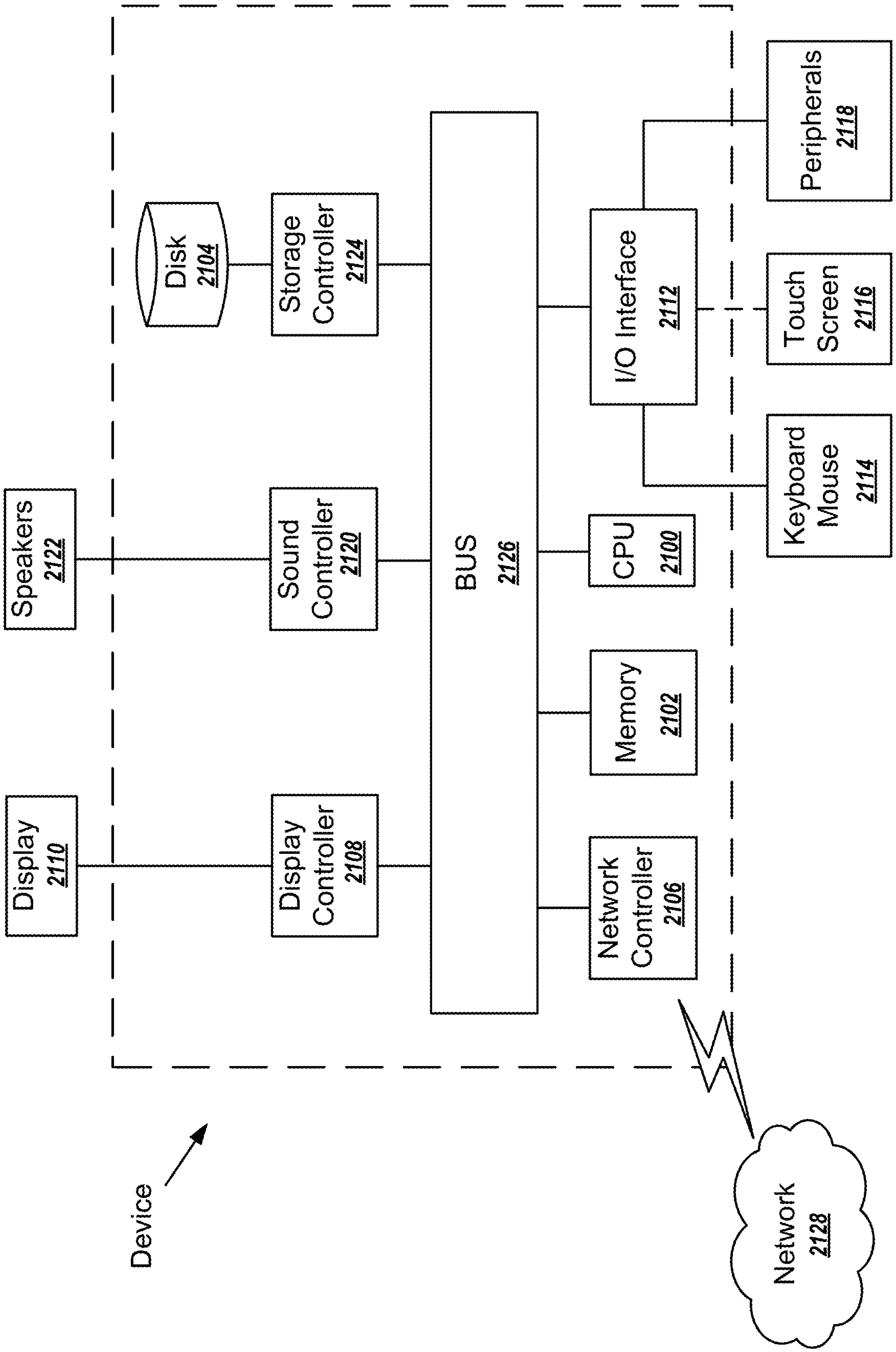
FIG. 21 is a block diagram of an example computing system.

Next, a hardware description of a computing device, mobile computing device, computing system, or server according to exemplary embodiments is described with reference to FIG. 21. The computing device, for example, may represent the candidates 102, employers 104, and/or consultants 106, or one or more computing systems supporting the functionality of the video assessment system 108, as illustrated in FIG. 1. In FIG. 21, the computing device, mobile computing device, or server includes a CPU 2100 which performs the processes described above. The process data and instructions may be stored in memory 2102. The processing circuitry and stored instructions may enable the computing device to perform, in some examples, the methods 1800, 1900, and 2000 of FIGS. 18, 19, and 20. These processes and instructions may also be stored on a storage medium disk 2104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 2104, in some examples, may store the contents of the data repository 110 of FIG. 1, as well as the data maintained by the candidates 102, employers 104, and/or consultants 106 prior to accessing by the video assessment system 108 and transferring to the data repository 110.

Further, a portion of the claimed advancements may be provided as a utility application, background daemon, or component of an operating system, or combination thereof, executing in conjunction with CPU 2100 and an operating system such as Microsoft Windows 7, 8, 10, UNIX, Solaris, LINUX, Apple MAC-OS and other systems known to those skilled in the art.

CPU 2100 may be a Xeon or Core processor from Intel of America or an Opteron processor from AMD of America, or may be other processor types that would be recognized by one of ordinary skill in the art. Alternatively, the CPU 2100 may be implemented on an FPGA, ASIC, PLD or using discrete logic circuits, as one of ordinary skill in the art would recognize. Further, CPU 2100 may be implemented as multiple processors cooperatively working in parallel to perform the instructions of the inventive processes described above.

The computing device, mobile computing device, or server in FIG. 21 also includes a network controller 2106, such as an Intel Ethernet PRO network interface card from Intel Corporation of America, for interfacing with network 2128. As can be appreciated, the network 2128 can be a public network, such as the Internet, or a private network such as an LAN or WAN network, or any combination thereof and can also include PSTN or ISDN sub-networks. The network 2128 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 2128, for example, may support communications between the video assessment system 108 and any one of the candidates 102, employers 104, and/or consultants 106.

The computing device, mobile computing device, or server further includes a display controller 2108, such as a NVIDIA GeForce GTX or Quadro graphics adaptor from NVIDIA Corporation of America for interfacing with display 2110, such as a Hewlett Packard HPL2445w LCD monitor. A general purpose I/O interface 2112 interfaces with a keyboard and/or mouse 2114 as well as a touch screen panel 2116 on or separate from display 2110. General purpose I/O interface also connects to a variety of peripherals 2118 including printers and scanners, such as an OfficeJet or DeskJet from Hewlett Packard. The display controller 2108 and display 2110 may enable presentation of user interfaces for submitting requests to the video assessment system 108.

A sound controller 2120 is also provided in the computing device, mobile computing device, or server, such as Sound Blaster X-Fi Titanium from Creative, to interface with speakers/microphone 2122 thereby providing sounds and/or music.

The general purpose storage controller 2124 connects the storage medium disk 2104 with communication bus 2126, which may be an ISA, EISA, VESA, PCI, or similar, for interconnecting all of the components of the computing device, mobile computing device, or server. A description of the general features and functionality of the display 2110, keyboard and/or mouse 2114, as well as the display controller 2108, storage controller 2124, network controller 2106, sound controller 2120, and general purpose I/O interface 2112 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 22:
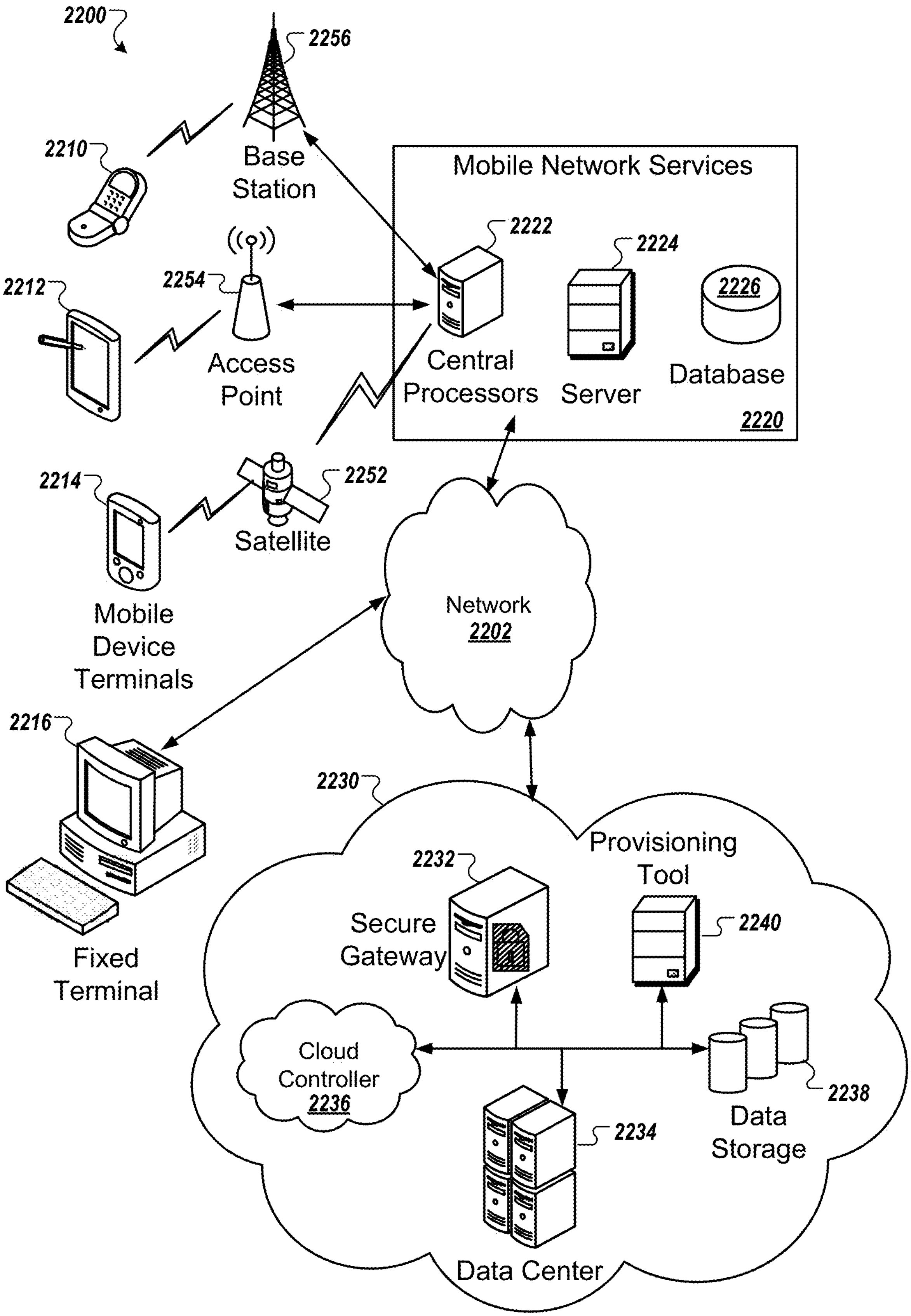
FIG. 22 is a block diagram of an example distributed computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 22, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the computing devices described herein may interface with a cloud computing environment 2230, such as Google Cloud Platform™ to perform at least portions of methods or algorithms detailed above. The processes associated with the methods described herein can be executed on a computation processor, such as the Google Compute Engine by data center 2234. The data center 2234, for example, can also include an application processor, such as the Google App Engine, that can be used as the interface with the systems described herein to receive data and output corresponding information. The cloud computing environment 2230 may also include one or more databases 2238 or other data storage, such as cloud storage and a query database. In some implementations, the cloud storage database 2238, such as the Google Cloud Storage, may store processed and unprocessed data supplied by systems described herein. For example, candidate video data 112, employer position data 114, position competency data 116, enabler-aspect relevance data 118, question mapping data 120, response quality data 122, training data sets 124, aspect identifier grouping data 126, question lists 127, transcript data 128, candidate scoring data 129, feedback data 123, and orchestration data 131 may be maintained by the video assessment system 108 of FIG. 1 in a database structure such as the databases 2238.

The systems described herein may communicate with the cloud computing environment 2230 through a secure gateway 2232. In some implementations, the secure gateway 2232 includes a database querying interface, such as the Google BigQuery platform. The data querying interface, for example, may support access by the video assessment system 108 to data stored on any one of the candidates 102, employers 104, and/or consultants 106.

The cloud computing environment 2230 may include a provisioning tool 2240 for resource management. The provisioning tool 2240 may be connected to the computing devices of a data center 2234 to facilitate the provision of computing resources of the data center 2234. The provisioning tool 2240 may receive a request for a computing resource via the secure gateway 2232 or a cloud controller 2236. The provisioning tool 2240 may facilitate a connection to a particular computing device of the data center 2234.

A network 2202 represents one or more networks, such as the Internet, connecting the cloud environment 2230 to a number of client devices such as, in some examples, a cellular telephone 2210, a tablet computer 2212, a mobile computing device 2214, and a desktop computing device 2216. The network 2202 can also communicate via wireless networks using a variety of mobile network services 2220 such as Wi-Fi, Bluetooth, cellular networks including EDGE, 3G, 4G, and 5G wireless cellular systems, or any other wireless form of communication that is known. In some examples, the wireless network services 2220 may include central processors 2222, servers 2224, and databases 2226. In some embodiments, the network 2202 is agnostic to local interfaces and networks associated with the client devices to allow for integration of the local interfaces and networks configured to perform the processes described herein. Additionally, external devices such as the cellular telephone 2210, tablet computer 2212, and mobile computing device 2214 may communicate with the mobile network services 2220 via a base station 2256, access point 2254, and/or satellite 2252.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system comprising:

processing circuitry;

a non-transitory data repository to store a plurality of competency categories, a plurality of interview questions, a set of associations between given questions of the plurality of interview questions and given competencies of the plurality of competency categories, and a natural language classifier personality model trained to identify, from words and phrases present in an interview transcript, personality aspect identifiers that each map to one or more of the plurality of competency categories, wherein the set of associations comprises a plurality of enabler attributes, wherein the plurality of enabler attributes comprises sets of standardized attributes that provide a translation mechanism for translating competencies into personality aspects that the natural language classifier personality model is trained to automatically identify from an interview transcript; and a non-transitory computer readable memory coupled to the processing circuitry, the memory storing machine-executable instructions, wherein the machine-executable instructions, when executed on the processing circuitry, cause the processing circuitry to send, for display to a remote user of the system, one or more interactive screens to accept input from the user defining elements of a candidate interview program, the one or more interactive screens allowing the user to select, as elements of the candidate interview program, one or more selected competencies from the plurality of competency categories, and one or more selected interview questions from the plurality of interview questions, based on the selected competencies and the set of associations, receive, from a remote computing device of a first party via a network, a candidate video and/or audio submission associated with the candidate interview program, wherein the candidate video and/or audio submission includes a plurality of question responses captured as video or audio responses, and wherein each question response of the plurality of question responses responds to a respective interview question of the selected interview questions, for each question response of the plurality of question responses, generate a transcript of the respective question response, wherein generating the transcript includes applying a speech-to-text algorithm to an audio portion of the respective question response, and apply the natural language classifier personality model to the transcript to locate personality aspect identifiers within the transcript, calculate, based on the personality aspect identifiers located within each of the plurality of question responses, a candidate score for each of the selected competencies, and send, for presentation within a user interface screen of a second remote computing device of a second party responsive to receiving a request to view candidate interview results, one or more of the candidate scores for each of the selected competencies.

2. The system of claim 1, wherein the set of associations comprises relevance weight information between given questions of the plurality of interview questions and given competencies of the plurality of competency categories.

3. The system of claim 2, wherein each given attribute of the plurality of enabler attributes maps to at least one given question of the plurality of interview questions and at least one given competency of the plurality of competency categories.

4. The system of claim 1, wherein each of the located personality aspect identifiers have either a positive association or a negative association with a respective aspect of a plurality of personality aspects.

5. The system of claim 1, wherein the machine-executable instructions further cause the processing circuitry to train the speech-to-text algorithm with a customized dictionary of terms associated with the natural language classifier personality model.

6. A system comprising:

processing circuitry;

a non-transitory data repository to store a plurality of competency categories, a plurality of interview questions, a set of associations between given questions of the plurality of interview questions and given competencies of the plurality of competency categories, and a natural language classifier personality model trained to identify, from words and phrases present in an interview transcript, personality aspect identifiers that each map to one or more of the plurality of competency categories; and a non-transitory computer readable memory coupled to the processing circuitry, the memory storing machine-executable instructions, wherein the machine-executable instructions, when executed on the processing circuitry, cause the processing circuitry to send, for display to a remote user of the system, one or more interactive screens to accept input from the user defining elements of a candidate interview program, the one or more interactive screens allowing the user to select, as elements of the candidate interview program, one or more selected competencies from the plurality of competency categories, and one or more selected interview questions from the plurality of interview questions, based on the selected competencies and the set of associations, receive, from a remote computing device of a first party via a network, a candidate video and/or audio submission associated with the candidate interview program, wherein the candidate video and/or audio submission includes a plurality of question responses captured as video or audio responses, and wherein each question response of the plurality of question responses responds to a respective interview question of the selected interview questions, for each question response of the plurality of question responses, generate a transcript of the respective question response, wherein generating the transcript includes applying a speech-to-text algorithm to an audio portion of the respective question response, and apply the natural language classifier personality model to the transcript to locate personality aspect identifiers within the transcript, calculate, based on the personality aspect identifiers located within each of the plurality of question responses, a candidate score for each of the selected competencies, and send, for presentation within a user interface screen of a second remote computing device of a second party responsive to receiving a request to view candidate interview results, one or more of the candidate scores for each of the selected competencies;

wherein to send one or more interactive screens to accept input from the user defining elements of the candidate interview program comprises automatically populating a competency model for a described employment position as one or more of the elements of the candidate interview program, wherein the automatically populated competency model is based on one or more past candidate interview programs conducted by a same entity as an entity associated with the user and/or one or more past candidate interview programs conducted by entities other than the entity associated with the user.

7. The system of claim 6, wherein the one or more interactive screens accept input from the user to either a) accept, as the selected competencies, the automatically populated competency model, or b) modify the candidate interview program by adding or removing competencies from the automatically populated competency model.

8. A method comprising, by processing circuitry:

sending, for display to a remote user, one or more interactive screens to accept input from the user defining elements of a candidate interview program, the one or more interactive screens allowing the user to select, as elements of the candidate interview program, one or more selected competencies from a stored plurality of competency categories, and one or more selected interview questions from a stored plurality of interview questions, based on the selected competencies and a set of stored associations between the selected competencies and the stored plurality of interview questions, receiving, from a remote computing device of a first party via a network, a candidate video and/or audio submission associated with the candidate interview program, wherein the candidate video and/or audio submission includes a plurality of question responses captured as video or audio responses, and wherein each question response of the plurality of question responses responds to a respective interview question of the selected interview questions, for each question response of the plurality of question responses, generating a transcript of the respective question response, wherein generating the transcript includes applying a speech-to-text algorithm to an audio portion of the respective question response, and applying a natural language classifier personality model to the transcript to locate personality aspect identifiers within the transcript, the natural language classifier personality model trained to identify, from words and phrases present in an interview transcript, personality aspect identifiers that each map to one or more of the stored plurality of competency categories, wherein the set of stored associations comprises a plurality of enabler attributes, wherein the plurality of enabler attributes comprises sets of standardized attributes that provide a translation mechanism for translating competencies into personality aspects that the natural language classifier personality model is trained to automatically identify from an interview transcript, calculating, based on the personality aspect identifiers located within each of the plurality of questions responses, a candidate score for each of the selected competencies, and sending, for presentation within a user interface screen of a second remote computing device of a second party responsive to receiving a request to view candidate interview results, one or more of the candidate scores for each of the selected competencies.

9. The method of claim 8, wherein the set of stored associations comprises relevance weight information between given questions of the stored plurality of interview questions and given competencies of the stored plurality of competency categories.

10. The method of claim 9, wherein the each given attribute of the plurality of enabler attributes maps to at least one given question of the stored plurality of interview questions and at least one given competency of the stored plurality of competency categories.

11. The method of claim 8, wherein sending one or more interactive screens to accept input from the user defining elements of the candidate interview program comprises automatically populating a competency model for a described employment position as one or more of the elements of the candidate interview program.

12. The method of claim 11, wherein the one or more interactive screens accept input from the user to either accept, as the selected competencies, the automatically populated competency model, or modify the candidate interview program by adding or removing competencies from the automatically populated competency model.

13. The method of claim 11, wherein the automatically populated competency model is based on one or more past candidate interview programs conducted by a same entity as an entity associated with the user.

14. The method of claim 11, wherein the automatically populated competency model is based on one or more past candidate interview programs conducted by entities other than an entity associated with the user.

15. The method of claim 8, wherein each of the located personality aspect identifiers have either a positive association or a negative association with a respective aspect of a plurality of personality aspects.

16. The method of claim 8, further comprising training the speech-to-text algorithm with a customized dictionary of terms associated with the natural language classifier personality model.

* * * * *